United States Patent [19]

Kuznetsov

[11] Patent Number: 5,666,883
[45] Date of Patent: Sep. 16, 1997

[54] METHOD AND APPARATUS FOR USE OF ALTERNATING CURRENT IN PRIMARY SUSPENSION MAGNETS FOR ELECTRODYNAMIC GUIDANCE WITH SUPERCONDUCTING FIELDS

[75] Inventor: Stephen B. Kuznetsov, Pittsburgh, Pa.

[73] Assignee: Power Superconductor Applications Co., Inc., Pittsburgh, Pa.

[21] Appl. No.: 248,327

[22] Filed: May 24, 1994

[51] Int. Cl.$^6$ ................................................ B60L 13/08
[52] U.S. Cl. .......................... 104/281; 104/284; 104/285; 104/286
[58] Field of Search ..................... 104/281, 284, 104/285, 286, 289, 294, 282

[56] References Cited

U.S. PATENT DOCUMENTS

| | | | |
|---|---|---|---|
| 3,585,423 | 6/1971 | Bolton | 104/290 |
| 3,644,762 | 2/1972 | Eastham . | |
| 3,768,417 | 10/1973 | Thornton et al. . | |
| 3,770,995 | 11/1973 | Eastham et al. . | |
| 3,780,668 | 12/1973 | Schwarzler | 104/286 |
| 3,804,023 | 4/1974 | Massar et al. | 104/284 X |
| 3,836,799 | 9/1974 | Eastham et al. . | |
| 3,842,750 | 10/1974 | Miericke | 104/286 X |
| 3,858,521 | 1/1975 | Atherton | 104/286 X |
| 3,937,148 | 2/1976 | Simpson | 104/284 X |
| 3,951,074 | 4/1976 | Cooper | 104/286 X |
| 3,984,309 | 10/1976 | Allen et al. | 209/214 |
| 4,013,906 | 3/1977 | Eastham | 104/282 X |
| 4,027,597 | 6/1977 | Lang . | |
| 4,049,983 | 9/1977 | Attwood et al. . | |
| 4,299,173 | 11/1981 | Arima et al. . | |
| 4,646,651 | 3/1987 | Yamamura et al. | 104/286 X |
| 5,058,505 | 10/1991 | Uehira | 104/284 |
| 5,170,715 | 12/1992 | Gran et al. . | |
| 5,249,529 | 10/1993 | Hebermann | 104/284 X |
| 5,426,408 | 6/1995 | Jones et al. | 505/211 |
| 5,479,145 | 12/1995 | Kalsi | 104/285 X |

FOREIGN PATENT DOCUMENTS

| | | | |
|---|---|---|---|
| 2134425 | 1/1973 | Germany . | |
| 110506 | 8/1979 | Japan | 104/289 |
| 190503 | 8/1988 | Japan | 104/284 |
| 645880 | 2/1979 | U.S.S.R. . | |

OTHER PUBLICATIONS

"Canadian developments in superconducting Maglev and linear synchronous motors", Cryogenics, vol. 15 No.7, Jul. 1975 pp.395–402. Jul. 1975.

Primary Examiner—S. Joseph Morano
Attorney, Agent, or Firm—Clifford A. Poff

[57] ABSTRACT

An electrodynamic suspension system levitates a platform or a transportation vehicle by an array of onboard superconducting electromagnetic coils forming a primary member overlying a secondary member on the guideway in a transverse flux orientation with respect to a plane of levitation of the moveable member above the secondary member on the guideway. The superconducting coils are energized by alternating current to produce an alternating field of magnetic flux. The frequency of the alternating current is selectable down to direct current. The frequency is selected to cause the vehicle to be levitated statically above the guideway. Once levitated the frequency is reduced as the speed of the vehicle increases along the guideway usually not in excess of 60 miles per hour. Passive electrically conductive plates form the secondary member to respond to the alternating field of magnetic flux and both guide and levitate the vehicle by inherently-stable repulsive induction action to maintain a controllable spaced relation between the guideway and the vehicle.

53 Claims, 33 Drawing Sheets

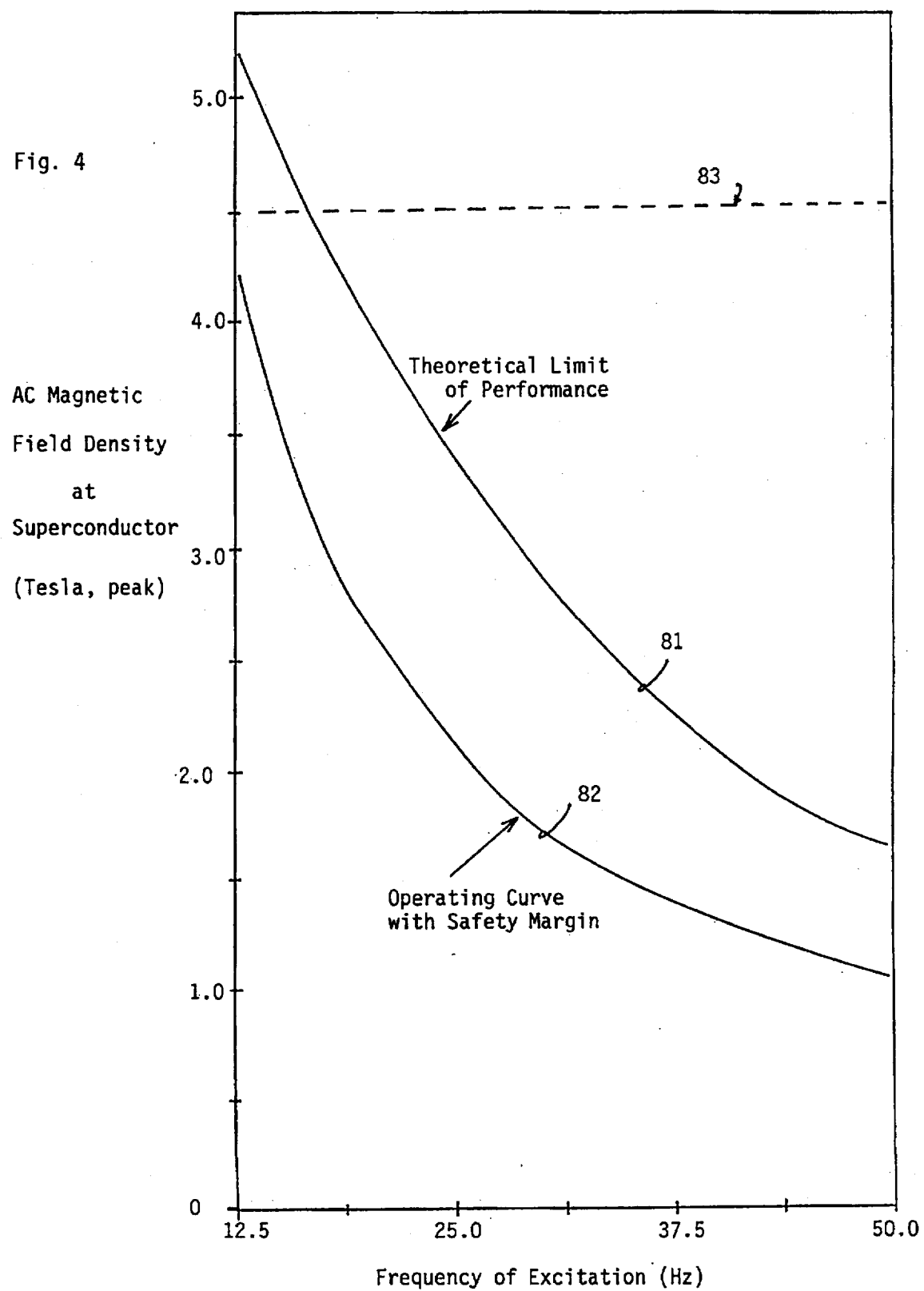

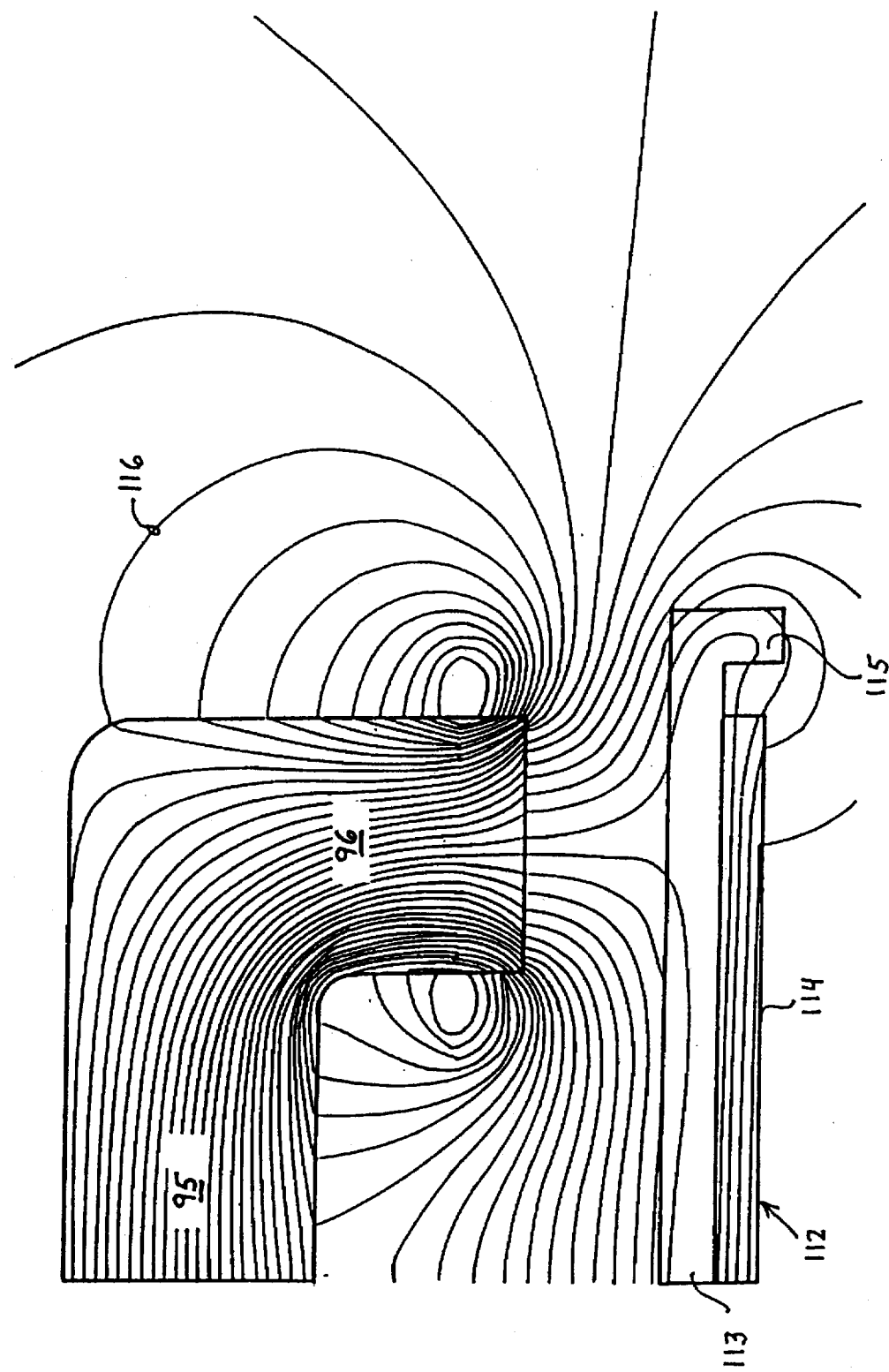

ABmethod andapparatus for use of alternating current in primary suspension magnets for electrodynamic guidance with superconducting fields

METHOD AND APPARATUS FOR USE OF ALTERNATING CURRENT IN PRIMARY SUSPENSION MAGNETS FOR ELECTRODYNAMIC GUIDANCE WITH SUPERCONDUCTING FIELDS

BACKGROUND OF THE INVENTION

1. Field of the Invention

The present invention relates to an electrodynamic repulsive system for levitating a structure in situ or for traveling movement of the structure along a course, and, more particularly the present invention relates to such a system using transverse-flux alternating current (AC) levitation and guidance apparatus incorporating superconducting AC excitation of the primary electrical member.

2. Description of the Prior Art

U.S. Pat. No. 4,049,983 discloses a linear induction machine to provide electromagnetic levitation, through the use of a primary member having the form of four longitudinally spaced sets of linear adjacent co-planar pole faces. The core made of magnetic material, is arranged to provide paths of working flux between the pole faces in transverse planes perpendicular to the plane containing the pole faces. Polyphase excitation windings are disposed on the inner two limbs whereby no end-windings are effectively present and all windings are magnetically coupling with the core. A secondary member comprised of electrically conductive material is disposed in a confronting relation with the pole faces to produce longitudinal paths for electrical currents on each side of at least the inner pole faces of each set and transverse paths for electrical current interconnecting the longitudinal paths. When an alternating current supply is used to energize the windings of a primary member, a field of magnetomotive force operates to produce a thrust having a first component tending to force the primary member and the secondary member either apart or together and a second component tending to maintain the primary member and secondary member in alignment with one another. When the windings are energized from a plural phase alternating current supply, the resulting field of magnetomotive force travels in the longitudinal direction so that the thrust has additional components tending to cause relative longitudinal displacement between the primary member and the secondary member. To stabilize levitation, a sheet of magnetic material is arranged on the side of the electrically conductive material remote to the primary by insuring no significant quantity of magnetic flux from the primary member reaches the secondary member without first passing through the first sheet of electrically non-magnetic material. The absence of end-windings due to the unwound outer limbs of the core of the primary member is utilized to increase the power factor.

When operated for electromagnetic levitation, it is seen that the field of magnetomotive force having the component to either force apart or together the primary and secondary members lacks necessary stability in the air gap which the present invention seeks to maintain constant for attaining the necessary stability. The use of polyphase alternating current to energize this form of linear induction machine precludes use of the field of magnetomotive force for levitation. The use of only two excitation coils in the four limb core arrangement also precludes the attainment of a high power factor produced by, for example, superconductive windings due to the excessive height of the limbs and magnetization penalty associated with the extra ferromagnetic material. The outer two of four pole faces, if unexcited by alternating current, necessarily increases the size of the overall electrical machine. The space required for the electromagnetic structure is too bulky for use in a construction where the windings are liquid cooled or encased as part of a cryogenic support system for operating as a superconductor.

U.S. Pat. Nos. 3,770,995 and 3,585,423 each disclose a linear induction motor directed to producing the repulsive force as a result of flux passing in a primary and secondary magnetic structures both transversely and longitudinally to the orientation of magnetic laminations. Such induction motor is useful for propulsion of a magnetically levitated vehicle but is unsuitable for levitation and stabilization.

In U.S. Pat. No. 3,768,417 of which FIGS. 1A and 1B are taken therefrom, there is disclosed a transportation system using an electromagnetically suspended, guided and propelled vehicle A in which the vehicle is provided with a plurality of superconducting coils B distributed about a cylindrical lower surface C of the vehicle A. Adjacent coils on the vehicle are energized by direct current to produce magnetic fields D orientated with Continuously alternating polarities N-S-N-S-N-S- etc. A trough-like guideway G surrounding the lower third of the vehicle's circumference is provided with both active, current carrying conductors E and passive conductors F substantially continuous along the length of the guideway and exposed to the magnetic field of the superconductive coils B. When the vehicle speed along the guideway G reaches the predetermined minimum, the interaction between the magnetic dipoles of the vehicle coils B and the eddy currents they induce in the passive conductors F, an electrodynamic force is created to levitate the vehicle. The active conductors in the guideway are shaped in the form of a series of overlapping current loops strung axially along the guideway so as to generate when energized an alternating magnetic field which advances along the guideway and propels the vehicle at a synchronous speed by interaction with the magnetic dipoles of the vehicle's coils. The direct current excitation of the vehicle superconducting coils has the disadvantage of levitating the vehicle only after the vehicle attains the predetermined speed along the guideway. The present invention provides a system to levitate as well as guide the vehicle throughout a speed range commencing at a zero velocity and maintaining levitation and lateral guidance continuously throughout the entire operating speed of the vehicle.

In the past electrodynamic levitation systems utilize direct current excitation for not only the levitation and guidance but also the propulsion magnets. This is a severe disadvantage to the levitation and guidance of the vehicle because the magnetic forces fade out to inoperative levels at low speeds as a vehicle approaches a stand-still. Theoretical performance calculations obtained in 1976 from the Canadian Institute for Guided Ground Transportation depict the fundamental levitation lift and drag forces for a DC excited vehicle magnet suspended above a passive aluminum conductor guideway with various design thicknesses. The graph lines in FIG. 1C show the magnetic lift and drag forces as a function of speed for a specific magnet geometry used with direct current excitation. The air-core magnet represented by the calculated performance curves is 1.06 m long over the round ends and 0.3 m wide with an MMF of 400 kilo Ampere-turns (KAT), at a suspension height of 22 cm above guideway-mounted aluminum levitation strips which are 0.6 m wide.

FIG. 1C shows parametric curves for four cases of levitation strip thickness identified as follows: $t_1$=0.5 cm, $t_2$=1.0 cm, $t_3$=1.5 cm, $t_4$=2.0 cm. In FIG. 1C significant lift induced by vehicle motion generated eddy currents is not developed until a speed of 50 km per hour or greater is attained. The figure also shows the simultaneous drag versus speed characteristic for a DC excited system whereby the drag force peaks in the speed range of 30 to 100 km per hour. The electromagnetic drag is shown to peak at approximately 9 kN which imposes a restriction on the use of this system and reduces the overall efficiency of the propulsion scheme which must compensate for both the aerodynamic drag and electro-magnetic drag. The use of direct current excitation for magnets presents the problem of adapting conventional excitation schemes to contactless guideway levitation or guidance when at reduced vehicle speeds the induced guideway current is nil. At slow speeds, direct current excitation allows the magnetic flux density to remain high, but the induced voltage in the guideway electrical loop becomes too low to produce sufficient induced track currents and therefore a nil force is produced. The basic induction equation can be applied for a DC-excited system to a single electrical guideway loop enclosing the vehicle magnetic flux of one magnet at a low speed condition to estimate loop induced voltage as:

$$V = 4.44 \, B_z A f N \times 10^{-8} \quad (1)$$

where:

V=induced voltage (r.m.s.) in one track loop;

4.44 is a constant;

$B_z$=flux density (in lines/sq. in.) oriented perpendicular to vertical direction;

A=cross sectional area of track loop;

f=frequency of mechanically induced speed dependent currents; and

N=number of turns per track loop.

The relationship between the frequency "f" and pole-pitch and vehicle speed is given $$f = \frac{Vs}{2Tp} \quad (2)$$

where:

Tp=pole-pitch of track loops;
Vs=vehicle speed

Assume a vehicle speed Vs of 30 mph (11.76 m/s) according to Equation 2, the frequency "f" is found to be:

$$f = \frac{11.76 \text{ m/s}}{2(0.48 \text{ m})} = 12 \text{ Hz}$$

Inserting this value of "f" along with the following values into Equation 1:

Bz=46,400 kl/sq. in.
N=1 turn
A=242 sq. in.

We find the induced voltage as follows:

V = 4.44 (46,4400 l/sq. in.) (242 sq. in.) (12 Hz) (1.0) × 10⁻⁸
  = 5.98 V rms per turn The choice of coil turns on the guideway electrical conductor is a critical parameter, but for a given volume of conductor or physical investment in guideway loop conductor material, the number of turns does not alter the basic inductance/resistance time constant (L/R) of the loop. It is economically advantageous in these systems, to have single turn loops exclusively at high speed track sections and to increase to a multi-turn (e.g. 4 turn) loop when in the designated slow-speed zones. However, there may develop a universal requirement in maglev systems, that all track sections be equally operational at high and low speeds and thus the need to have equivalent lateral stiffness and damping ratios over a very broad speed range.

The calculated loop parameters (full-scale) for a 0.319× 0.50 m. overall dimension aluminum loop (based on formulas by F. W. Grover, *Inductance Calculations*, Dover Publications, 1946) are:

L=0.98 µΩ
R=157 µΩ
L/R=6.24 ms
Inductive Reactance=73.8 µΩ
Loop Impedance=173.5 µΩ
Phase Angle=25°

With a 5.98 V/turn induction at 11.7 m/s vehicle speed, the induced current is therefore limited to:

$$I = \frac{5.98 \text{ V}}{173.5 \text{ μΩ}} = 34,466 \text{ Amps rms}$$

The maximum lateral current loading is approximately $$J = \frac{\text{Induced Current}}{\text{Lateral Pole-Pitch}} = \frac{34,466 \text{ A}}{0.683 \text{ m}} = 54,022 \text{ A/m lateral} \quad (3)$$

In practice, the addition of external switching devices such as thyristors to the guideway circuit loop will add at least 61 µΩ to the loop impedance, reducing the overall induced current to 25,500 Amps rms. This now yields a 40,000 A/m current loading for the lateral control. Thus 11.76 m/s is considered the fade-out speed on the criterion that 40,000 A/m is the lowest tolerable current loading.

Consider the case of the same vehicle magnet excitation (DC) but at a reduced speed of 6 m/s (f=6.12 Hz). The induced voltage is:

V = 4.44 (46,440) (242 sq. in.) (6.12 Hz) × 10⁻⁸ = 3.05 Volts $$I = \frac{3.05 \text{ Volts}}{(173.5 + 61) \text{ μΩ}} = 13,006 \text{ Amps rms}$$

The maximum lateral current loading:

$$J = \frac{13,006 \text{ Amps rms}}{0.683 \text{ m}} = 19,042 \text{ A/m}$$

Bx = (46,440)/64,500 l/sq. in. = 0.72 Tesla

Specific Restoring Force = Bx * J = 0.72 × 19,042
= 13,710 N/sq. m. = 2.0 *PSI*

This restoring force for lateral guidance is too low for effectively controlling a vehicle, because to generate a 50,000N restoring force would require 50,000/13,710=23.64 sq.m. of surface area of vehicle-mounted superconducting coils which is excessive.

This level of induced voltage due to DC excitation on the vehicle magnets is at the threshold of not being able to produce sufficient circulating current in the guideway loops to produce either repulsive levitation or lateral guidance of a full sized vehicle, for example in the range 5–50 tons weight. As the speed of the vehicle is further reduced below 30 mph the induced voltage linearly decreases to 0 and consequently is wholly inoperative to generate a restoring force.

Accordingly, it is an object of the present invention to provide an electrodynamic repulsive system using superconducting alternating current excitation of a primary electrical member to levitate a structure for either static suspension or movement along a course of travel.

It is another object of the present invention to provide full vertical levitation and lateral guidance by electrodynamic forces for a moveable structure within a speed range from zero through the highest operating velocity.

It is a further object of the present invention to provide a high-power factor, lightweight design of vehicle mounted primary guidance and levitation apparatus when excited by superconducting coils with alternating current excitation.

SUMMARY OF THE INVENTION

According to the present invention there is provided an electrodynamic suspension system including a moveable member for levitation relative to a foundation, the moveable member including an array of onboard superconducting electromagnetic coils forming a primary member overlying a secondary member on the foundation in a transverse flux orientation with respect to a plane of levitation of the moveable member above the secondary member on the foundation. The superconducting coils being energized by alternating current to produce an alternating field of magnetic flux, the foundation including passive electrically conductive means forming the secondary member responsive to the alternating field of magnetic flux to guide and levitate the moveable member by repulsive induction action to maintain a controllable spaced relation between the foundation and moveable member. In one aspect of the present invention, the moveable member carries a mechanical or audio sound emitter such as a pump, which is to be isolated from a foundation by levitating through a flux permeable air gap the moveable member above the foundation.

According to the another aspect of the present invention there is provided an electromagnetic transportation system including a vehicle including means having an array of onboard superconducting electro-magnetic coils forming a primary member arranged in a transverse flux orientation with respect to longitudinal orientation of vehicle motion, at least one of said superconducting coils being energized by alternating current to produce an alternating field of magnetic flux, and a guideway including passive electrically conductive means forming a secondary member responsive to said alternating field of magnetic flux to either or both guide and levitate the vehicle by repulsive induction action at a spaced relation from the guideway independently of propulsive vehicle movement.

BRIEF DESCRIPTION OF THE DRAWINGS

These features and advantages as well as others will be more fully understood when the following description is read in light of the accompanying drawings in which:

FIG. 4 is a graph of excitation frequency versus magnetic field density for magnetic levitation superconducting magnets suitable for the present invention;

FIG. 6C is a full-load magnetic flux plot of a C-core excited levitation magnet;

DETAILED DESCRIPTION OF THE INVENTION

Figure 1A:
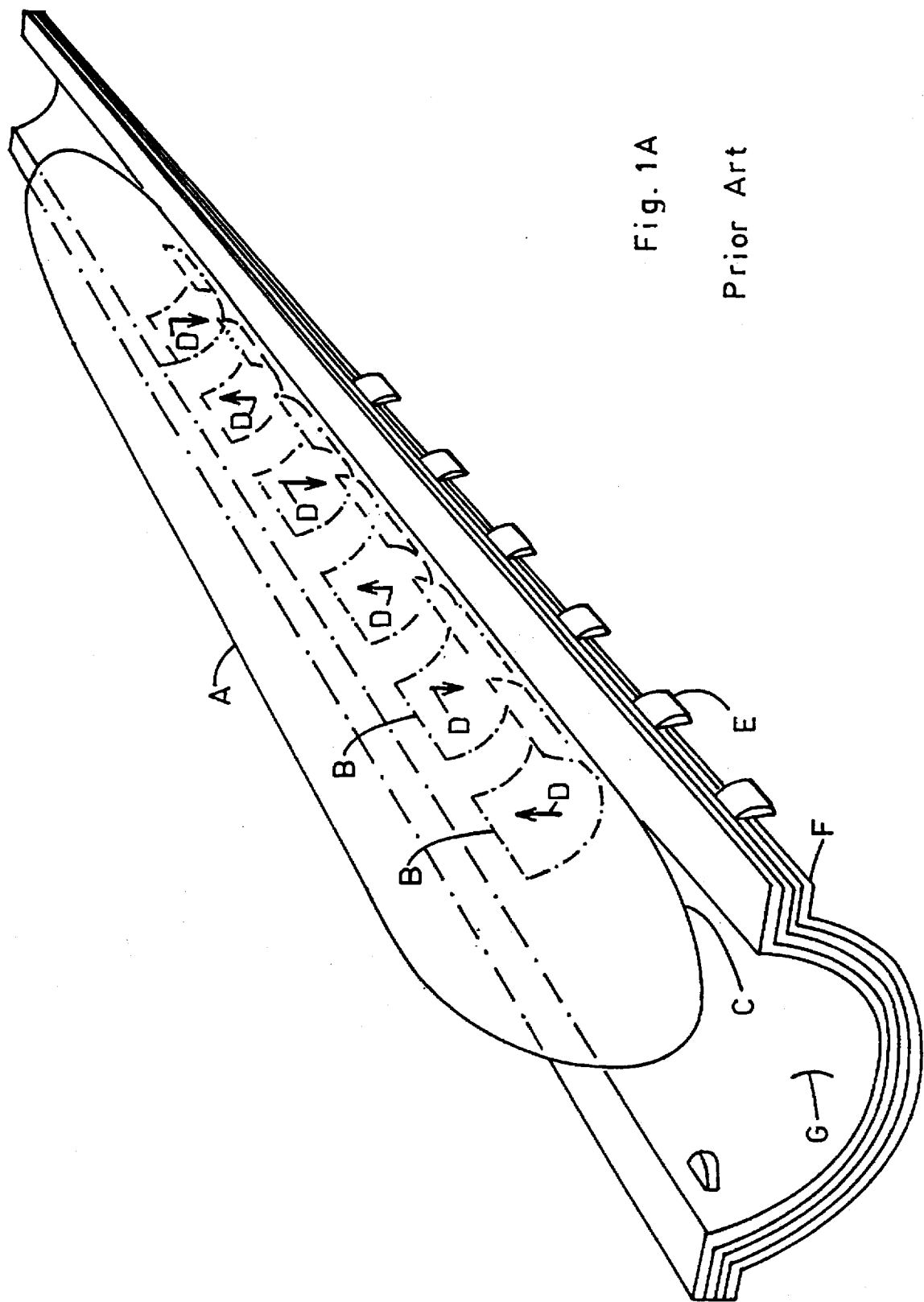
FIGS. 1A and 1B are illustrations of prior art levitation schemes taken from U.S. Pat. No. 3,768,417 using direct current of the primary excitation circuit.
Figure 1B:
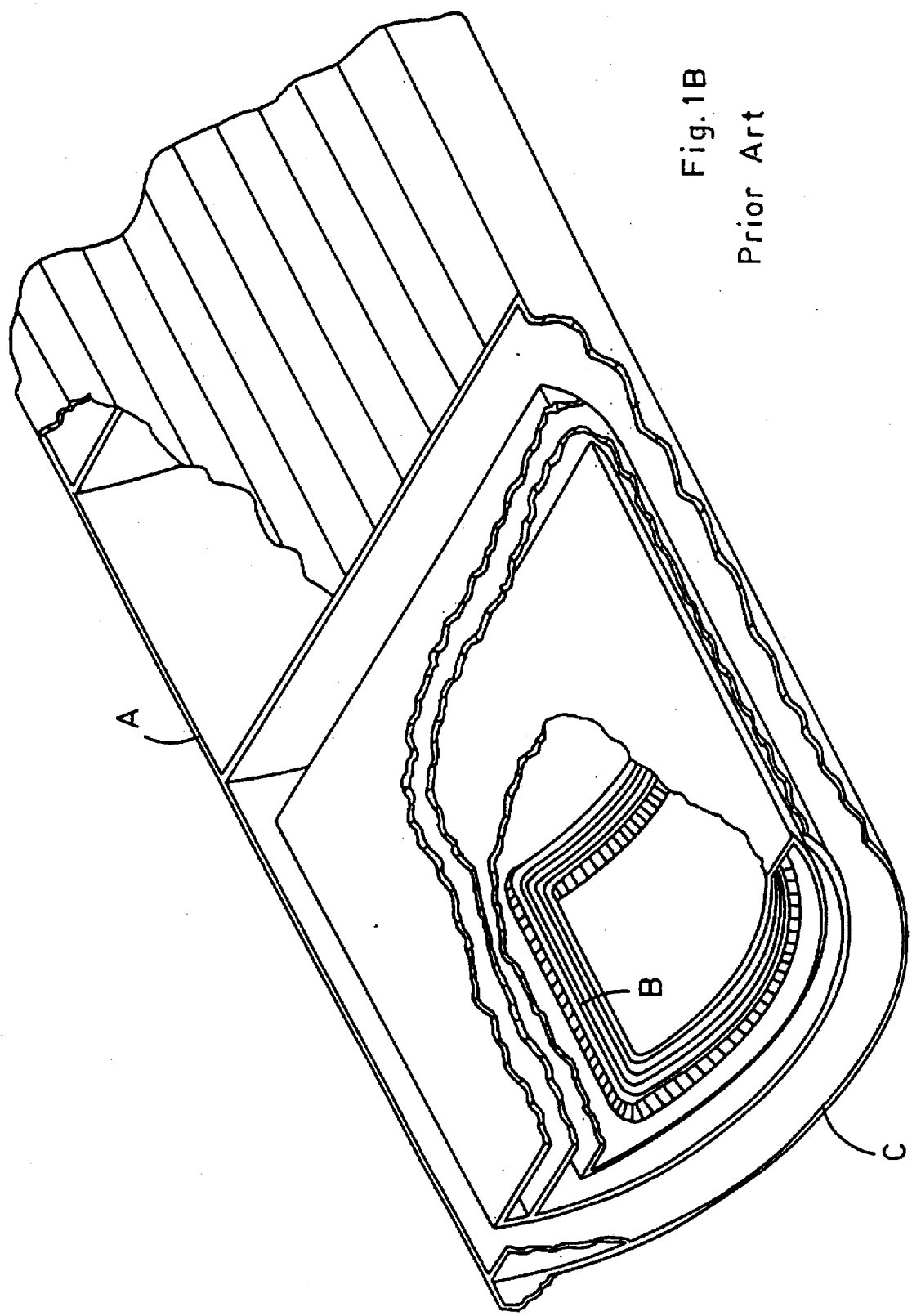
Figure 1C:
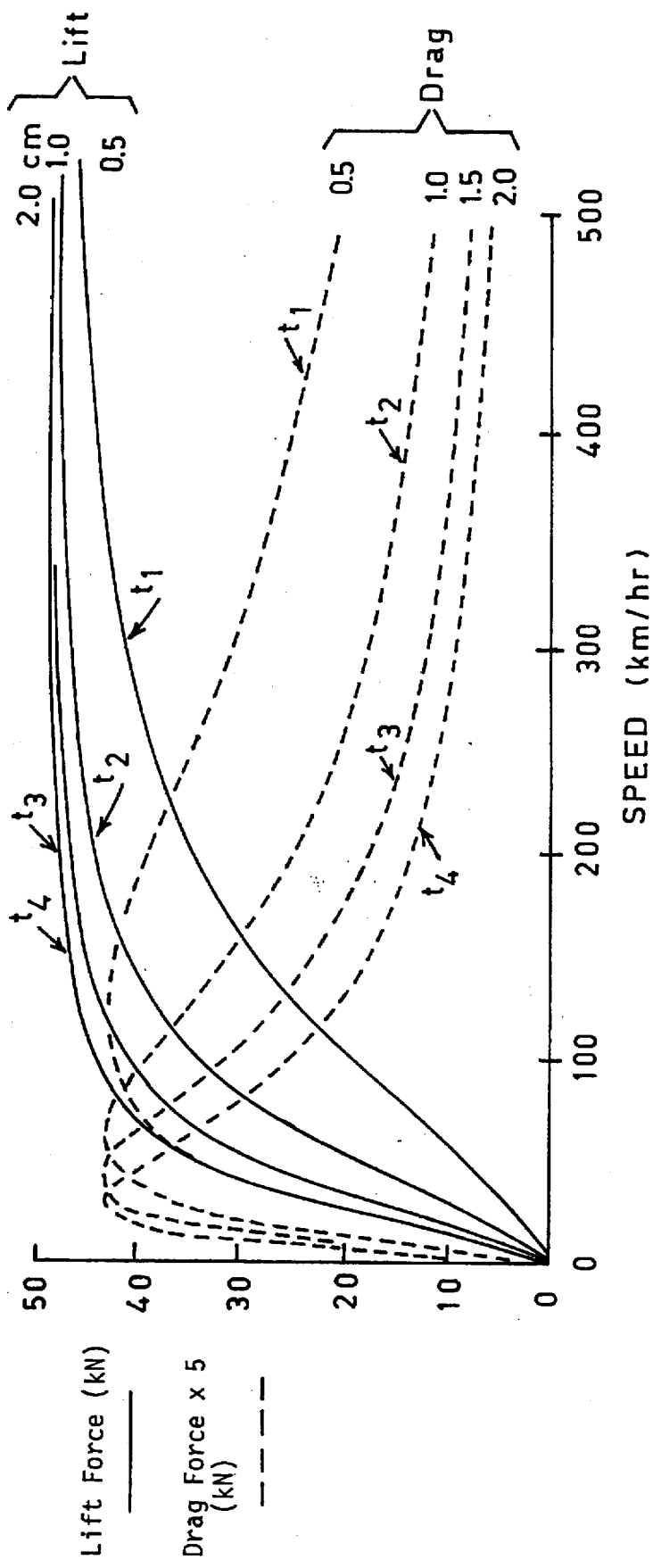
FIG. 1C was obtained from a 1976 report of the Canadian Institute for Guided Ground Transportation depicting lift and drag forces versus speed for a specific magnet geometry and MMF.
Figure 2:
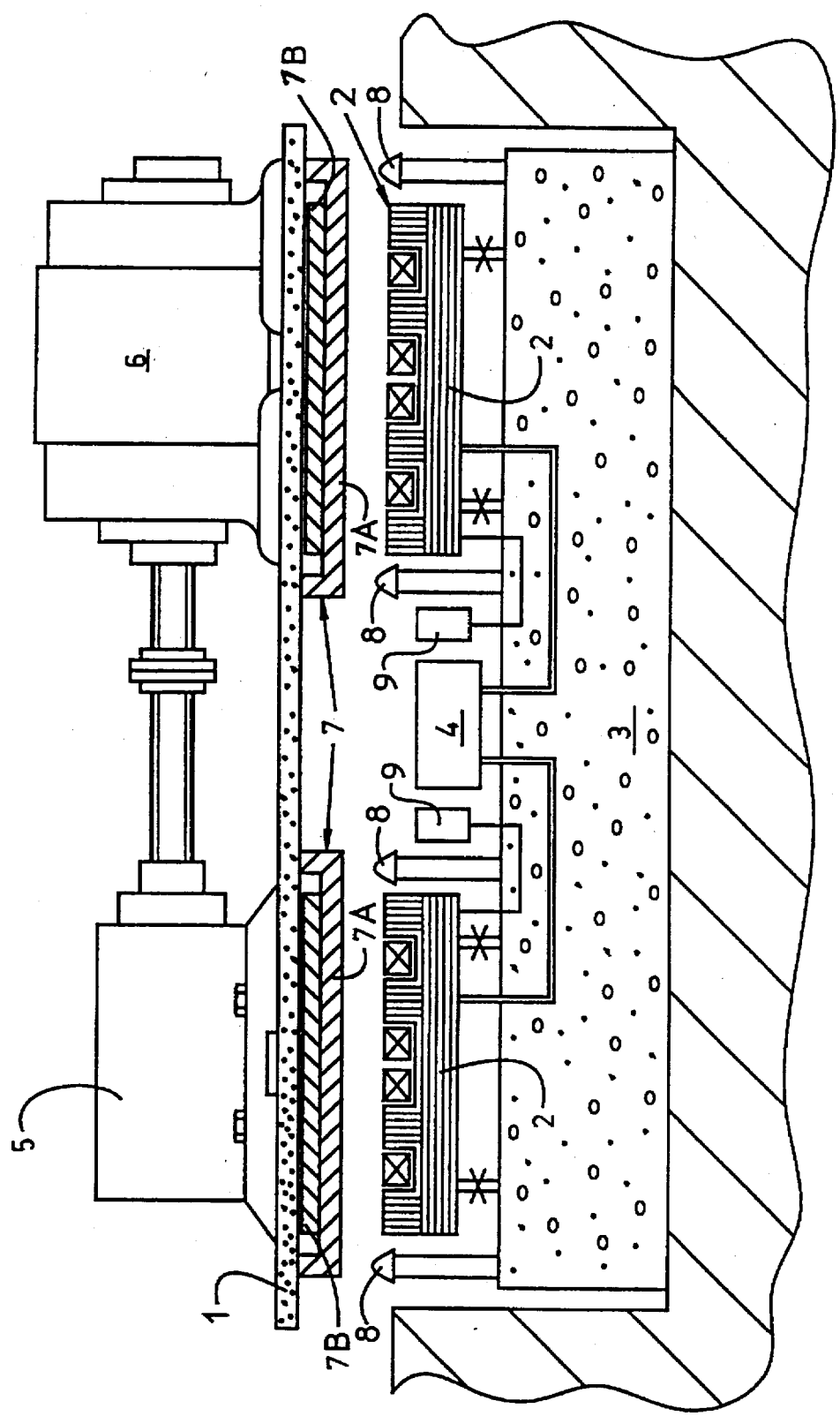
FIG. 2 is a schematic elevational view of parts forming a magnetically levitated vibration isolation table according to one embodiment of the present invention.

The invention utilizes cryogenically cooled or superconducting excitation as applied to a ferromagnetic primary structure for producing repulsive levitation and repulsive lateral guidance of a magnetically suspended member. A cryogenically cooled conductor is a material which is actively cooled at a temperature above absolute zero but significantly below ambient temperature whereby the cooling medium is either a liquid or gaseous cryogen this functioning along with an external heat exchanger or liquefier to remove electrical heating losses so generated by the conductor when passing rated current or functioning to reduce the electrical resistivity of the conductor to allow very high current densities to exist without significant temperature rise. According to a first embodiment of the present invention as schematically illustrated in FIG. 2, a moveable member which for illustrative purposes only comprises a bench or table 1 magnetically levitated and guided, e.g., positioned, by cryogenically cooled or superconducting magnet assemblies 2 supported at spaced apart locations by a foundation 3 and powered by electrical current supplied at the output of an alternating electrical current supply 4. A pump 5 is secured by bolts or other fasteners to the table at an operative relation from motor 6. In this embodiment, the table is levitated to isolate detrimental vibration caused by operations of the pump 5 and motor 6 from the foundation structure and other machinery within a building or surrounding area. The magnet assemblies 2 essentially include perpendicularly arranged cryogenically cooled or superconducting magnet assemblies to stabilize the Table 1 in both of the x and y directions. It is to be understood that two magnet assemblies as shown in the embodiment of FIG. 2 for stabilizing the table in only one of the x and y directions of the horizontal and that identically constructed magnets and secondaries will be provided in perpendicular arrangement to those illustrated. A multiplicity of cryogenically cooled and/or superconducting magnet assemblies may be provided to meet the requirement for levitating a particular mechanical burden on the table. Such a magnet assembly may be used to levitate the table at a 2 inch air gap with a 6 pound per square inch loading.

The table shown in FIG. 2 is rectangular and provided with spaced apart secondaries 7, one overlying each of the levitation magnet assemblies 2. Each secondary 7 comprising a sheet 7A of highly conductive electrical material wholly embedded in a rectangular cavity in a sheet of 7B magnetic steel functioning as a flux return element of the secondary. Each levitation magnet assembly 2 is protected from impact with the table in the event of a power failure and during periods of non use of the pump by support parts 8 projecting vertically above the pole faces of the magnet assemblies 2. Part 8 also includes an end cap wherein an air gap sensor is located for controllably maintaining a desired air gap. In addition to the current supply 4, each magnet assembly is coupled by conduit lines with a cryogen support system 9. The details of the construction and operation of the magnet levitation produced by magnet assemblies 2 and the secondary 7 will be discussed in great detail in regard to further embodiments of the present invention.

Figure 3A:
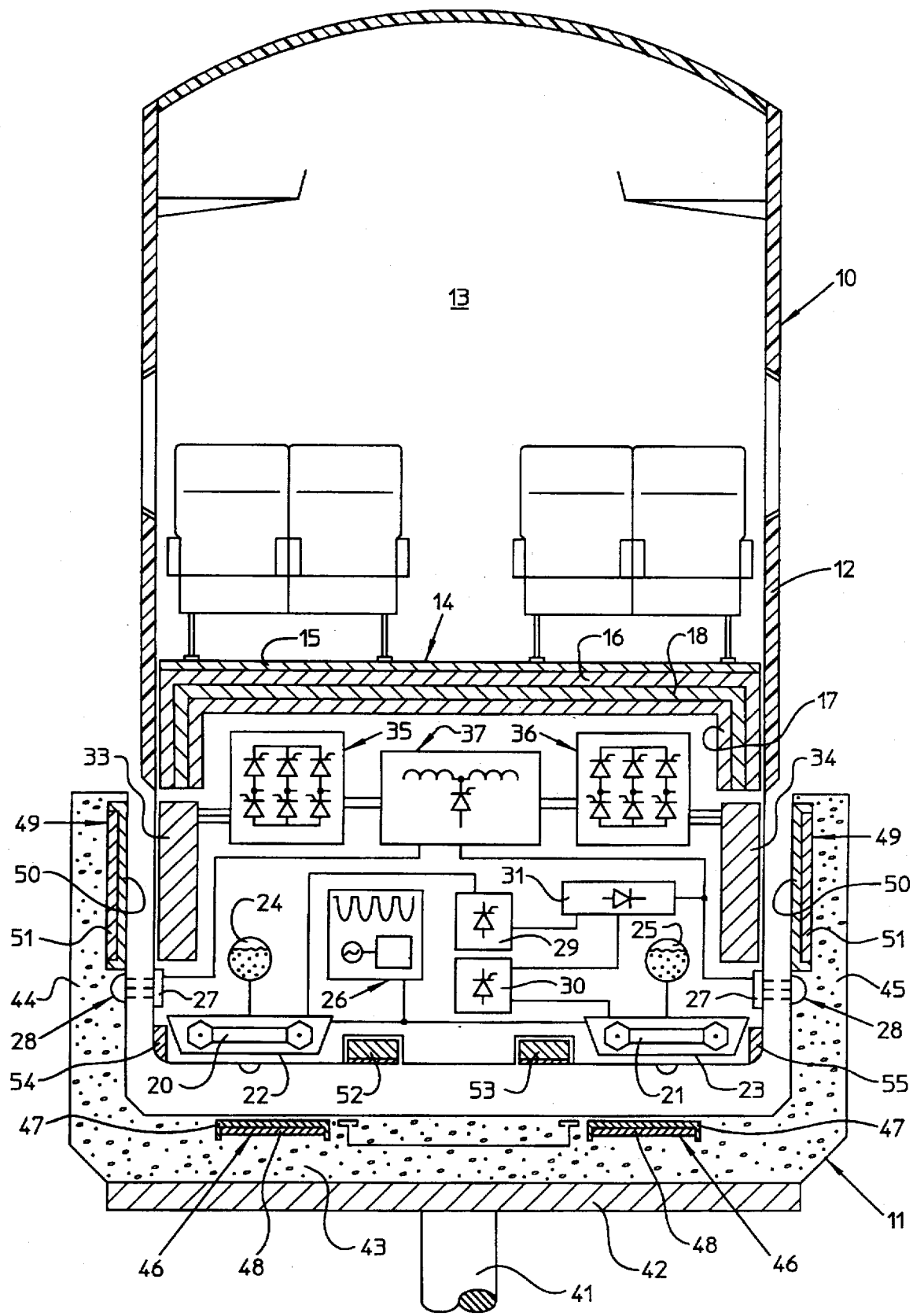
FIGS. 3A and 3B are elevational views of two embodiments showing the general assembly of parts for forming a magnetically-suspended vehicle.

Specifically, the utilization of liquid cooled or superconducting excitation as applied to a ferromagnetic primary structure is advantageously utilized for producing repulsive levitation and repulsive lateral guidance of a magnetically suspended vehicle. As schematically illustrated in FIG. 3A, a wholly electromagnetic propulsion, levitation and guidance system is provided for a vehicle 10 to move along a vehicle guideway structure 11 using superconductive levitation and guidance magnets powered by alternating current. The excitation of the magnets for simultaneous levitation and guidance of the vehicle produces an induced voltage in the guideway electrical conductors or track circuit beyond that normally attainable with direct current excitation of levitation and guidance magnets. With alternating current excitation, the induced track voltage is described by the equation:

$$V = 4.44\ B_z A(fe+fm) N \times 10^{-8} \text{ Volts (rms)} \tag{5}$$

where:
4.44=numerical constant;
$B_z$=airgap magnetic flux density (lines/sq. in.) in vertical direction;
fe=frequency of electrical excitation of the primary member;
fm=frequency of mechanically-induced, speed dependent current in guideway coils; and
N=number of turns per track loop.

At very low vehicle speeds, for example, Vs=2 m/s, $T_p$=0.54 m, fm=1.85 Hz, and an alternating current excitation is chosen at a frequency of fe=20 Hz whereby each vehicle magnet is desired to produce a 0.72 Tesla (46,440 lines per square inch) induction at the track surface. The induced track voltage according to equation (5) becomes:

$$\begin{aligned} V &= 4.44\ (46,440)\ (242 \text{ sq. in.})\ (20+1.85) \times 10^{-8} \\ &= 10.90 \text{ Volts/turn} \end{aligned}$$

The track levitation loops have an impedance:

$$R+jX=157\ \mu\Omega+j(137)\ 0.98\ \mu\Omega \tag{6}$$

$$R+jX=206\ \mu\Omega\angle 40.6°$$

The induced current is:

$$I=10.90\ V/206\ \mu\Omega=52,912 \text{ Amps rms.}$$

The maximum lateral restoring current loading is therefor:

$$J = \frac{\text{Induced current}}{\text{lateral pole-pitch, } Tl} = \frac{52,912\ A}{0.683\ m} = 77,470\ A/m \tag{7}$$

The choice of lateral pole-pitch is directly related to maximum usable vehicle active undercarriage width or guideway width. The levitation loop area A=242 sq. in. (0.156 sq. m.) is the product of:

$$A=k_p T_p W \tag{8}$$

where:
$k_p$=pitch factor=0.93;
$T_p$=pole pitch (longitudinal)=0.54 m.; and

W=loop lateral width=0.311 m.
The force density is thus:

$$F = B \times J = 0.72 \text{ (Tesla)} \times 77{,}470 \text{ A/m} \quad (9)$$
$$= 55{,}778 \text{ N/sq. m.} = 8.14 \text{ PSI}$$

Thus to create a 300,000N (67,600 lb. f.) restoring force, a total surface area of 300,000/55,778=5.38 sq. m. per vehicle is required. This would take the final shape of an array of 8 to 12 vehicle magnets spanning a dimension: lateral pole-pitch+loop lateral width=0.683 m+0.311 m=0.994 m wide by 5.41 m longitudinal. This is acceptable and an efficient engineering layout for a full size vehicle of 3.5 m overall width and 15.8 m long.

In FIG. 3A the wholly electromagnetic, propulsion, levitation and guidance for vehicle 10 is achieved through the use of minimal electrical material along the guideway 11. The vehicle includes an outer shell 12 forming the sides and top of a passenger compartment 13 that is closed off by a decorative floor 14 comprised of wood, fiberglass or a composite. Underlying the floor is a laminated construction made up of alternating layers of ferromagnetic and non-ferromagnetic layers. The ferromagnetic layers are identified by reference numerals 16 and 17 and electrically conductive layers are identified by reference numerals 15 and 18. The purpose of the laminated sub-floor construction is to attenuate alternating current fields with a minimum amount of material by weight and reduce the magnetic field exposure in the passenger compartment to industry accepted levels. The selection of materials and layer thicknesses are chosen according to the frequency spectrum of the impinging alternating current field. In furtherance to reducing the magnetic field exposure the laminated construction of layers 15-18 the shielding structure exists not only at the lower boundary of the passenger compartment but also extends downwardly therefrom along opposite sides as shown in FIG. 3A of the undercarriage of the vehicle 10 to maximize electromagnetic shielding.

Levitation magnets 20 and 21 are mounted in cryostat housings 22 and 23, respectively, that are in turn connected with cryogenic reservoirs 24 and 25, respectively. A cryogenic support system 26, per se well known in the art, includes a compressor to liquify a coolant medium of, for example, nitrogen or helium for supply as a cryogenic coolant medium to the housings 22 and 23 for the levitation magnets 20 and 21. Power pick-up collectors 27 protrude from opposite sides of the levitation vehicle 10 to engage contact strip conductors 28 extending along the guideway 11 to provide a source of on board poly-phase electrical power. The levitation magnets 20 and 21 are powered by a hybrid electrical power supplies 29 and 30, respectively, having both direct current, alternating current, variable-frequency output capacity. The power supplies 29 and 30 are fed from a phase rectifier and harmonics current filter 31 which is in turn powered from the power pick-up collectors 27. Each of the electrical power supplies 29 and 30 include thyristor control to select the power output in the form of a direct current or a variable, low frequency alternating current.

Typically, the frequency of the alternating current can be suitably controlled to select a desired frequency that can vary between 60 Hz and to such a low frequency so as to become direct current. The phase rectifier and harmonics current filter 31 preferably take the form of a phase-delay rectifier and inverter system provides a bi-directional power-flow characteristic that permits the flow of electric energy generated in the AC superconducting magnets back to the main vehicle power source or utility supply. The phase delay rectifier 31 includes means for dynamic braking of vehicle motion and return of vehicle kinetic energy to an alternating current sink such as a resistor grid by means of adjusting excitation frequency to create a slip value greater than 1.00 or reversing of phase sequence applied to said on-board superconducting electromagnetic coils. When the vehicle experiences a heave, yaw, roll, pitch or acceleration surge motion due to external forces, or the need to decelerate, alternate currents are induced with minimal internal loss due to the superconducting construction in the levitation magnets at the heave frequency or at a frequency corresponding to the vehicle motion and pole pitch relationship with the majority of vehicle-motion induced power being returned to the power line rather than being dissipated within the magnet structure. Consequently, the use of a bi-directional power system onboard the vehicle permits regeneration of electric power to the power supply, reduces the heat dissipation in the AC levitation magnet and assists the propulsion system in decelerating the vehicle by electrodynamic forces. Propulsion motors 33 and 34 are powered by a variable voltage, variable frequency current derived from inverters 35 and 36, respectively, that are controlled by a phase delay rectifier and harmonic filter unit 37 which is fed by electrical power from collector 27. Motors 33 and 34 can be either normal conducting or superconducting alternating current motors.

The guideway 11 includes a vertical pillar 41 at each of predetermined spaced intervals along a coarse of travel by the vehicle 10. Each pillar 41 supports a cross beam 42 extending transversely of the extended length of the guideway and forms a rigid support for a U-shaped guideway comprised of a base 43 and upwardly extending limbs 44 and 45. The cross beam 42, base 43 and limbs 44 and 45 are preferably constructed from structural, non-ferromagnetic material. The base 43 is fitted with spaced apart and generally parallel secondaries 46 each comprised of a non-ferromagnetic electric conductive strip 47, such as aluminum, superimposed on a ferromagnetic flux return plate 48. Each strip is suitably anchored to the base 43 within longitudinal recesses formed in the material of the cross beam so as to present a generally smooth top beam surface. The strips of the secondary 46 are spaced apart by a distance corresponding to the spacing of the levitation magnets 20 and 21 such that the primary magnetic flux path of the respective magnets is perpendicular to the plane of the magnets which is parallel with the undercarriage of the vehicle. It is to be understood that two pairs of levitation magnets 20 and 21 will be strategically arranged along the vehicle undercarriage according to the length of the vehicle, passenger loading and desired suspension height.

In the embodiment of the invention as shown in FIG. 3A, extending along the path of travel by the vehicle at the upper portions of each limb 44 and 45 is a secondary 49 comprised of a non-ferromagnetic electric conductive strip 50, such as aluminum, superimposed on a ferromagnetic flux return plate 51. The secondaries 49 are suitably anchored within longitudinal recesses formed in the material of the limbs 44 and 45 so as to present a generally smooth exposed surface. The secondaries 49 are arranged in generally confronting and parallel relation with the expected path of travel by the transverse flux propulsion motors 33 and 34 at opposite sides of the vehicle and serve the combined function of guidance and propulsion of the vehicle along the guideway structure. It is to be understood, however, that diverse electromagnetic machines may be used to fulfill the function of propulsion and guidance. Air gap sensors 52 and 53 are mounted on the vehicle undercarriage and directed toward the underlying base 43 for providing electrical signals corresponding to the levitation air gap at opposite lateral sides of the vehicle. Additionally, there are provided air gap sensors 54 and 55 mounted on the vehicle undercarriage and directed laterally outwardly toward the vertical faces of the limbs 44 and 45 for providing electrical signals corresponding to a lateral air gap between the vehicle and the guideway structure 11.

An especially important feature of the present invention arising out of the AC magnetic fields produced by the levitation magnets 20 and 21 is the bi-directional attractive/repulsive forces between the primaries, namely magnets 20 and 21 and the secondaries 46. The levitation system as powered by the alternating current magnet at a selected frequency is fully functional to levitate the vehicle at a zero velocity with respect to travel along the guideway. Similarly, the vehicle can be completely levitated at very low vehicle velocity along the guideway. In the known prior art discussed hereinbefore, this was not possible because the electrodynamic schemes were not functional throughout a speed range up to about approximately 30 km per hour due to the direct current field excitation of the vehicle levitation magnets whereby the nature and magnitude of the induced current in the guideway was non-functional to produce the required repulsive forces to levitate the vehicle. The same inability to operate at slow speeds occurs with respect to electrodynamic machines operating with direct current field excitation on the vehicle primary electrical member.

Figure 3B:
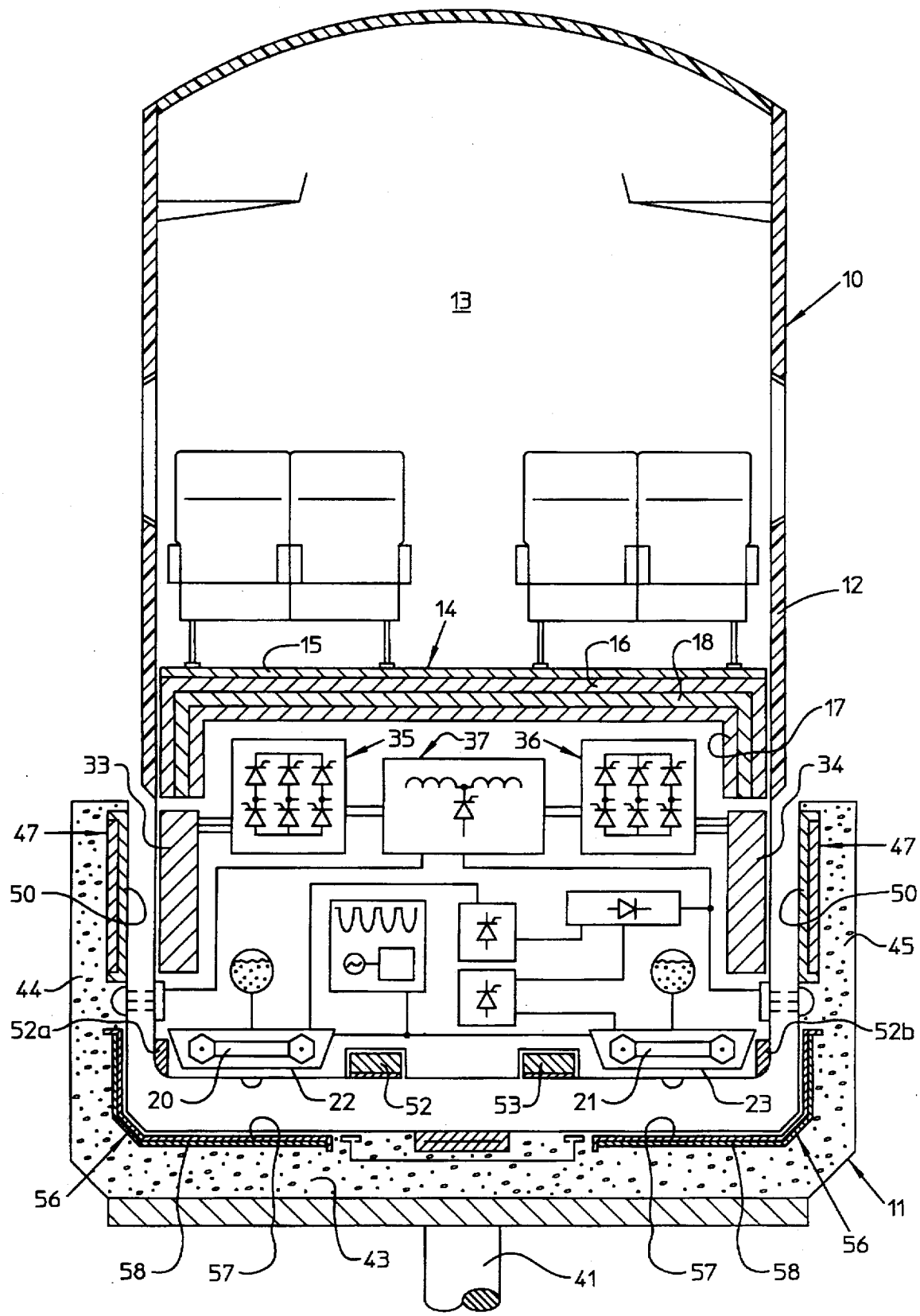

In the embodiment of FIG. 3A, the secondaries 46 are comprised of a sandwiched arrangement of flat plates forming the strip 47 and plate 48. In the second embodiment of magnetically suspended vehicle shown in FIG. 3B, modified secondaries 56 are provided for levitation of the vehicle. The modified secondaries include conductive levitation strips embodying a construction that offers an added advantage of stabilizing the levitated vehicle laterally of the guideway in relation to the intended direction of motion of the vehicle along the guideway. For this purpose as shown in FIG. 3B, the guideway and vehicle is the same as that shown in FIG. 3A and accordingly the same reference numerals and description is equally applicable. The secondary members 46 of the arrangement shown in FIG. 3A have been modified and take the form of an L-shape in cross-section. The secondaries 56 extending along opposite lateral sides of the guideway 11 where they are embedded and supported by both the base 43 and an associated limbs 44 and 45. The secondaries 56 are arranged such that the long leg of the L-shape extends horizontally along the base 43 while a short leg extends vertically in an upward direction along the limb to an elevation which corresponds to a horizontal plane forming the upper limit to the most elevated portion of the cryogenic housings 22 and 23 of the levitation magnets when the vehicle is levitated. The secondaries 56 each include an L-shape flux reaction plate 57 made of aluminum with an exposed face surface directed toward the bottom and side part of the undercarriage of the vehicle. Embedded in the limb and covered by the flux reaction plate is an L-shape ferromagnetic plate 58. The upwardly extending leg portion of the secondaries 56 located at opposite lateral sides of the vehicle serve to not only laterally stabilize the vehicle during movement along the guideway, but also guide the vehicle between the limbs.

Figure 3C:
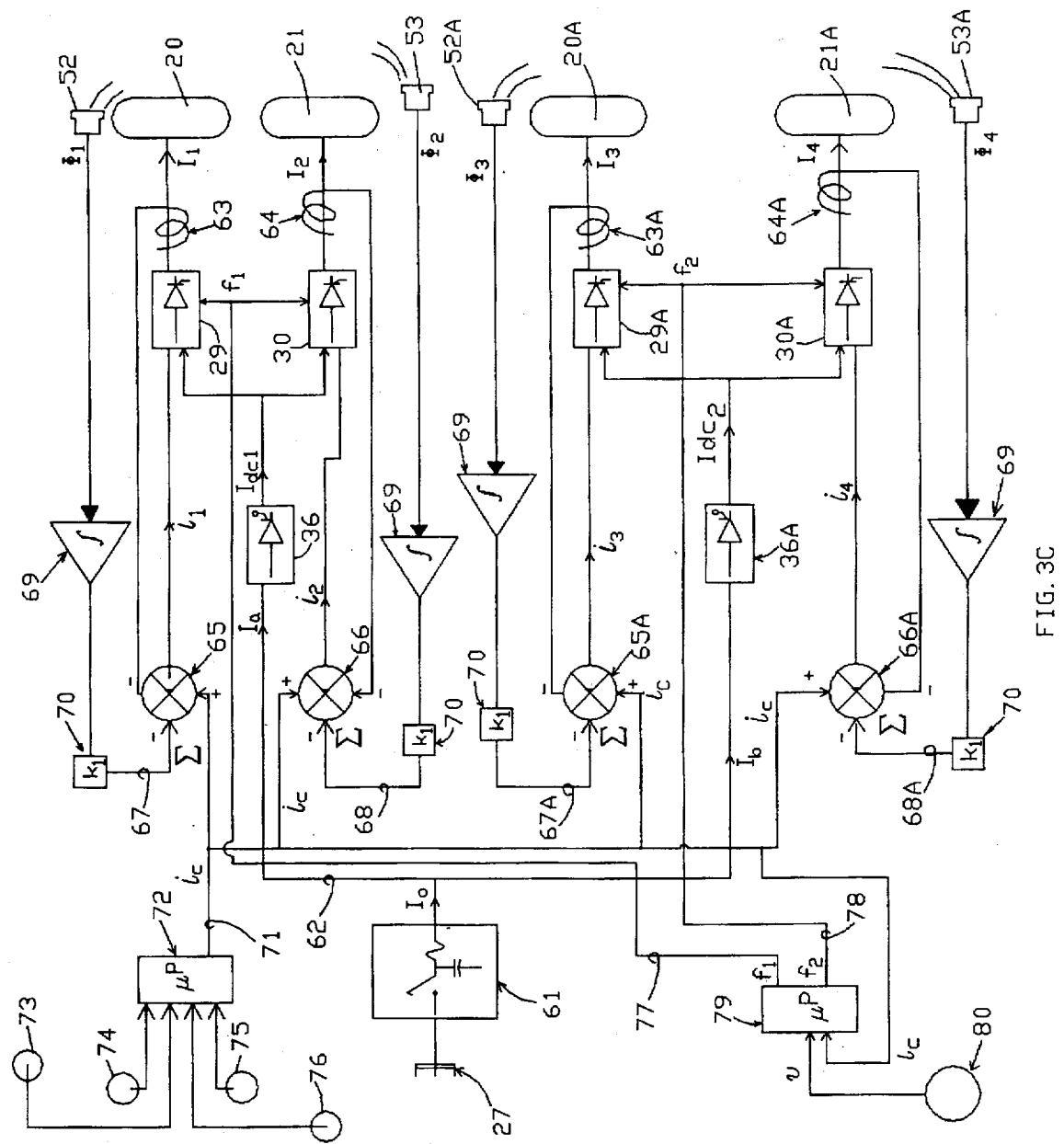
FIG. 3C is a schematic illustration of a control system suitable for use in each of the embodiments of a magnetically-suspended vehicle shown in FIGS. 3A and 3B.

FIG. 3C shows the control system for a 2×2 array of magnets on the underside of the vehicle 10 which are powered by alternating current for levitation and control using feed back control loops incorporating three main sensors. The 2×2 array of magnets are identified by reference numerals 20, 21, 20A and 21A and the associated levitation airgap sensors are identified by reference numerals 52, 53, 52A and 53A. For the purpose of description only, let it be assumed that the levitation magnets 20 and 21 are at opposite sides of one end of the vehicle 10 and that levitation magnets 20A and 21A are at opposite sides of the vehicle. Similarly, air gap sensors 52 and 53 which are spaced apart are in close proximity with magnets 20 and 21, respectively, and air gap sensors 52A and 53A are in close proximity with magnets 20A and 21A, respectively. Current for the levitation magnets is supplied as described previously through collectors 27 that are coupled to a input line protection circuit 61 which includes a surge protector, fusing and harmonic current filter to the electric current which is distributed by supply line 62 to bilateral power converters 36 and 36A forming AC to DC phase delay rectifiers such as thyristor regulator rectifiers. Converter 36 supplies current to hybrid electrical power supplies 29 and 30 and converter 36A supplies current to hybrid electrical power supplies 29A and 30A.

The current delivered from power supplies 29, 30, 29A and 30A to the associated respective magnets 20, 21, 20A and 21A, respectively is detected by in-line current sensors 63, 64, 63A and 64A each providing a signal applied to summing circuits 65, 66, 65A and 66A, respectively, corresponding to the current applied to the associated levitation magnet. The summation circuits also receive inputs appearing on lines 67, 68, 67A and 68A representing an auxiliary current command signal each derived from their respective air gap sensor signal modified as a function of an integrator 69 and the operation of a multiplier 70. A further input to each of the summing circuits 65, 66, 65A and 66A is a signal appearing on line 71 representing a current control modification signal appearing at the output of a current-command microprocessor 72 having multiple input parameters including a sensor 73 responsive to the weight of the vehicle, a sensor 74 representing the levitation height of the vehicle, a sensor 75 representing the loop characteristics of the levitation system and a sensor 76 representing an emergency shut-down command. The summing circuits 65, 66, 65A and 66A responding to their respective inputs provide a control signal which is applied to the respective ones of the hybrid electrical power supplies 29, 30, 29A and 30A. The power supplies 29 and 30 are responsive to a frequency control signal appearing on line 77 and the power supplies 29A and 30A are responsive to a frequency control signal appearing on line 78. Lines 77 and 78 comprise outputs of a master frequency controller 79 which receive inputs that include a signal of a vehicle speed sensor 80 and the current control modification signal appearing on line 71. The controller 79 includes internal circuitry that provides a look-up table for optimum magnet current AC frequency versus speed for maintaining levitation efficiency. The levitation frequency versus vehicle speed increases allowing the signal appearing on line 77 to be different from the signal appearing on line 78.

In the embodiments of FIGS. 3A and 3B, the magnets 20 and 21 contain a ferromagnetic core composed of a laminated high magnetic permeability steel which has virtually-zero eddy current heating loss at a 20 Hz excitation frequency. Using commercially available high permeability silicon-cobalt-vanadium steel such as Hiperco 50A produced by Carpenter Technology, Inc., the AC specific loss for the magnet core is 0.35 watts/lb at 20 Hz with a 0.18 mm lamination thickness.

Superconductor Choice

Four general types of superconducting wire/tape based upon currently available materials are suitable for use in a levitation magnet according to the present invention. These wire/tape superconductors are:

TABLE 1

Type A: $Nb_3Sn$ in bronze-matrix, tape conductor operating at 8° K nominal;

Type B: NbTi in copper matrix, wire conductor operating at 4.2° K;

Type C: BSCCO-2223 in silver matrix, tape conductor operating at 20°–27° K nominal; and Type D: TBCCO-2223 in silver matrix, tape conductor operating at 77°–80° K nominal.

Selected from the above choices is a suitable commercially-available low-temperature NBTi; alternating current superconducting wire is manufactured by GEC-Alsthom of France for 50 Hz alternators. It has the following characteristics:

| | |
|---|---|
| overall diameter | .030 mm |
| filament diameter | 136 nano-meters |
| no. of filaments/wire | 920, 304 |
| current capability at 1 Tesla | 150 amperes, 50 Hz |
| cross sectional area | .0706 sq. mm. |
| operating temperature | 4.2° Kelvin |
| nominal current density | 2124 A/sq. mm. |
| material type | niobium-titanium |
| matrix material | copper-30% nickel |

One suitable high temperature superconducting wire has a tape like configuration, constructed of 0.2 mm thick×2.0 mm wide tape, operating at a combined wire and matrix current density of 10,000–12,000 A/sq.cm. The current industry practice at the time of invention is to identify a conductor by its voltage drop per unit length at the rated current; if the voltage drop is less than or equal to 1.0 micro-volts per centimeter of length, then the material is presently classified as being a superconductor. As of the time of the invention, there exists both low temperature Type II superconductors operating in the range 4° K to 13° K with NbTi or $Nb_3Sn$ materials and high temperature superconductors operating in the range of 20° K to 150° K albeit with current densities lower than present Type II superconductors. The high temperature superconducting tape is composite of a core made of Bismuth-Strontium-Calcium-Copper Oxide (BSCCO) in a tape sheathing made of silver. The wire is commonly referred to as a high temperature superconducting wire because the operating temperature of 77° K is attainable at high current densities in the range of 4000 to 10,000 amps per square centimeters in magnetic fields of 1.0 Tesla or greater.

A second suitable Type II superconducting wire is low temperature Niobium-titanium Type II wire operating at 4° K and comprised of six superconducting sub-wires around one non-superconducting central sub-wire. In a commercially available wire of this type from Alsthom of France, each superconducting sub-wire contains 320,304 NbTi filaments 0.16 µm diameter in a Cu-30% wt. Ni matrix. These wires operate in typically a 1–2 Telsa field at frequencies up to 50 Hz alternating current. In FIG. 4, the Alsthom superconducting AC wire characteristics for magnetic field versus applied frequency are shown by Case A for the range of 12–50 Hz based upon experimental data taken at Alsthom France. In FIG. 4 for the example of Case A, a theoretical limit of performance is denoted by plot 81 and plot 82 represents an operating curve with a safety margin.

An example of a third alternative excitation conductor is cryogenically cooled, very high purity aluminum (99.9% or greater pure aluminum) wire or tape when operated in the range of temperatures 20° K to 40° K whereby this material exhibits extremely low electrical resistivity of the order of $10^{-10}$ ohm-cm and allows a current density of 5000 amps per square centimeter or greater to exist with minimal temperature rise. One suitable cryogen that has been used previously for highly purified aluminum wire is liquid hydrogen when operated at its boiling temperature of 20° K. It is anticipated that further development will proceed on higher temperature Type II superconductors which will allow a change in cryogen and operation above 150° K with current densities of 10,000 amps per square centimeter thereby allowing a reduction in the size or weight of the liquefier or refrigerator used in conjunction with the magnet. It is further anticipated that development will proceed on cryogenically cooled conductors which are not classified as conventional Type II superconductors, but which exhibit enhanced electrical properties over existing cryogenically cooled metals thereby permitting a further reduction in system weight and cooling capacity requirements for the associated liquefier or cryogen reservoir. Cryogenically coiled aluminum is a variable conductor for use in AC levitation applications because it does not have an inherent limit on magnetic field or current density versus frequency as do conventional superconductors. FIG. 4 also shows a plot 83 of magnetic field versus applied frequency for the case of cryogenically cooled aluminum operating at 20° K denoted as Case B; the plot 83 shows a flat response of magnetic field versus frequency indicating there is no degradation to performance over the expected frequency range 0 to 50 Hz.

In the preferred embodiment, each vehicle has two transverse-flux magnet systems, operated independently or in unison, across the vehicle width. The mean width of a track coil may be reduced to 0.497 m for a 70-ton class vehicle or to 0.25 m for a 17.5 ton class-vehicle. The slow-speed MAGLEV vehicle may be configured as a 17.5 ton vehicle and thus the choice of the smaller vehicle magnet and narrower guidance reaction plate or loop is an important feature. The selection of the guideway secondary or reaction plate thickness is dependent on the pressure loading, vertical and horizontal, as well as the electromagnetic skin depth of induced eddy currents in the secondary member. The depth of electromagnetic penetration is:

$$\delta = \frac{1}{2\pi} \sqrt{\frac{10^7 \rho}{f \mu_r}} \text{ meter} \tag{10}$$

where:

f=frequency of induction from combined effect of vehicle motion and AC excitation i.e. f=fm+fe termed the summation frequency;

$\mu_r$=relative permeability; and p=conducting plate or ladder resistivity in ohm-meters.

For high density repulsive force production at zero or low speed, the excitation frequency should be kept at approximately 27 Hz and the thickness of the guideway conducting plate specified to be 1.2 times or greater than the depth of electromagnetic penetration at zero speed. For example at zero speed and using aluminum 6101-T64 conductor:

$\mu_r$=1.0;

p=$2.7 \times 10^{-8}$ ohm-m at operating temperature; and f=27 Hz summation frequency.

Therefore, according to equation 10, $\delta$=0.0159 m.

In practice, the conducting plate would be 120% of the depth of penetration or in this particular example 19.1 mm thick. As the vehicle speed rises, it is appropriate to either reduce AC excitation frequency to insure that the summation frequency, f, remains near constant or reduce the thickness of the guideway conductor in relation to the reduction depth of penetration. For example, at the higher induction frequency at a speed of 13.3 m/s, the motion frequency=fm= V/2T$_p$=13.3/2 (0.675)=9.85 Hz, the excitation frequency may be reduced to 27−9.85 Hz=17.15 Hz.

Figure 5:
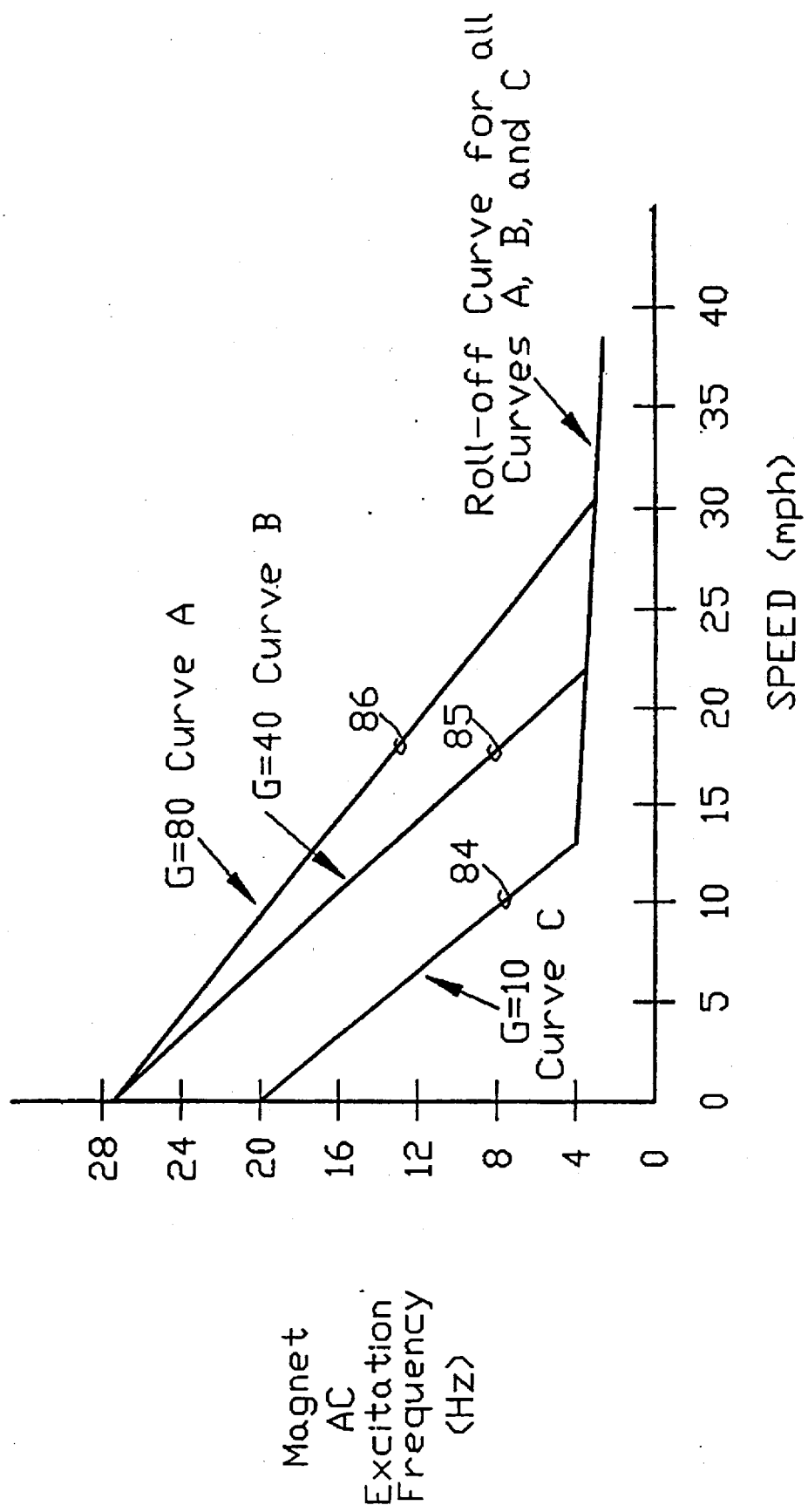
FIG. 5 is a plot of excitation frequency versus vehicle speed.

FIG. 5 shows a schedule of frequency versus speed for a representative maglev vehicle intended for 60 mph maximum cruising speed and excitation up 27 Hz. The design parameter G, magnetic Reynolds number, is plotted by lines 84, 85 and 86 for three cases G=10, G=40 and G=80, respectively.

The magnetic Reynolds number is defined as:

$$G = \frac{2 T_p^2 \, u_0 \, \text{ft}}{\pi \, ge \, Pr \, K} \tag{11}$$

where:

T$_p$=primary pole -pitch (m);
u$_0$=free=space permeability;
f=excitation frequency;
t=thickness of secondary electrical conductor (m);
ge=effective primary-secondary electromagnetic air gap;
Pr=surface resistivity of secondary electrical conductor (ohm-m); and
K=multiplier for surface resistivity to account for side-bar currents in longitudinally oriented conductor in guideway, separate from main path currents.

The other critical variable which is under direct control by the inverter power supply is the electromagnetic slip value, defined as:

$$\delta = \frac{Vs - Vm}{Vs} \tag{12}$$

where:

Vs=synchronous field speed (m/s); and
Vm=mechanical speed of vehicle (m/s).

The product of slip (δ) times Reynolds number is the major defining parameter which defines whether a given physical size of levitation magnet can levitate a given percentage (e.g. 59%) of the total vehicle weight; this parameter is termed α=δG.

The other defining parameter is derived from Faraday's Law for induction around a closed loop and is rewritten as:

$$Pr \, Js = Bz(y) \, Vm(x) \tag{13}$$

where:

Js=surface current loading at secondary conductor (guideway) surface expressed in ampere-turns per meter longitudinal; and
Bz=the normal-oriented component of magnetic flux density at the surface of the guideway, mean value at center of guideway.

This shows for certain values of B-field and vehicle speed there is an optimum surface-resistivity current-loading product to balance this voltage-induction relationship. The last defining parameter is z-directional levitation forces normalized as a pressure F(z) determined as the cross product of the lateral field Bz(y) times the longitudinal current loading Js(x) which is given in terms of N/sq.m of surface area as:

$$F(z) = Bz(y) \times Js(x) \tag{14}$$

Practical levitation systems operate from 8 to 25 PSI (or 55,000 N/sq. m to 171,000 N/sq. m) when superconducting magnets are used. Substituting equation (14) into (13) we have:

$$Pr \, Js^2 = F \, Vm \tag{15}$$

which indicates that the guideway conductor surface dissipation must equal the apparent mechanical power of levitation force times propulsion velocity. The apparent mechanical power is different from the actual mechanical propulsion power. It should be stressed that the surface current loading is different from current density in the present invention as current loading is directly equal to magneto-motive force (MMF) or ampere-turns in a given linear direction whereas current density describes the total amperes in a given cross-section. In the preferred embodiment, the guideway conductor configuration allows high current loadings but retains low current densities and consequently high overall levitation efficiency.

Figure 6A:
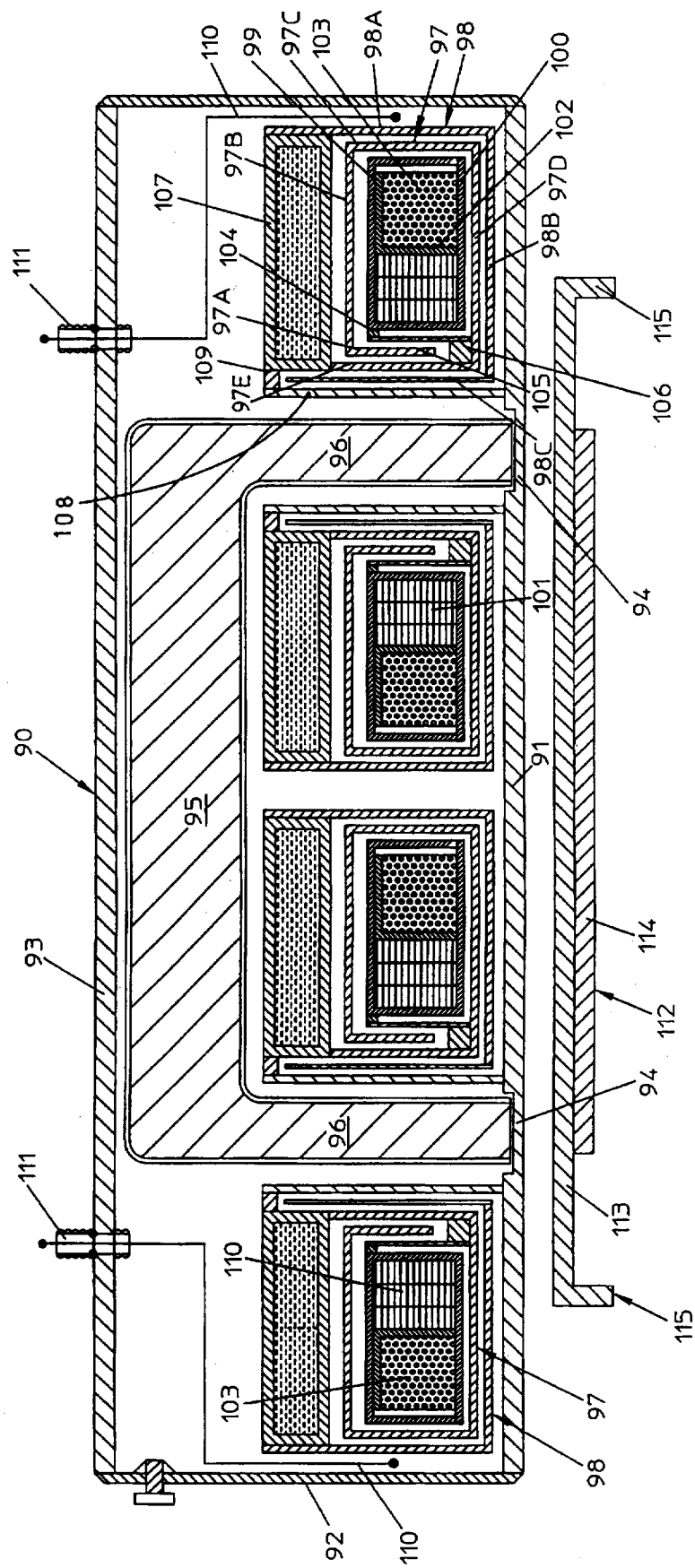
FIGS. 6A and 6B are cross-sectiOnal and plan views, respectively, of the C-core primary structure.

FIG. 6A shows a two-dimensional view of the preferred embodiment which is a two-limb ferromagnetic core with dual set of excitation coils mounted as physically close to the vehicle-guideway airgap as possible, with allowances for cryostat, damper shield and coil support apparatus thickness. The main ferromagnetic core is U-shaped or C-shaped depending on the design trade-off between magnetic and electric materials. The U-shaped primary core allows a higher proportion of excitation coil area and retains long pole-pieces or limbs with a higher degree extension and consequently less window area for excitation coils, indicating a lower leakage flux and requiring a higher current density in the excitation coils to produce a given MMF.

Figure 6B:
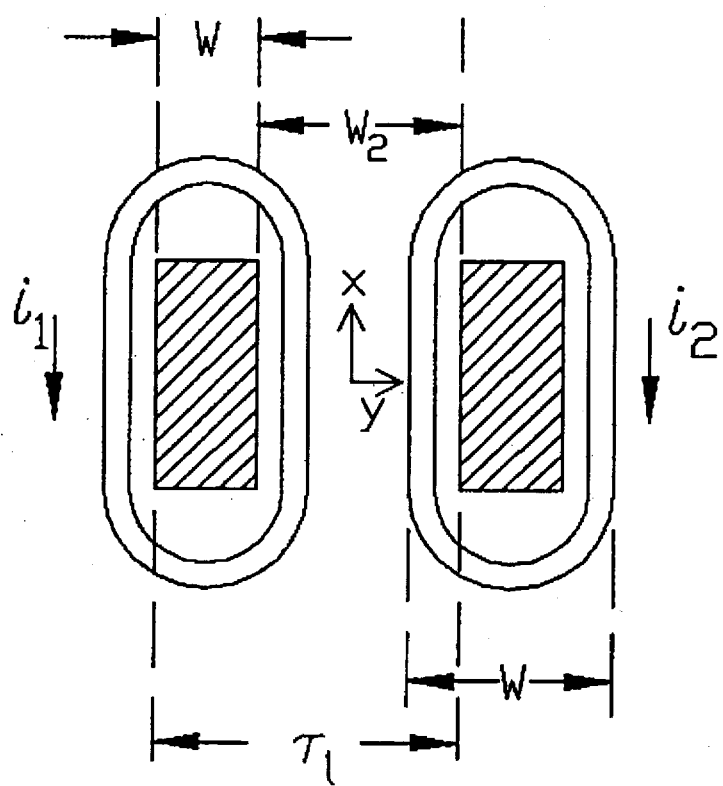

In FIGS. 6A and 6B, there are illustrated details of the construction of one embodiment of AC excited superconducting magnet 90 suitable for use as a primary member in the electro dynamic repulsive system of the present invention. The superconducting magnet 90 includes a outer housing made up of a non-conductor base 91 joined with an outer, generally cylindrical sidewall 92 that is in turn joined with a top cover 93. The base 91 has recesses 94 serving to locate the end faces of a core 95 which has laminated ferromagnetic construction and configuration of a "C", thus named a C-core. The core is composed of high magnetic permeability steel which has a virtually zero eddy current heating loss at a 20 Hz excitation frequency. One suitable material is Hiperco 50-A as discussed hereinbefore. Encircling each limb 96 of the C-core are inner and outer thermal shielding assemblies 97 and 98, respectively. The inner thermal shield is made up of plate sections 97A, 97B, 97C, 97D and 97E joined together in an edge-to-edge fashion to form a hollow thermally protective cavity 99. Plate sections 97A, 97C and 97E have a cylindrical shape and plate sections 97B and 97D have a circular ring shape. The cavity 99 is thus formed for a low temperature environment wherein there is situated a coil form 100 defining an annular compartment wherein there is located an electrical coil 101 made up of wraps of a desired one of the excitation conductor wire described hereinbefore.

A separator 102 divides the compartment of the coil form to form a compartment 103 for a volume of a cryogen such as liquid nitrogen or helium. The coil form 100 is joined by a spacer ring 104 that is in turn joined by a thermal barrier plate 105 to a spacer ring 106 that is mechanically connected to the inner shield at the junction between plate sections 97D and 97E. The outer thermal shield 98 is made up of plate sections 98A, 98B and 98C connected in an edge-to-edge like fashion. The plate sections 98A and 98C have a cylindrical shape and plate section 98B has a circular ring shape. Plate section 98A is mechanically joined to the wall of a cryogen reservoir 107 and plate section 98C is situated in an interleaving fashion between plate section 97E also joined to the reservoir 107 and a cylindrical mounting plate 108. The mounting plate 108 is mechanically connected to the reservoir 107 by a spacer ring 109. Plate 108 is joined at its free end to the face surface of base 91. While not shown, a suitable conduit is provided to supply cryogen from the reservoir 107 to the compartment 103 to maintain a suitable quantity for operating the magnet at a predetermined operating temperature which is selected according to the parameters particularly the make-up of the wire in the coil form. A plurality of electrical supply lines 110 are distributed in the gap between wall 98A of the outer shielding and sidewall 92 of the magnet. The electric supply lines are passed from the internal area of the magnet 90 to sites where there is provided a seal assembly or electrical bushing 111 and thence to the external electrical power source.

The secondary 112 forms an electrical member made up of two components which comprise a conductive plate 113 extending in a continuous fashion along the guideway for the vehicle and a ferromagnetic magnetic flux return plate 114 which has a lateral width corresponding by design to the overall width of the C core 95 as shown in FIG. 6A. The plate 113 is provided with L shaped end extensions 115 extending in a direction away from the magnet for enhancing the lateral restoring force of the system for guiding the vehicle. Plate 114, if desired, may take the form of a laminated stack of thin sheet members whose thickness is determined by the magnitude of the eddy current losses resulting from the alternating magnetic flux impinging on the plate.

As shown in FIG. 6B, which is a top-view of a one-sector C-core magnet the lateral pole-pitch is denoted as $T_1$ in the embodiment of the C-core transverse flux guidance magnet. The pole pitch $T_1$ must be larger than the overall width $W_1$ of one magnet side pole to account for the dimension $W_2$ spacing between the inner magnetic limbs occupied by the windings as shown in FIG. 6B. The dimension W is the transverse width of a single limb of the magnetic core at the air gap surface. The dimension W2 is used to design the electromagnetic levitation height to optimize levitation efficiency for a given amount of electric and magnetic materials. In general, the dimension W2 is sized larger than the maximum expected electromagnetic airgap dimension. The direction of excitation currents in each one of the two coils is shown by notation $i_1$ and $i_2$ for the case of producing additive MMF, this being the preferred embodiment. In the illustration of FIG. 6C there is shown an airgap and internal flux lines in a half-width geometry of a particular physical arrangement for a full-load is a magnetic flux plot of a C-core AC-excited levitation magnet.

Figure 7A:
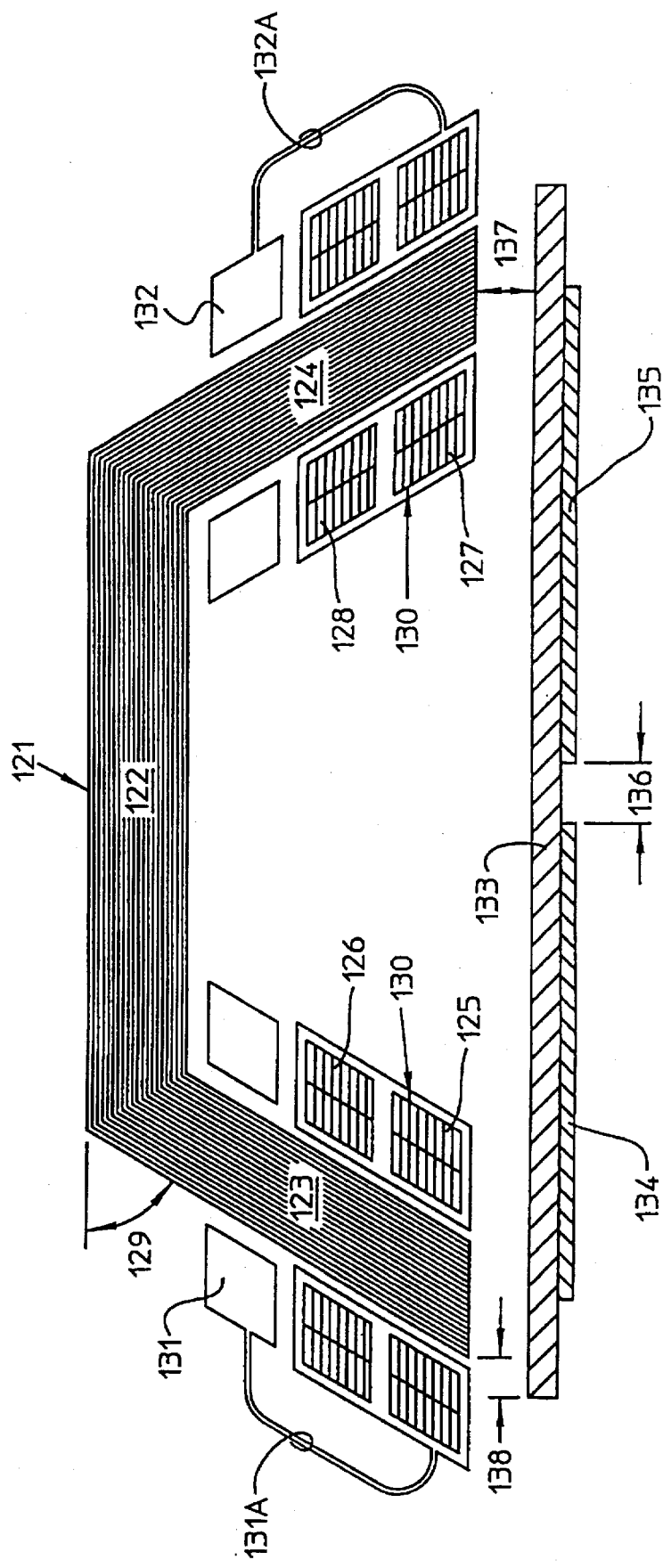
FIGS. 7A and 7B shows two modified embodiments of C-core levitation device suitable for forming transverse flux magnets one having an obliquely arranged and the other having an obtusely arranged side limbs with respect to the yoke of the magnetic core.

FIG. 7A shows a modified embodiment of a C-core magnet according to the present invention which includes a ferromagnetic primary core 121 having a core yoke portion 122 from which there extends at opposite ends two obliquely angled side-limbs 123 and 124 for the purpose of maximizing the transverse airgap between side-limbs. This design thus has a low magnetic leakage flux in comparison with parallel type side limbs in a C-core configurations and also makes efficient use of the laminated, magnetic iron of the core yoke portion 122. Excitation coils 125 and 126 are in an individual containment housing but stacked and encircle limb 123; similarly excitation coils 127 and 128 are in an individual containment housing but stacked and encircle limb 124. The excitation coils 125, 126, 127 and 128 are specially oriented such that the long face of the coiled wire formed by the superconductor or normal conductor is perpendicular to the edge of the magnetic side limbs 123 and 124 as indicated by the angle 129 to cause magnetic flux component 130 to be parallel to the long face of the associated one of the excitation coils 125, 126, 127 and 128 for the purpose of reducing to a minimum the eddy current losses and heating in the coil comprised a low temperature conductor or superconductor.

In addition to the limb orientation shown in FIG. 7A, the embodiment preferably utilizes a wire with a flat shape arranged such that the thinnest dimension is parallel to the magnetic side limb. If a superconductor wire is used, a multi-filamentary conductor is necessary. In the previous Table 1, a suitable conductor produced by GEC Alsthom has 920,304 filaments of niobium-titanium of a diameter of 136 nano-meters, in an effort to keep eddy current and hysteresis losses to a minimum. The embodiment of obliquely arranged side limbs 123 and 124 utilizes a cryogen reservoir 131 and 132 for each limb connected by associated respective manifolds 131A and 132A to supply the excitation coils with either a liquid or gaseous cryogen. In the embodiment of FIG. 7A a secondary is formed by a secondary reaction plate 133 having at the side thereof remote to the limbs 123 and 124 spaced apart ferromagnetic plates 134 and 135. Plates 134 and 135 are spaced apart along edges by a gap identified by reference numeral 136. The secondary reaction plate 133 is comprised of a conductive, non-magnetic material and spaced from the pole face of limbs 123 and 124 to form an airgap identified by reference numeral 137. The overhang of the secondary reaction plate 133 beyond the outer most edges of the side limbs is identified by reference numeral 138.

Figure 7B:
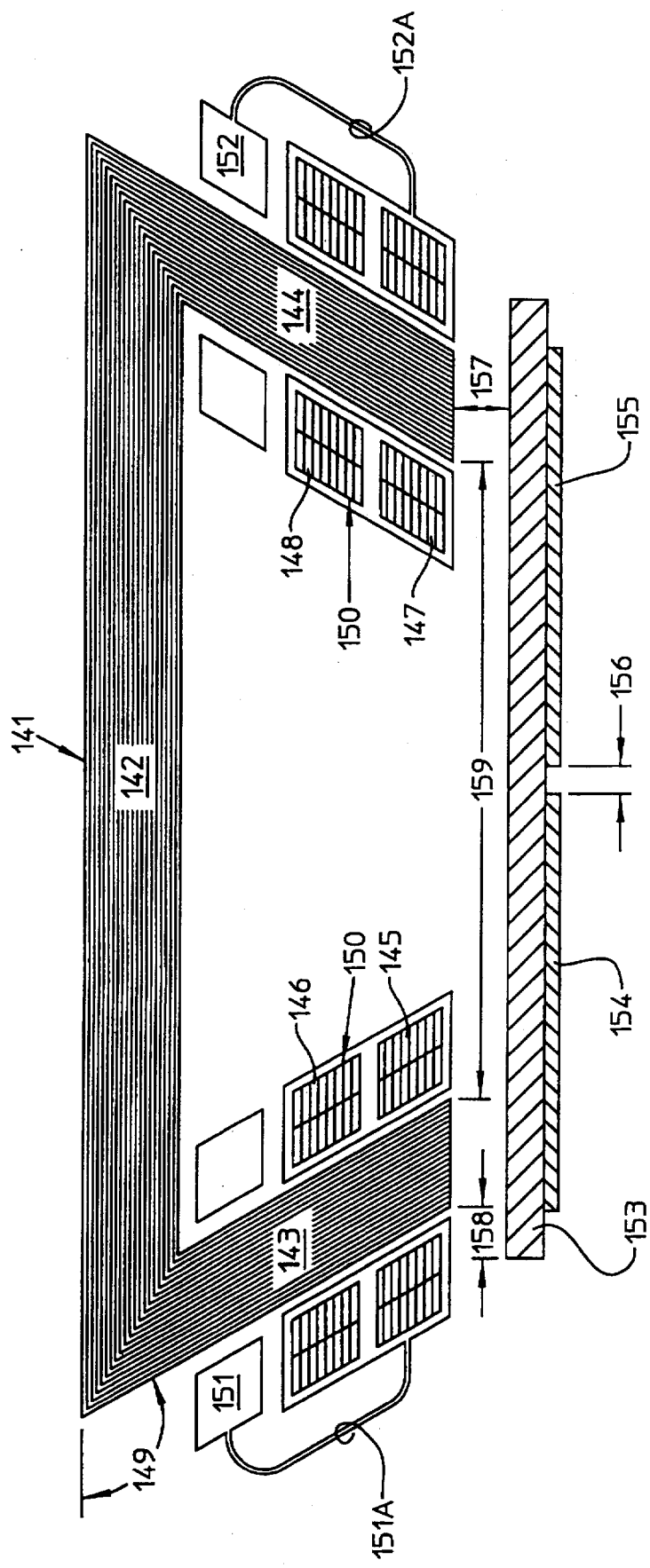

FIG. 7B shows a further modified embodiment of a C-core magnet according to the present invention which includes a ferromagnetic primary core 141 having a core yoke portion 142 from which there extends at opposite ends two obtusely angled side-limbs 143 and 144. Excitation coils 145 and 146 are placed in the same containment housing where they are stacked and encircle limb 143; similarly excitation coils 147 and 148 are placed in the same containment housing where they are stacked and encircle limb 144. As in the embodiment of FIG. 7A, the excitation coils 145, 146, 147 and 148 in the embodiment of FIG. 7B are specially oriented such that the long face of the coiled wire formed by the superconductor or low temperature conductor is perpendicular to the edge of the magnetic side limbs 143 and 144 as indicated by the angle 149 to cause magnetic flux component 150 to be parallel to the long face of the associated one of the excitation coils 145, 146, 147 and 148 for the purpose of reducing to a minimum the eddy current losses and heating in the coil comprised a low temperature conductor or superconductor.

In addition to the limb orientation shown in FIG. 7B, the embodiment preferably utilizes a wire with a flat shape arranged such that the thinnest dimension is parallel to the magnetic side limb. If a superconductor wire is used, a multi-filamentary conductor is necessary. In the previous Table 1, the conductor produced by GEC Alsthom has 920,304 filaments of niobium-titanium alloy of a diameter of 136 nano-meters, in an effort to keep eddy current and hysteresis losses to a minimum. The embodiment of obtusely arranged side limbs 143 and 144 utilizes a cryogen reservoir 151 and 152 for each limb connected by associated respective duct 151A and 152A to supply the excitation coils with either a liquid or gaseous cryogen. In the embodiment of FIG. 7B a secondary is formed by a secondary reaction plate 153 having at the side thereof remote to the limbs 143 and 144 spaced apart ferromagnetic plates 154 and 155. Plates 154 and 155 are spaced apart along edges by a gap identified by reference numeral 156.

The secondary reaction plate 153 is comprised of a conductive, non-magnetic material and spaced from the pole face of limbs 143 and 144 to form an airgap identified by reference numeral 157. The overhang of the secondary reaction plate 153 beyond the outer most edges of the side limbs is identified by reference numeral 158. The gap 156 between the ferromagnetic plates 154 and 155 extends longitudinally along the secondary to prevent the flow of electrical eddy currents laterally across the plates and enhance the overall levitation efficiency. The magnitude of the gap 156 should be less than 15% of gap 157. Conversely, the reaction plate 153 should have continuous electrical continuity across the entire lateral dimension of the secondary so as to maximize the flow of electrical eddy currents. The arrangement shown maximizes flux density component emerging from the pole face surface and the lateral component of flux density along the airgap surface between the secondary and the pole face while minimizing the lateral leakage component of flux.

Figure 8:
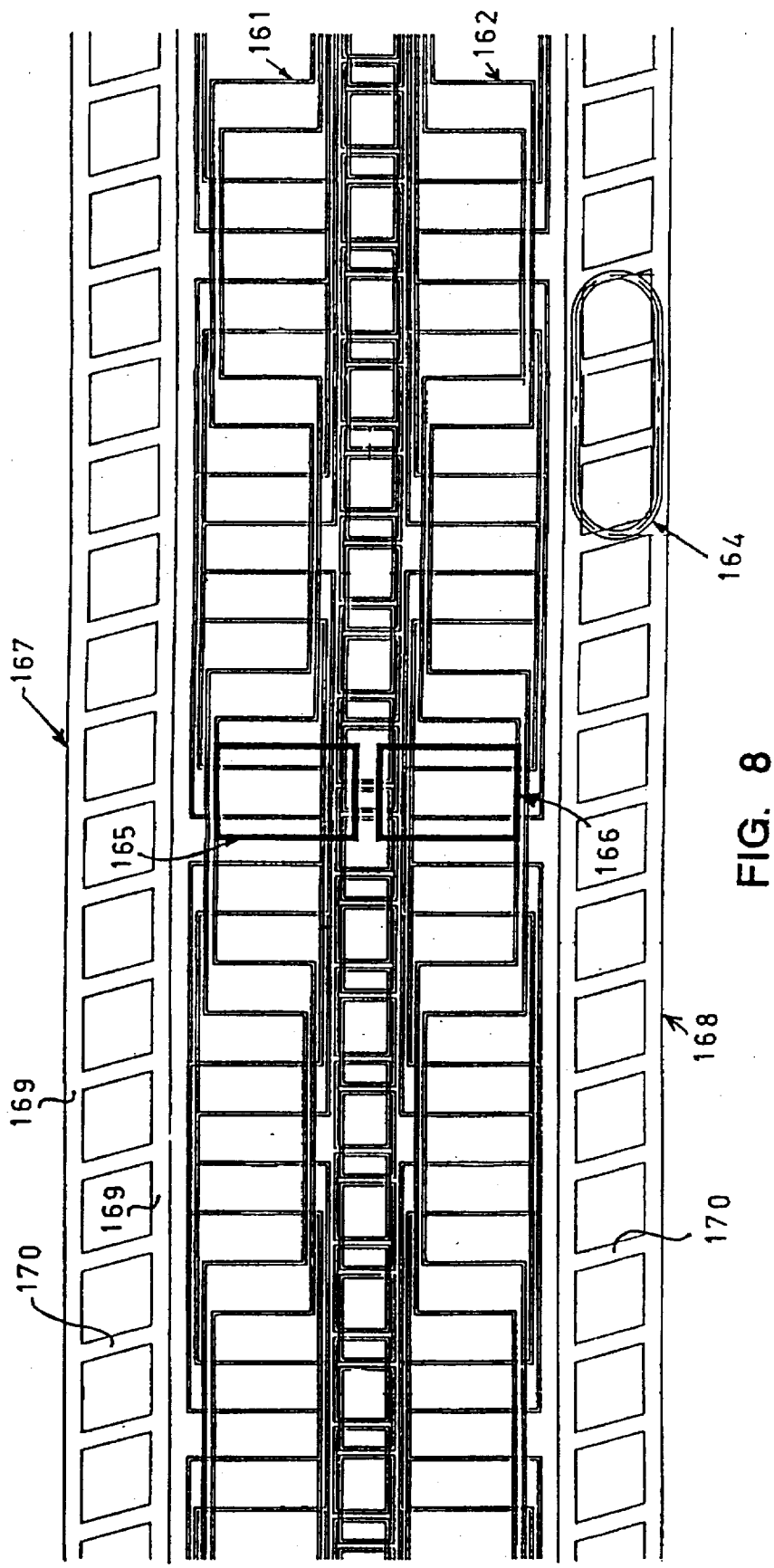
FIG. 8 is a plan view of a modification for the propulsion of a magnetically levitated vehicle using a dual linear synchronous motor for propulsion and a segmented ladder arrangement of the guideway mounted levitated strip interacting with an onboard superconducting levitation magnet.

In FIG. 8 shows the plan view depicting a modified form of secondaries to that previously described and shown in the embodiments of FIG. 3A and 3B. In FIG. 8, the propulsion armature windings on the propulsion windings 161 and 162 comprise a liner synchronous motor which interact with a plurality of field coils 165 and 166 on the undercarriage of the vehicle, which are preferably superconducting DC-excited field coils arranged in a N-S-N-S-, etc. array pattern. Along opposite sides of the propulsion windings 161 and 162 there extends a ladder configuration of discrete levitation conductor secondaries 167 and 168. The secondaries 167 and 168 each comprise longitudinally extending side rail conductor sections 169 that are inner connected at spaced apart interval rung sections 170. As will be described in greater detail herein after the space between adjacent rungs is chosen so.that at least two rungs always confront the same levitation magnet 164.

Reference will now be made to graphs of FIGS. 9A, 9B and 9C for examining the electrical performance of an alternating current levitation system according to the present invention using as an example calculations for conditions typical of a large vehicle with a speed range from zero through 120 km/h. At the each corner of the vehicle there are at least two superconducting AC magnets with overall length 1.35 m and spaced longitudinally at a pitch $T_p$ of 1.42 m. The following equation describes the relation between the AC excitation frequency ω and the vehicle velocity, V, (in meters/sec) for a given pole-pitch $T_p$:

$$\omega = \pi V/T_p \text{ radians/sec.} \quad (16)$$

where:
  velocity, V is in meters/seco

Table 2 gives representative values of AC excitation frequency $f=\omega/2\pi$ for a range of speeds from 61 to 488 km/h and typical magnet design parameters.

TABLE 2

| Frequency (Hz) | Velocity (m/s) | Velocity (km/h) |
|---|---|---|
| 6 | 16.9 | 61 |
| 12 | 33.9 | 122 |
| 18 | 50.8 | 183 |
| 24 | 67.8 | 244 |
| 48 | 135.6 | 488 |

The magnet parameters:
  Pole Pitch: 1.42 m.;
  Electromagnetic Airgap: 21 cm.;
  Magnet Excitation 632 k.A.T.; and
  Magnet Dimensions: L=1.32 m., W=0.26 m., H=0.045 m.
The guideway reaction ladder characteristics are:
  Conductor Material Aluminum 6101-T64;
  Ladder Width: 0.260 m.;
  Ladder Longitudinal dimension: 0.361 m.; and
  Ladder rung pitch: 0.471 m.

Figure 9A:
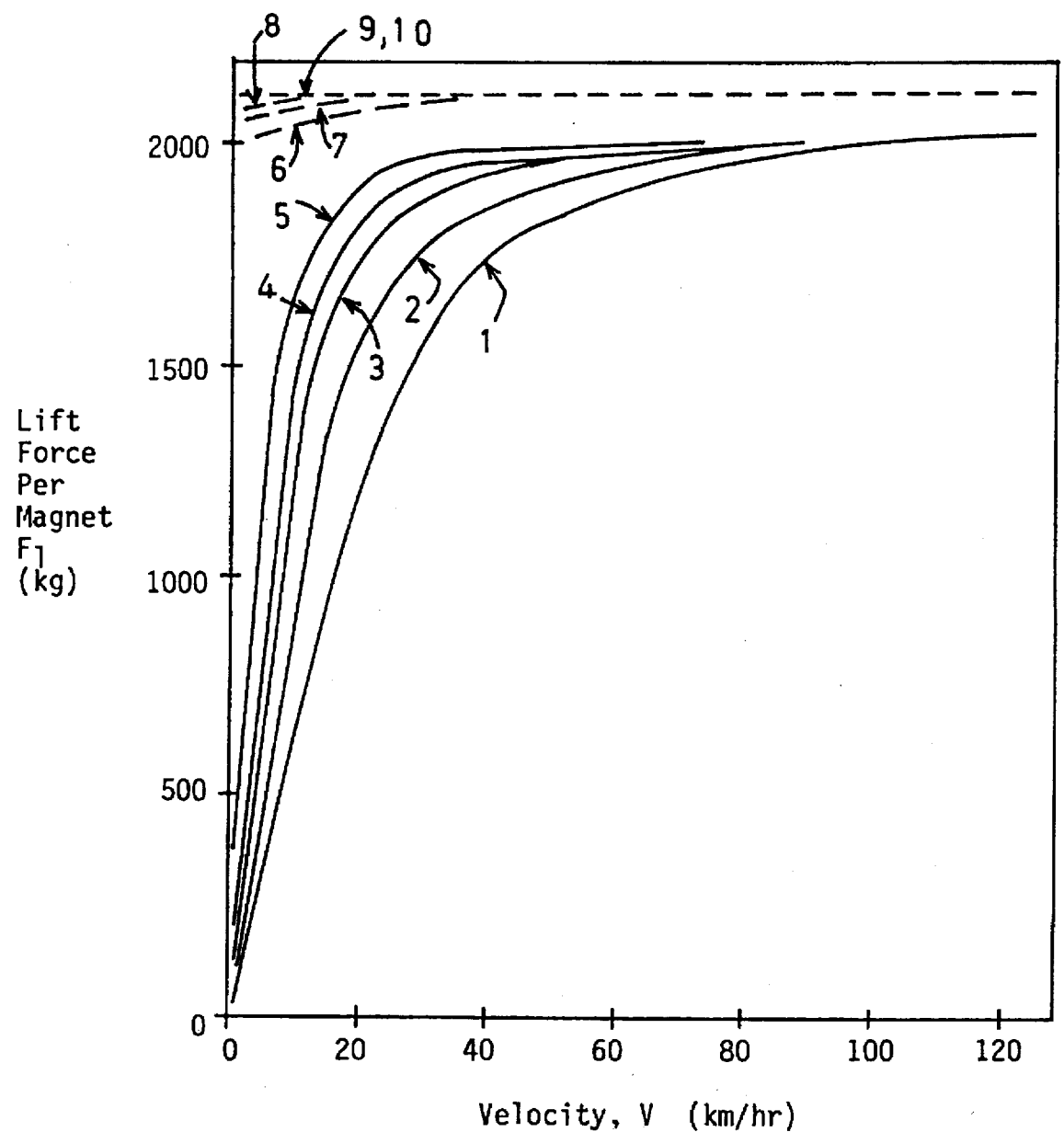
FIGS. 9A, 9B and 9C are plots showing velocity versus lift force, drag force and lift to drag ratio, respectively, for a magnetically levitated and guided vehicle according to the present invention and comparison to prior art DC excited levitation magnet.

FIG. 9A shows the result of a parametric three-dimensional computer study of the electromagnetic lift force generated as a function of vehicle speed for the case of five different values of guideway levitation ladder time constants as indicated in Table 3.

TABLE 3

Figure 9B:
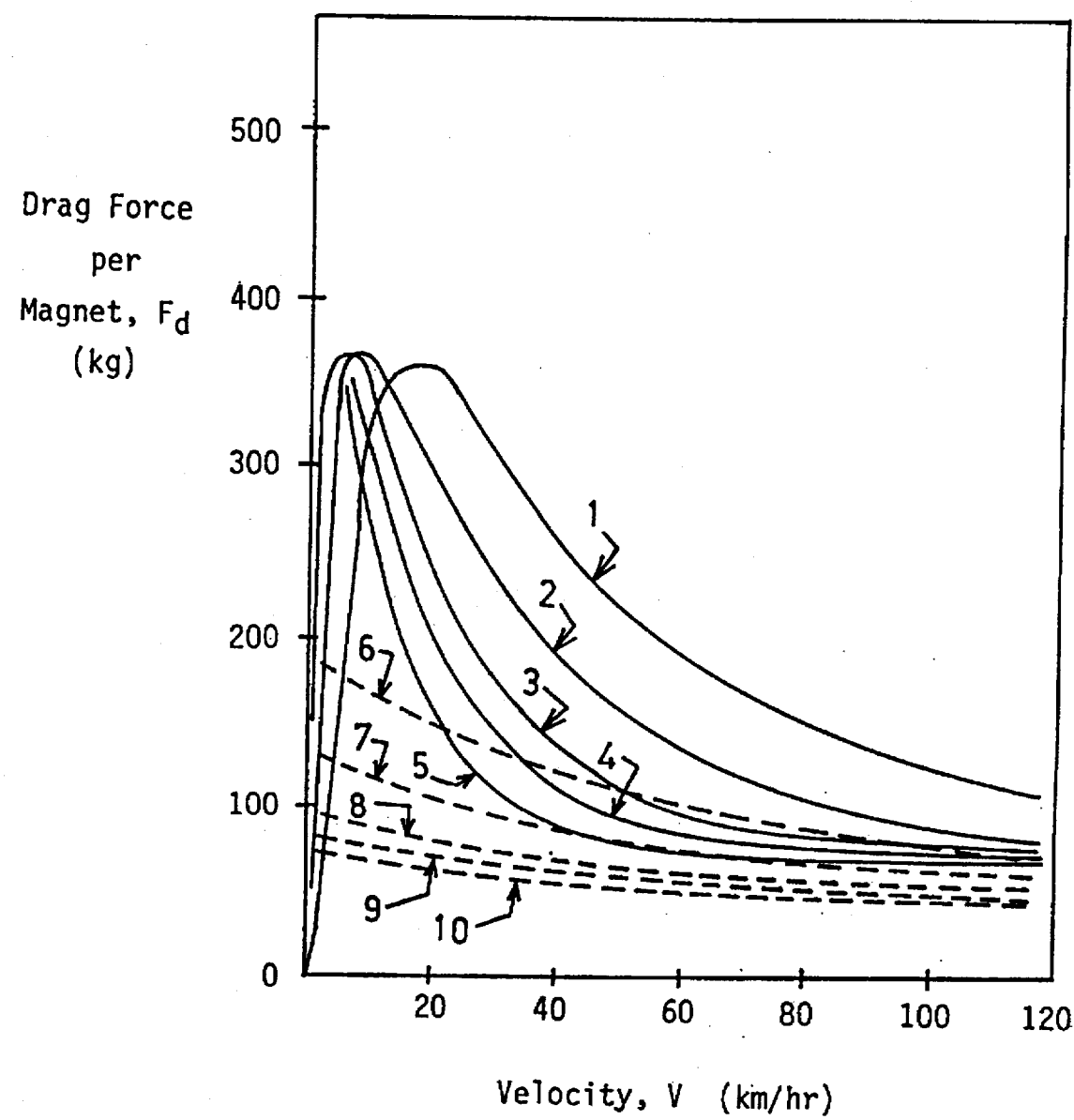
Figure 9C:
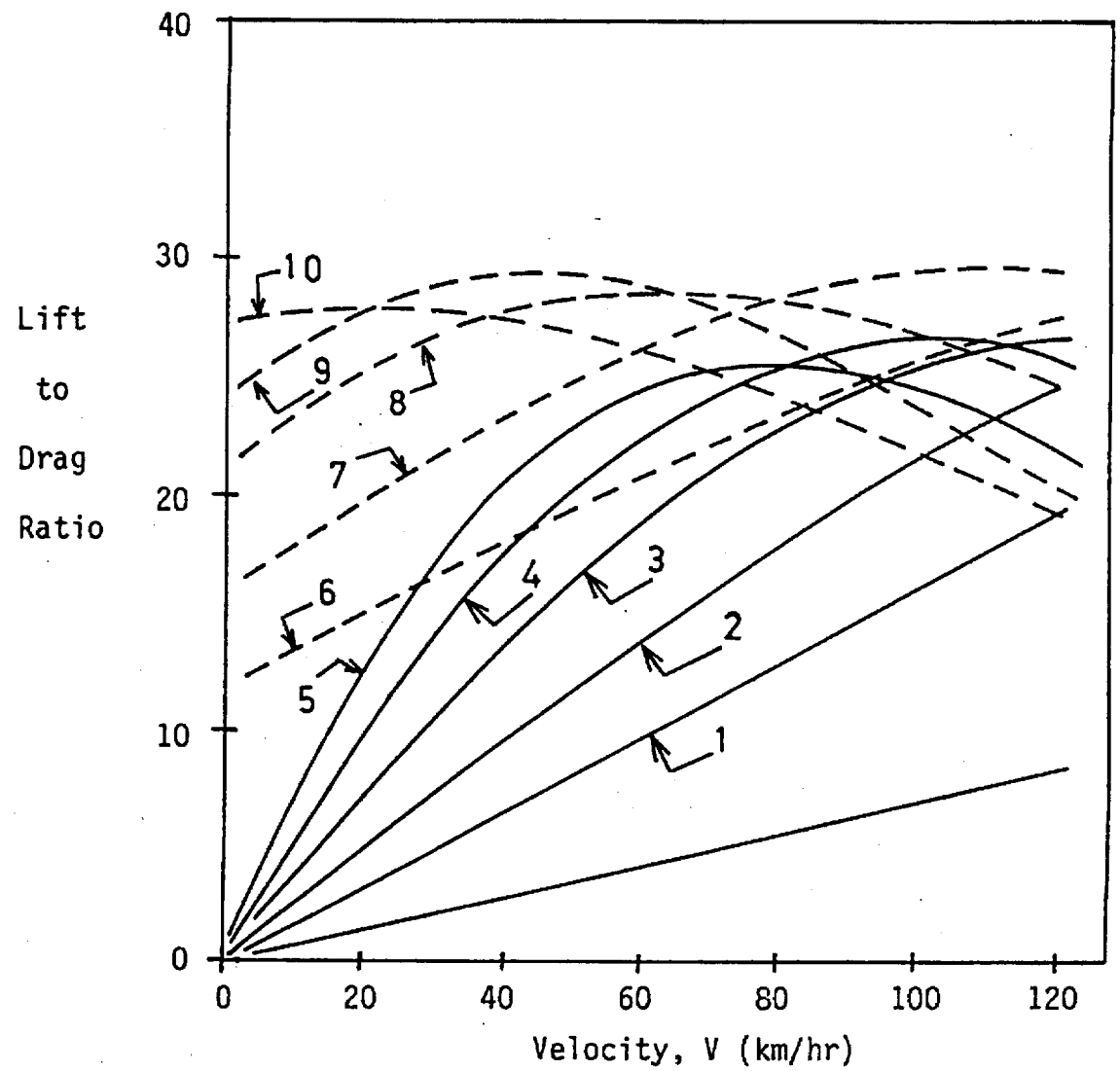

Time Constants and Inductances of the Magnetic Levitation Loops used in FIGS. 9A, 9B and 9C.

|  | Time Constant (sec.) | Inductance (mH) |
|---|---|---|
| Case 1, 6 | 0.093 | 6.79 |
| Case 2, 7 | 0.140 | 10.9 |
| Case 3, 8 | 0.202 | 16.9 |
| Case 4, 9 | 0.253 | 22.2 |
| Case 5, 10 | 0.343 | 32.6 |

Cases 1–5 are for use of prior art technology with DC magnet excitation and Cases 6–10 are for the use of alternating current at 6.0 Hz in each levitation magnet, subject of the present invention. The Cases 1–5 clearly show a velocity dependent buildup of lift force from 0–80 km/h whereas for cases 6–10 the levitation force is nearly constant from zero through the top speed considered (120 km/h). The lower the time constant in each category, the slower the buildup of lift force. Cases 9 and 10 show a constant lift force of 2100 kg over the entire range of speeds.

FIG. 9B shows the electromagnetic drag force as a function of speed for the 10 cases noting that the higher the time constant, the lower is the drag force, for both prior art and for the subject invention. This study concludes that the prior art produces about 367 kg/magnet of drag (between zero and 18 km/h) whereas the AC excitation produces a maximum of kG drag/magnet for Case 6 and 73 kg drag/magnet for Case 10, at zero speed.

FIG. 9C shows the ratio of Lift-to-Drag for the 10 sample cases as a function of vehicle speed and at 6.0 Hz AC excitation for Cases 6–10. Table 4 summarizes the peak values and the locations for the peak L/D ratios.

TABLE 4

| Lift: Drag Ratio Corresponding to FIG. 9C | | |
|---|---|---|
| Case | L/D | Peak at Speed (km/h) |
| 1 | 28 | off-chart |
| 2 | 27 | off-chart |
| 3 | 26.7 | 120 |
| 4 | 26.5 | 105 |
| 5 | 25.7 | 74 |
| 6 | 30 | off-chart |
| 7 | 29.5 | 110 |
| 8 | 28.7 | 55 |
| 9 | 29.0 | 40 |
| 10 | 27.8 | 10 |

Figure 10:
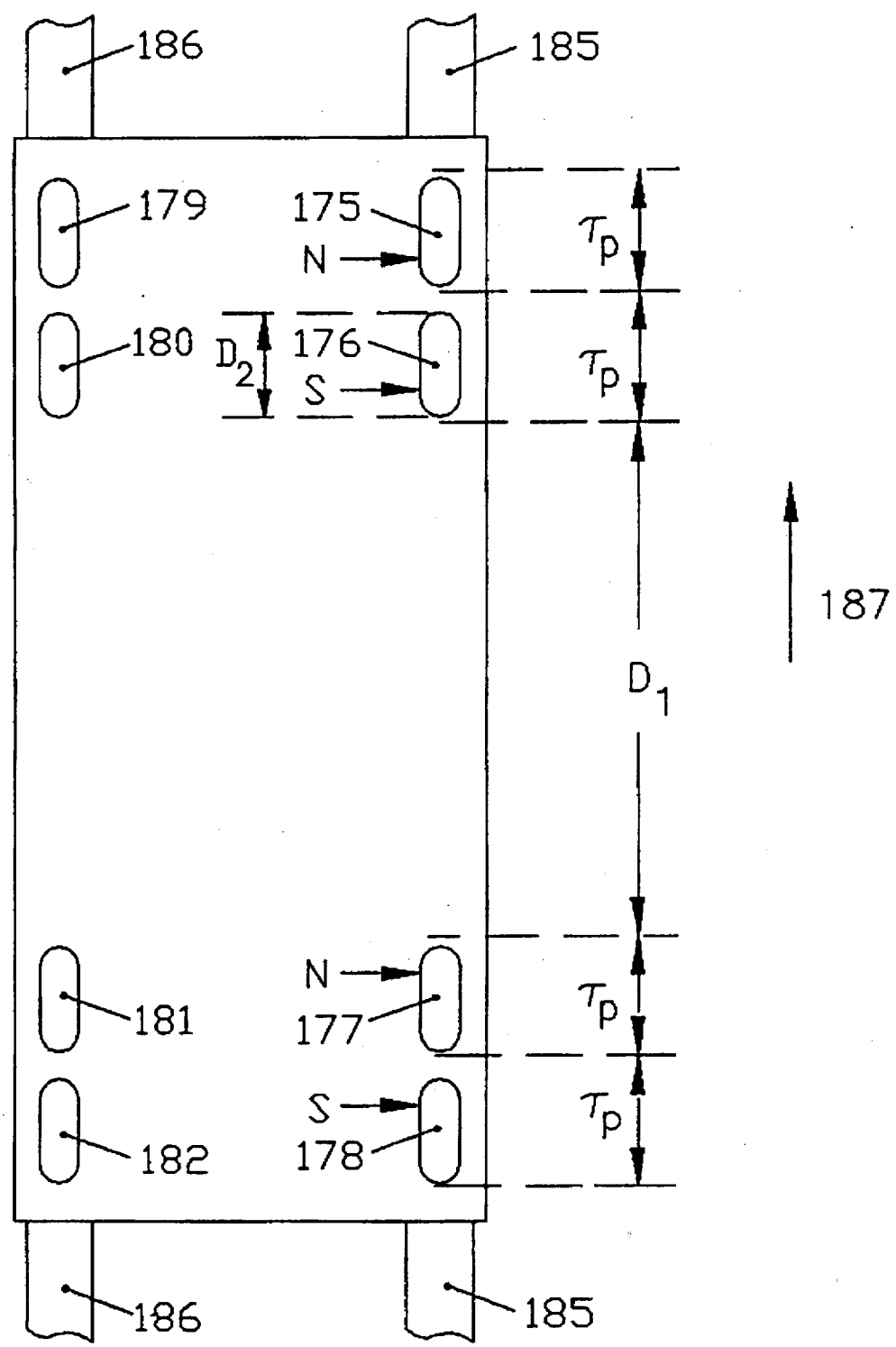
FIG. 10 is a schematic plan view of a vehicle with eight magnets arranged with two magnets per corner and phased with adjacent magnetshaving 180° phase difference.

An important aspect of the present invention resides in the creation of bipolar magnetic field with a corresponding North-South alternating current field pattern in the guideway conductive plate. In general, this cannot be accomplished by use of a singular lap-wound levitation coil at each corner of vehicle because front and rear levitation magnets at each side of the vehicle are longitudinally separated by a distance that is greater than a wavelength of the excitation. For efficient low speed levitation there is provided a scheme to create an alternating-polarity magnetic field pattern so that the excitation frequency can be tapered off aS a function of speed and that the multi-polar longitudinal arrangement of magnets can be produced. One such scheme is shown in FIG. 10 wherein levitation magnets 175, 176, 177 and 178 are on one side of vehicle and levitations magnets 179, 180, 181 and 182 are on the opposite side of the vehicle. These levitation magnets are located at each corner of vehicle as pairs of magnets comprised of groupings 175, 176; 176, 178; 179, 180; 181, 182. The pairs of magnets are spaced at a longitudinal pitch Tp. Each magnet is of longitudinal dimension $D_2$ for the dimension of the overall length. To create the bipolar or alternating field in the secondaries comprising guideway conductors 183 and 184 it is necessary to phase alternating current supplies to the magnet pairs 180° out of phase for adjacent pairs of magnets which is shown diagrammatically in FIG. 10 with a north and south requirements as N-S-N-S designation. If the dimension D1 is greater than 6Tp, then it is insignificant whether the phasing is N-S-N-S or N-S-S-N in a four magnet array consisting of magnets 175–178 as well as magnets 179–182. However, if the inequality holds D1<6Tp, then it is necessary to phase the front magnet array 175 and 176 in relation to the direction of travel by the vehicle indicated by arrow 185 to boost the magnetic field created by the rear magnet array, 177 and 178 by the following rule:

TABLE 5

| For: | Phasing Magnets 175, 176, 177, 178 |
| --- | --- |
| D1 = 1.0 Tp to 1.3 Tp | N-S-S-N |
| D1 = 1.3 Tp to 1.7 Tp | Not to be implemented |
| D1 = 1.7 Tp to 2.3 Tp | N-S-N-S |
| D1 = 2.3 Tp to 2.7 Tp | Not to be implemented |
| D1 = 2.7 Tp to 3.3 Tp | N-S-S-N |
| D1 = 3.3 Tp to 3.7 Tp | Not to be implemented |
| D1 = 3.7 Tp to 4.3 Tp | N-S-N-S |

The above layout scheme resolves that when the spacing D1 is close to an intermediate magnet interval such as 1.5 Tp, 2.5 Tp, 3.5 Tp, 4.5 Tp or 5.5 Tp, then this spacing creates an interference pattern whereby the front and rear magnetic pairs buck each other's magnetic flux and reduce levitation efficiency. It is an objective of magnet phasing by this array is to create electromagnetic field conditions similar to a traveling magnetic electromagnetic field conditions with a multiplicity of excitation poles despite the discontinuity of excitation poles. The magnetic field is attenuated at entry and exit edges of the magnet pairs in accordance with how rapidly the induced track current decays behind each magnet pair, following the direction of motion according to the relation defining the track induced current between magnet pairs:

$$I = I_o \, e^{-(x/v)Td} \quad (17)$$

where:

$$Td = \frac{Tp^2 \mu_0 t}{\pi^2 Pr\,g_e K} \quad (18)$$

x=longitudinal distance from exit-edge of magnet 176 or 178;
v=vehicle velocity in direction of arrow 187; and
ge=effective airgap between primary and secondary members.

The terms were previously defined in the expression for Reynolds number. In the preferred embodiment, the numerical values given in Table 2, yields:
Td=0.472 seconds.

At a speed of, for example, 20 m/s, the current in the guideway conductor will have decayed in 5.0 meters to $e^{-(5/20)/0.472} = 0.588$ per unit of the full induced current Io, indicating that phasing between magnets pairs is crucial.

Figure 11:
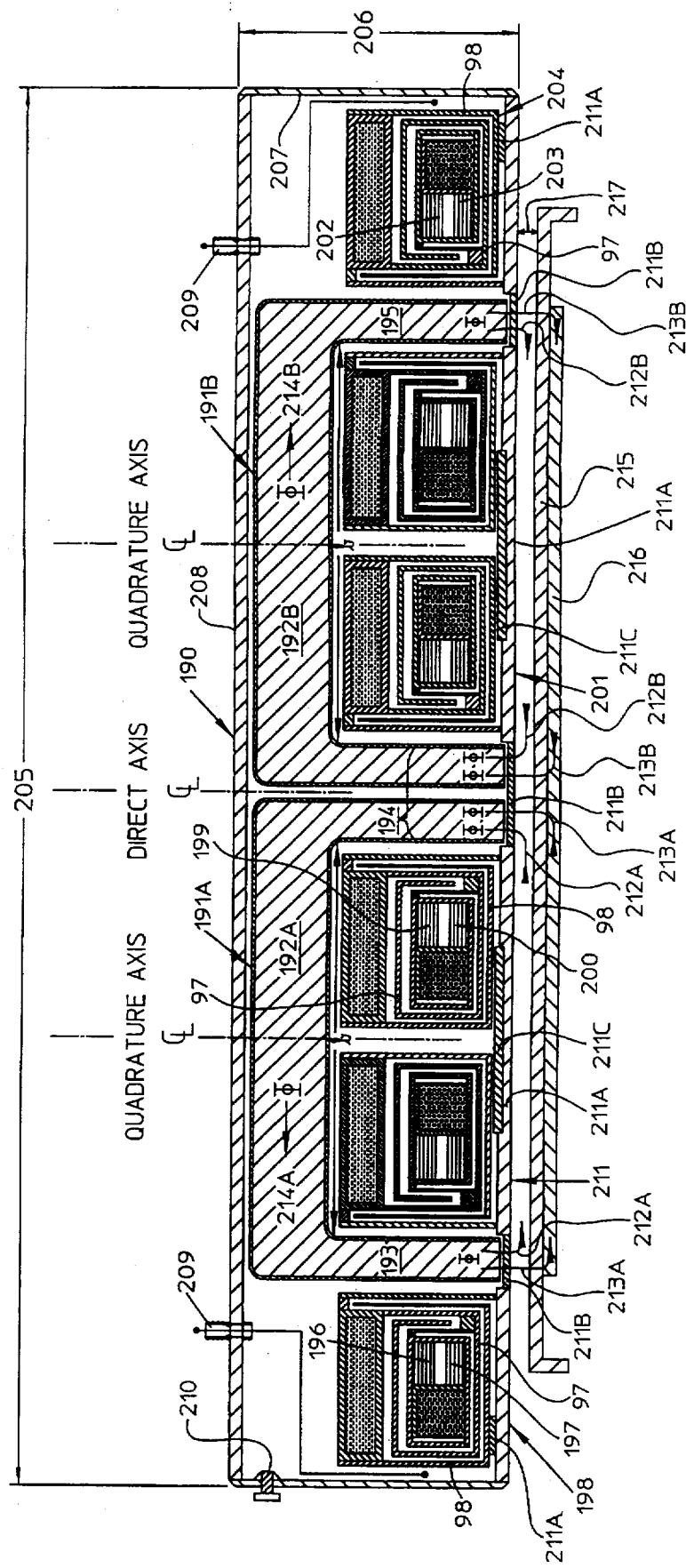
FIG. 11 shows a cross-section of a modified core arrangement in the form of a three-limb ferromagnetic core used for the levitation magnet primary structure with six excitation coils fitted per magnet.

FIG. 11 illustrates a further embodiment of an AC excited superconducting magnet 190 which includes a two element ferromagnetic primary core 191A and 191B having a laminated construction and a configuration consisting of a core portions 192A and 192B and three limbs 193, 194 and 195 in the shape of an "E" thus named an E-core The E-core arrangement provides three primary limbs having end faces directed toward the air gap between the vehicle and guideway. The three limbs 193, 194 and 195 are each encircled by a stacked arrangement of two excitation coils. Thus limb 193 is encircled by coils 196 and 197 fitted within a cryostat that essentially includes a housing structure 198 incorporating inner and outer thermal shielding 97 and 98, as previously described hereinbefore in the embodiment of FIG. 6A. Limb 194 is encircled by coils 199 and 200 fitted within a cryostat that essentially includes a housing structure 201 incorporating inner and outer thermal shielding 97 and 98, as previously described hereinbefore in the embodiment of FIG. 6A. Limb 195 is encircled by coils 202 and 203 fitted within a cryostat that essentially includes a housing structure 204 incorporating inner and outer thermal shielding 97 and 98, as previously described hereinbefore in the embodiment of FIG. 6A.

Magnet 190 further includes a housing whose overall length is indicated by reference numeral 205 and height is indicated by reference numeral 206. The housing is made up of a sidewall 207, a non-ferromagnetic, high resistance outer cryostat top wall 208 fitted with bushings 209 for passing current leads to the interior of the housing for supplying power to the various levitation coils. The sidewall is provided with a fitting 210 connected to a vacuum port for maintaining a sub-atmospheric pressure inside the housing to thereby facilitate the maintenance of the desired low temperature environment for the levitation magnets. A quadrature axis damper shield 211 of the magnet housing embodies a composite construction that includes metal wall sections 211A such as aluminum and non-conductive wall sections 211B such as composite, fiberglass material that directly underlie each pole face of limbs 193, 194 and 195.

Due to the required presence of alternating current fluxes and the structure to form and maintain the cryostats, the wall sections 211B must be fabricated from a non-conducting composite material or a high-strength, non-ferromagnetic, high-resistance alloy such as Inconnel 718 to minimize eddy current losses and eddy current magnitude. However, in the interest of providing an electromagnetic damper, an insert plate 211C of a highly-electrically conductive material is fitted in the magnet interpolar axis for three purposes:

a. To act as an electromagnetic shield against impinging fields generated by the oscillatory motion of the vehicle or any AC component of guideway-oriented currents;

b. To act in reducing magnetic leakage flux components $\Phi 212A,212B$ and $\Phi 213A,213B$ to a minimum; and c. To provide additional mechanical support for the outer containment structure which is preferably a composite structure and the lowest part of the under carriage structure, immediately facing the guideway.

This interpolar damper, 211C two of which are provided per magnet system, is also termed the quadrature-axis (or Q-axis) damper shield in conformance with generalized electrical machine theory. In general, this damper should not be laminated but rather composed of a solid, monolithic structure with a provision to link, electrically the left and right side Q-axis dampers to provide a return path for the induced electric currents. Note that the width of each insert plate 211C comprising the Q-axis damper circuit does not exceed the "B" window dimension and physically the Q-axis damper should not touch cryostat structure 98 indicating that a vacuum or insulating material, should be sandwiched these two members.

Clearly in the interests of attenuating a specific spectrum of guideway-generated field harmonics due to either vehicle random motion or switch-section spatial harmonics, a multiple-layer Q-axis damper shield may be implemented whereby each layer has a different electrical resistivity, vertical thickness or slightly different width less than dimension B. Thus each layer may be designed to best attenuate a specific spatial or temporal harmonic. Suitable means of cooling the Q-axis damper shields are either by use of the auxiliary cryogen e.g., liquid-nitrogen, chilled water or freon with means of fastening capillary tubes to said damper shields. In general, the left and right side damper shields should be of identical construction and symmetrical in layout.

The path of main magnetic flux $\Phi$ in limb 194 is the total effective airgap flux at the center of the magnet and is in a transverse direction of vehicle movement. The leakage flux from core portion 192A not crossing the airgap is identified by reference 212A and with respect to core 192B identified by reference numeral 212B. The flux linking the secondary due to excitation of core 192A is identified by reference numeral 213A and with respect to core 192B identified by reference numeral 213B. The main core flux in the primary core formed by core 192A is identified by reference numeral 214A and with respect to core 192B by reference numeral 214B. In the normal operating mode, paths 213A and 213B of the fluxes $\Phi$ in the limbs 193 and 195, respectively, produced by alternating currents are balanced and in phase. These fluxes produced by the coils interact with a secondary 215 formed by a guideway mounted conductive reaction plate 216 and its ferromagnetic backing plate 217 through a vertical air gap 218. The magnetic fluxes are dependent as:

$$\Phi 212A + \Phi 213A = \Phi 214A; \text{ and} \tag{19}$$

$$\Phi 212B + \Phi 213B = \Phi 214B \tag{20}$$

Alternating current eddy-currents are induced in the reaction plate 216 by a combination of transformer action and a speed-dependent motion-induced currents, whereby the numerical summation of these two frequencies determines the depth of penetration of the impinging magnetic field. An important aspect of the arrangement is to provide primary excitation ampere-turns as close as possible to the airgap surface of plate 216 in the interest of minimizing the magnetic leakage flux and causing the secondary ampere-turns to closely flow the primary ampere-turns in magnitude and with 180° phase reversal. For this purpose excitation coils 197, 200 and 203 are collectively identified as Group A which are physically close to the air-gaps 217. Coils 196, 199 and 202 comprise Group B which are deeper in the primary slot of the core but have a higher magnetic leakage flux in comparison to Group A. It is advantageous to have group A coils permanently connected in series to a variable-frequency AC power supply, and to compose the conductor for Group A of a multi-filamentary superconducting tape or wire with capability of operation at low-frequency alternating current, such as 30 Hz.

Coil Group B may have both different magneto-motive force (MMF) or ampere-turn rating from Group A. e.g., a larger MMF and a different thermal mass and physical volume e.g. larger than Group A. Group B may be a normal conductor wound excitation set such as copper or aluminum wire or alternately may be a superconductor intended for operation on A–C fields, such as $NB_3Sn$ in a bronze matrix or a high-temperature superconductor such as BSCCO-2223.

A fundamental aspect of the invention is that while Group A and Group B have different physical parameters, their operation is complementary and needed for both zero speed and slow-speed levitation. For example, in the preferred embodiment, Group A has a lower thermal mass, a lower MMF, lower physical volume and a reduced electrical time constant with respect to Group B. Group A is used exclusively when the vehicle needs to hover or at lower speeds such as 0 to 10 m/s. Above a 10 m/s vehicle speed, then Group A excitation current is progressively lowered and Group B excitation current is progressively ramped up; this pattern continues well into medium and high speeds. It is also advantageous to have a range of speeds e.g., 10–15 m/s, where both Group A and Group B are excited simultaneously to yield a fixed ampere-turn rating for the overall magnet.

Table 6 lists the critical design parameters of the FIG. 11 embodiment specific to the case of 120,000 ampere-turns per magnet and an E-core style overall magnet width of 18 inch (45.7 cm) dimension 205 for a total of six excitation coils. Clearly the described invention can be extended to include a multiplicity of excitation groups with 2 or greater coils per limb to increase flexibility of control techniques or segregation of excitation coils to either reduce manufacturing costs, enhance system reliability or provide a simplification in the layout of the mechanical/thermal support apparatus surrounding each coil. In general, at any one instant of time, it is a requirement that all excitation coils so energized be at the same alternating-current frequency, however, there are options in lateral control techniques by incorporating a shift in phase among each coil group.

TABLE 6

| | |
|---|---|
| No. of primary limbs | 3 |
| Overall ferromagnetic width | 38.1 cm |
| Overall ferromagnetic height | 10.00 cm |
| Overall magnet width | 45.7 cm |
| Overall magnet height | 10.90 cm |
| Group A magnetomotive force (MMF) | 50,000 A.T. |
| Group B magnetomotive force | 70,000 A.T. |
| Total magnetomotive force | 120,000 A.T. |
| Cross sectional area, each Group A coil, width × depth | 4.8 cm × 2.3 cm |
| Cross sectional area, each Group B coil, width × depth | 4.8 cm × 3.3 cm |
| Magnetic width, each side-limb | 4.44 cm |
| Magnetic width, center limb | 8.8 cm |
| Window area/side, width × depth | 10.2 cm × 5.71 cm |
| MMF in coils 197 and 203 | 12,500 A.T. each |
| MMF in coils 196 and 202 | 17,500 A.T. each |
| MMF in coil 200 | 25,000 A.T. each |
| MMF in coil 199 | 35,000 A.T. each |
| Current density in coil 200 (overall) | 2,264 A/sq. cm. |
| Current density in coil 199 (overall) | 2,210 A/sq. cm. |
| Magnetic flux density in center limb | 2.2 Tesla peak |
| Frequency range of excitation | 0–30 Hz |
| Nominal vertical air gap, B, dimension from primary-secondary | 5.0 cm |

The important design ratio of the E-core system is the ratio:

$$\frac{b}{g} = \frac{\text{window opening at air gap surface}}{\text{vertical air gap}} \quad (21)$$

substituting in equation 21 the values found in Table 6 we have:

$$\frac{b}{g} = \frac{10.2 \text{ cm} = 2.04 \text{ per unit}}{5.0 \text{ cm}}$$

By keeping this value at 2.0 or greater, the sensitivity of lift to variations in suspension height is held to a minimum. The dimension of the E-core window area is critical as this controls the amount of primary leakage crossing from the main limb to the two side limbs without linking the secondary reaction plate. The E-core window area is determined from Table 6 as width times depth in which the width is given as b=10.2 cm and the depth is given as D=5.71 cm. The ratio of:

$$\frac{b}{D} = \frac{10.2}{5.71} = 1.78 \text{ per unit} \quad (22)$$

is sufficient and practical due to the use of shallow primary slots whenever superconducting excitation is used.

Figure 12:
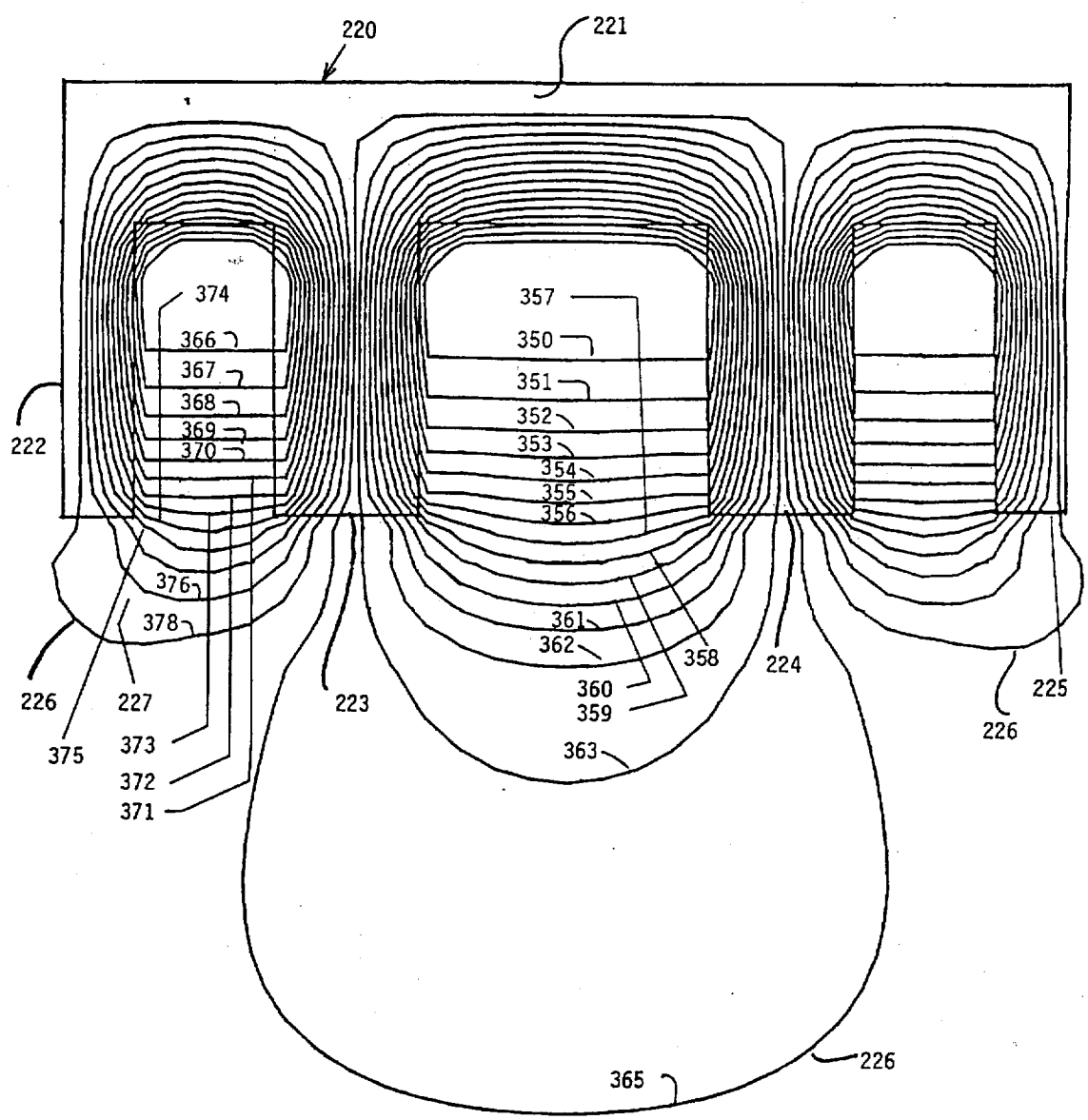
FIG. 12 is a no-load magnetic flux plot of a four-limb ferromagnetic core with two primary excitation coils excited with alternating current but without secondary electrical member.

In FIG. 12 there is illustrated a four-limb laminated core 220 suitable to form a transverse flux levitator utilizing the present invention. The core 220 is a laminated structure forming a core portion 221 and four limbs 222, 223, 224 and 225. In the same manner as described hereinbefore and shown in FIG. 11, the core slots formed between the various limbs are fitted with a stacked arrangement of two windings to form Group A coils and Group B coils of which Group B coils are deeper in the core slot than Group A coils. No load flux lines 226 are depicted which may be intercepted by a secondary embodying the same construction as the secondary use for the E-core arrangement described hereinbefore. Table 7 establishes dimensions and operating parameters for a four-limb transverse flux levitator based upon the illustration in FIG. 12 suitable for a full-scale magnetically levitated vehicle.

TABLE 7

| | |
|---|---|
| No. of primary limbs of magnetic core | 4 |
| Overall ferromagnetic core width | 40.6 cm |
| Overall ferromagnetic core height | 10.0 cm |
| Overall magnet width | 42.0 cm |
| Overall magnet height | 11.5 cm |
| Magnetomotive Force of Group A Coils | 45,000 A.T. |
| Magnetomotive Force of Group B Coils | 75,000 A.T. |
| Total magnetomotive force/magnet | 120,000 A.T. |
| Cross-sectional area of a Group A coil (width × depth) | 3.3 × 1.44 cm |
| Cross-sectional area of a Group B coil (width × depth) | 3.3 × 1.44 cm |
| Ferromagnetic core transverse window opening | 8.0 cm |
| Ferromagnetic core depth of window | 3.2 cm |
| Core side limb transverse width at air gap | 2.76 cm |
| Core main transverse width | 5.5 cm |
| Area of a Group A coil for active conductor plus matrix | 4.75 sq. cm |
| Ampere-turns of Group A coil | 22,500 A.T. |
| Current density of a Group A coil | 4,735 A/sq.cm |
| Area of Group B coil for active conductor plus matrix | 4.75 sq. cm |
| Current density of Group B coil | 7,895 A/sq. cm |
| Magnetic flux density in center or side limb | 2.2 Tesla peak |
| Frequency range of excitation | 0–27 Hz |
| Nominal vertical air gap, primary-secondary | 4.0 cm |
| Overall length of one sector including end-winding | 0.270 |
| Ferromagnetic core yoke depth | 6.80 cm |
| Thickness of primary damper shield | 2.5 mm |

Figure 13:
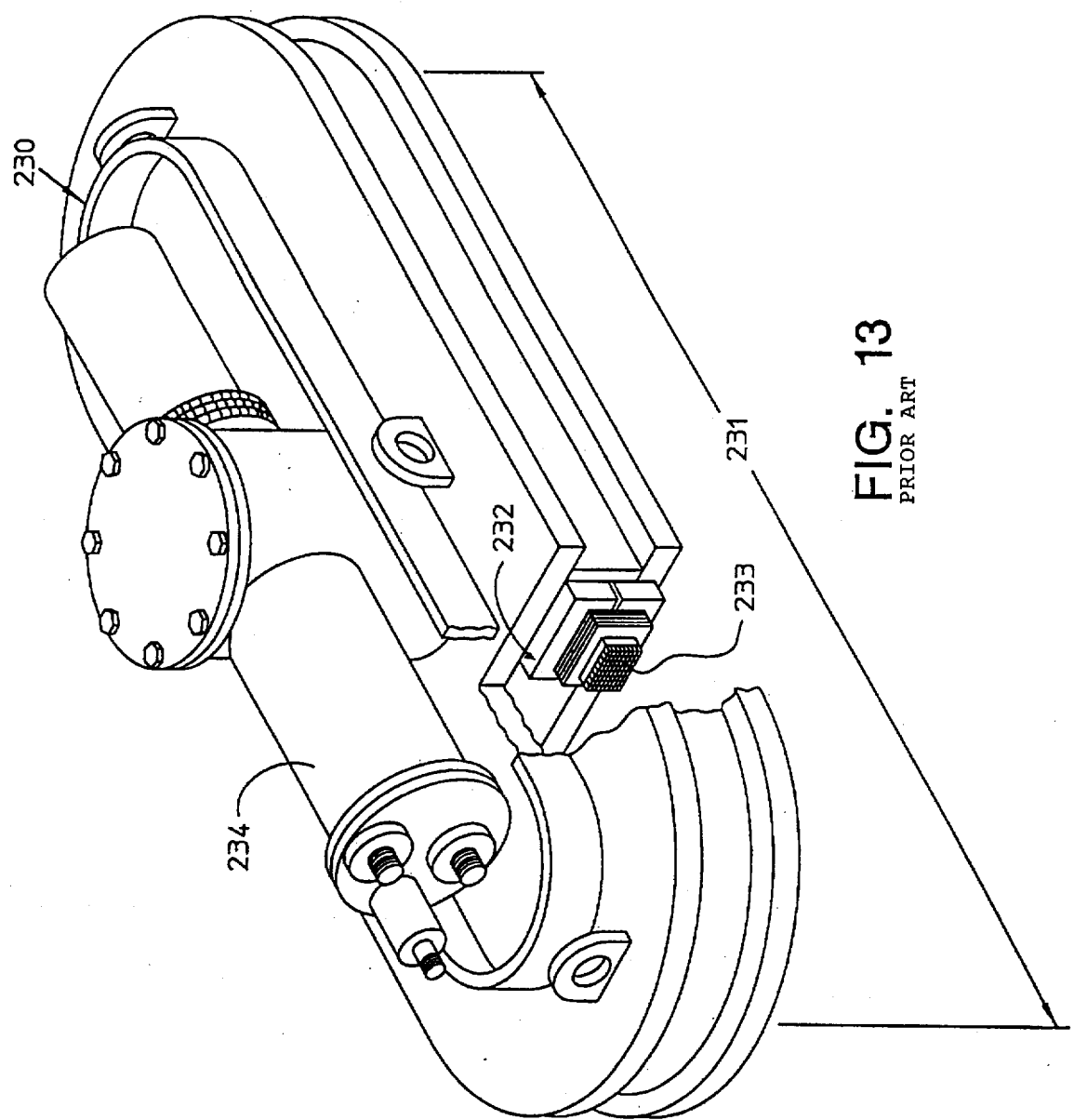
FIG. 13 is an isometric view with a broken away portion of a prior art superconducting direct-current field magnet.

The present invention further provides a novel longitudinal arrangement of conductors and a highly beneficial longitudinal attenuation of magneto-motive force (MMF) as a result of the arrangement of levitation magnets. FIG. 13 shows a prior art layout of a race track configuration, superconducting air-core direct-current (DC) field magnet 230 built in 1975 by Siemens Company of Germany. The MMF of the magnet is strictly direct current and held constant along the entire length of magnet denoted by reference numeral 231 and in the primary which includes a vacuum vessel 232 and an excitation coil 233. Reference numeral 234 indicates part of a cryogenic support system for the cryostat and electrical leads. This particular arrangement of a DC field magnet is unsuitable for ground-transportation levitation coils for either zero or low-speed applications because the constant MMF distribution creates undesirable spatial harmonics which produce magnetic drag and reduce the levitation efficiency as the vehicle speed increases. Moreover, the excitation of coils with direct current can not be used to levitate the vehicle statically and at low speeds along a guideway.

Figure 14:
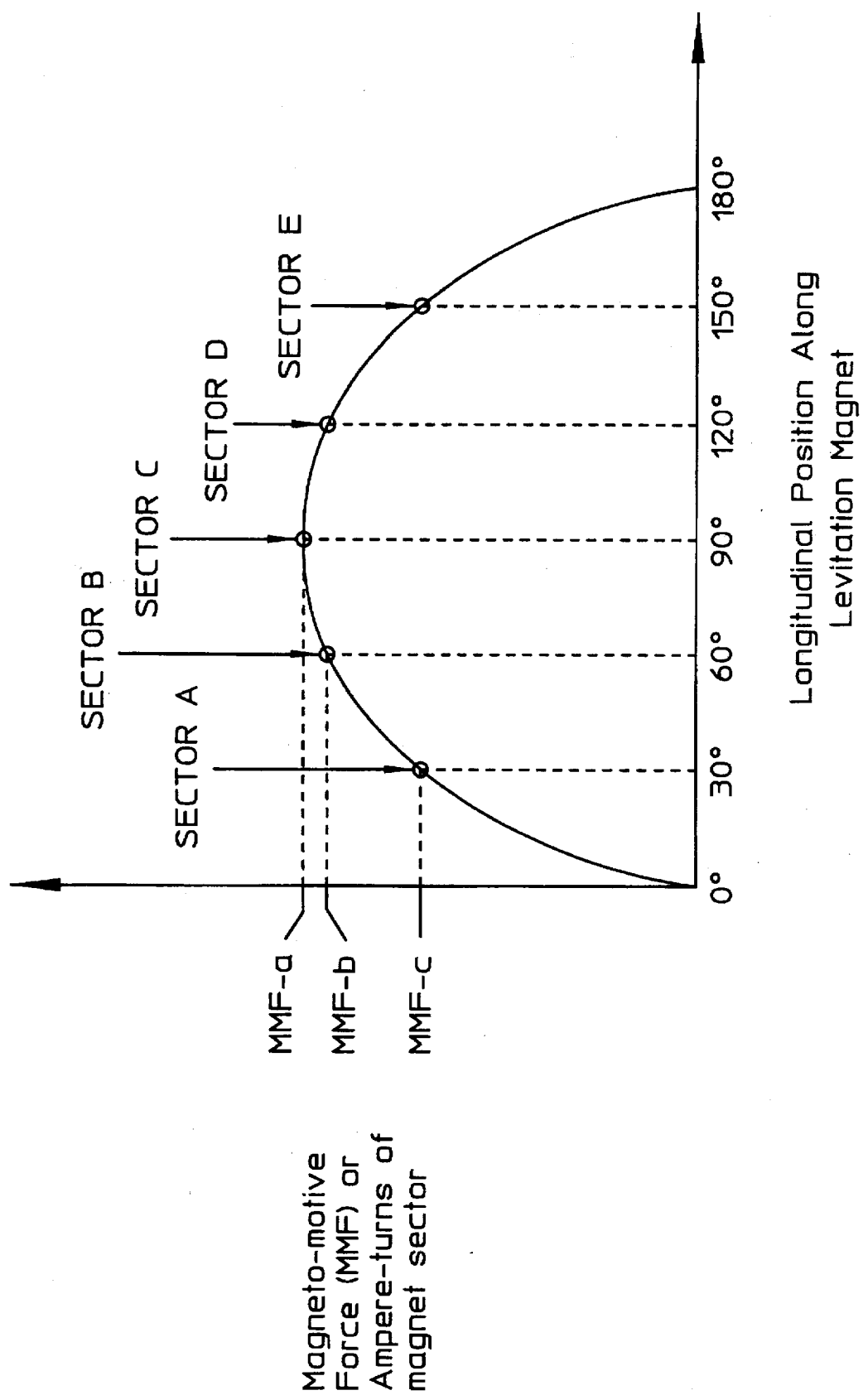
FIG. 14 is a plot of magnetomotive force versus longitudinal position along each magnet for a five sector magnet.

A further aspect of the present invention provides various arrangements to optimize the operation of ferromagnetic primary magnetic cores with high field or superconducting excitation and with alternating current excitation of the vehicle coils. In this regard as shown in FIG. 14 is a schematic representation of a magnet segmented into five longitudinal sectors, namely: sector A, sector B, sector C, sector D and sector E wherein each sector has its own excitation coil set with a distinct MMF rating but the sectors may or may not share a common primary ferromagnetic core. The spatial distribution of MMF in the magnet is such as to establish a quasi-sinusoidal or stepped-sinusoidal MMF wave in, for example, five segments. A representative MMF distribution would be as follows:

TABLE 8

| | | |
|---|---|---|
| 37,100 A.T. | Sector A | Spans 0–36° |
| 97,100 A.T. | Sector B | Spans 36°–72° |
| 120,000 A.T. | Sector C | Pole center at 90° |
| 97,100 A.T. | Sector D | Spans 108°–144° |
| 37,100 A.T. | Sector E | Spans 144°–180° |

In this case, each sector has identical magnetic core segments spanning 36° out of 180° total and MMF is distributed according to a sine-law. Clearly other combinations are possible, for example by having non-identical magnetic core segments as shown below:

TABLE 9

| POLE SPAN ANGLE | |
|---|---|
| Sector A | 0–30° |
| Sector B | 30°–75° |
| Sector C | 75°–105° |
| Sector D | 105°–150° |
| Sector E | 150°–180° |

For this type of an irregular layout of sectors, the specification of MMF would depend on the Fourier-spectrum desired for the resultant airgap flux. In propulsion applications or low-speed levitation it is desirable to highly attenuate the second and third harmonics of flux density as a priority and to compromise in the attenuation level for fifth, sixth or seventh harmonics of flux density.

Figure 15:
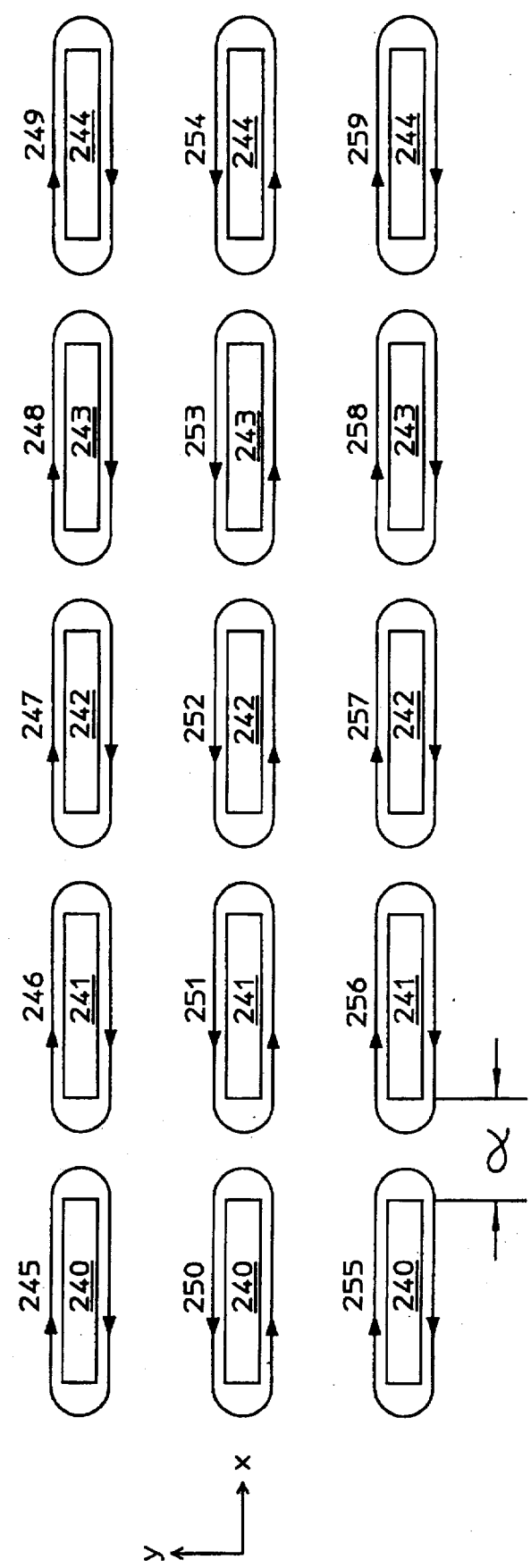
FIG. 15 is a top view of a five-sector E-core levitation magnet showing the direction of currents around each limb and sector with a quasi-sinusoidal distribution of magneto motive force.

FIG. 15 shows the embodiment of the invention with the following assignment of reference numerals as indicated in Table 10 to a bottom-view of a five-segment E-core primary core system using transverse flux magnetic flux orientation:

TABLE 10

| Reference Numeral | Sector | Flux Source or Core Designation |
|---|---|---|
| 240 | Sector A | magnetic core |
| 241 | Sector B | magnetic core |
| 242 | Sector C | magnetic core |
| 243 | Sector D | magnetic core |
| 244 | Sector E | magnetic core |
| 245, 255 | Sector A | side-limb excitation current |
| 246, 256 | Sector B | side-limb excitation current |
| 247, 257 | Sector C | side-limb excitation current |
| 248, 258 | Sector D | side-limb excitation current |
| 249, 259 | Sector E | side-limb excitation current |
| 250 | Main-limb Sector A | primary excitation current |
| 251 | Main-limb Sector B | primary excitation current |
| 252 | Main-limb sector C | primary excitation current |
| 253 | Main-limb Sector D | primary excitation current |
| 254 | Main-limb Sector E | primary excitation current |

In most cases, the side-limb excitation will be one-half of the main limb excitation, for example, if Sector C has a total 120,000 A.T. rating then:

TABLE 11

| | MMF | Reference Number |
|---|---|---|
| | 30,000 | 247 |
| | 60,000 | 252 |
| | 30,000 | 257 |
| Total | 120,000 A.T. | |

Figure 16:
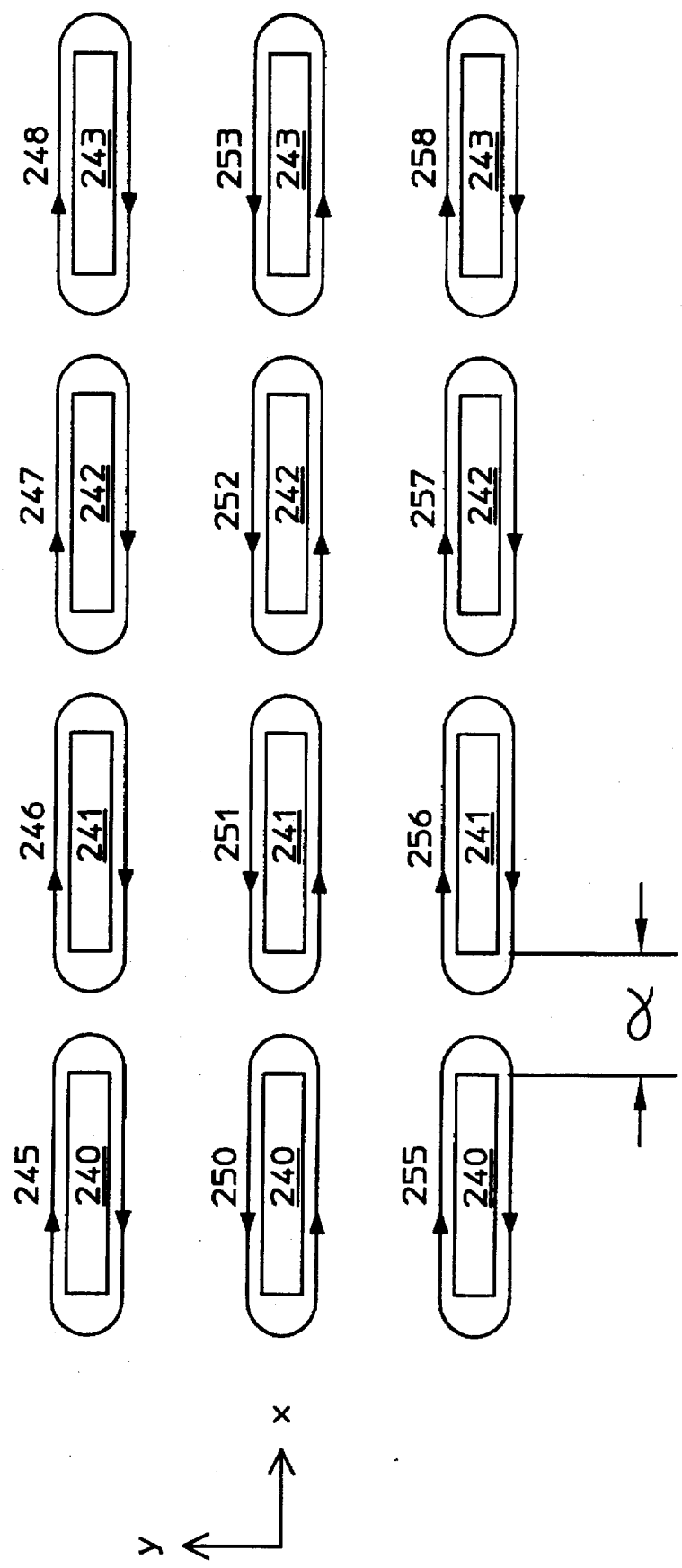
FIG. 16 is a top view of a four-sector E-core levitation magnet showing the direction of the currents around each limb and sector.

FIG. 16 shows an alternate embodiment of the invention representing a simplification from five to four sectors in the interests of economizing on manufacturing expense. FIG. 16 has the same reference numeral nomenclature as FIG. 15 with the exception of the omission of the last sector of excitation coils and magnetic core. The longitudinal spacing between adjacent magnetic cores is designated "α" and this distance is to be minimized in accordance with fitting of side conductors of the excitation coils in this space. This alternate embodiment yields a higher harmonic content to the air gap magnetic field than the arrangement shown in FIG. 15. A representative MMF distribution for four sectors would be as follows:

TABLE 12

| | Pole-span | MMF/Sector |
|---|---|---|
| Sector A | 0–45° | 85,000 A.T. |
| Sector B | 45°–90° | 120,000 A.T. |
| Sector C | 90°–135° | 120,000 A.T. |
| Sector D | 135–180° | 85,000 A.T. |

A major purpose to the previous embodiment becomes clear from the physical arrangement of these segmented and distributed-MMF magnets on the undercarriage of a vehicle. To maintain the highest levitation efficiency possible, each side of the vehicle should contain a multiplicity of levitation magnets arranged as shown, for example, in FIG. 17 whereby there exists a regular alternation in magnet polarity as a function of longitudinal displacement. The polarity for AC excited magnets should be:

TABLE 13

| Group of Magnets at Location | Left-side Polarity | Right-side Polarity |
|---|---|---|
| 260 | N-S | S-N |
| 261 | N-S-N | S-N-S |
| 262 | N-S-N-S | S-N-S-N |
| 263 | N-S-N-S-N | S-N-S-N-S |

The practice of having right and left vehicle sides of mirror image polarity is useful from the standpoint of minimizing inter-magnet mechanical forces on the vehicle frame and more important, in attenuating the magnetic field as best possible in the passenger compartment prior to the application of shielding.

Figure 17:
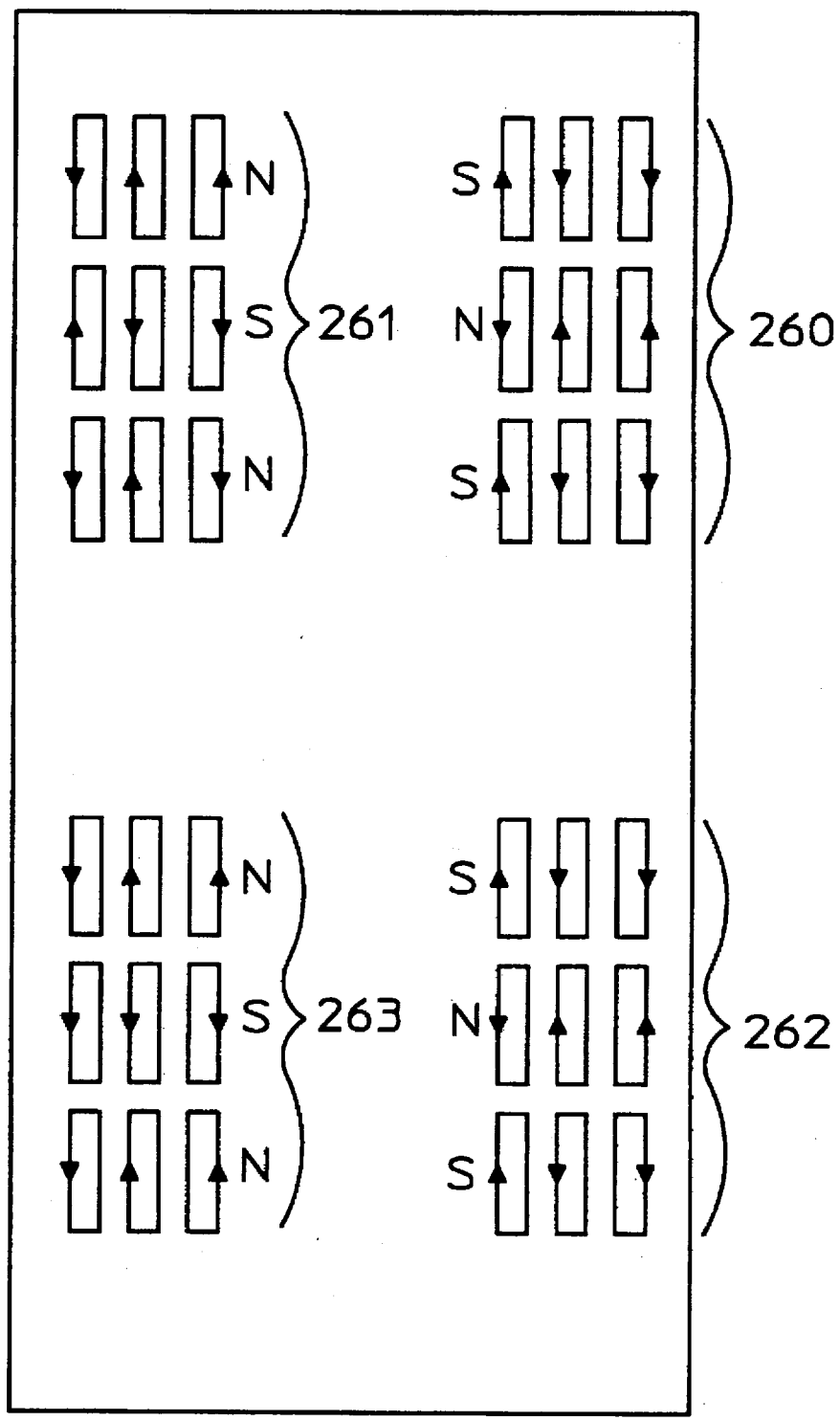
FIG. 17 is a top view of a vehicle showing the locattion of four complete magnet systems each using an E-core configuration with three sectors per magnet.

The system shown in FIG. 17 by the alternating-polarity array establishes a traveling-wave underneath the vehicle at both zero speed and at any discrete velocity by virtue of having the alternating current excitation at each primary pole. The field form of the traveling wave is improved by the tapering or sinusoidal MMF distribution so described in this invention. The traveling-wave effect reduces the drag component on the levitation magnet to a value lower than a conventional DC excited magnet. It should be noted that when the chart above refers to polarity alternation as N-S-N-S, this means in an AC system, that adjacent magnets are 180° out of phase with respect to the reference magnet. In the preferred embodiment, each levitation magnet is powered by an independent single-phase inverter supply which has the ability to produce phasing of each magnet so that adjacent magnets are both at the same frequency but a predetermined phase difference for example 120° or 180°. If the magnets are spatially located as in FIG. 17, then a phase shift of 180° is appropriate because longitudinal overlap is not present.

Figure 18:
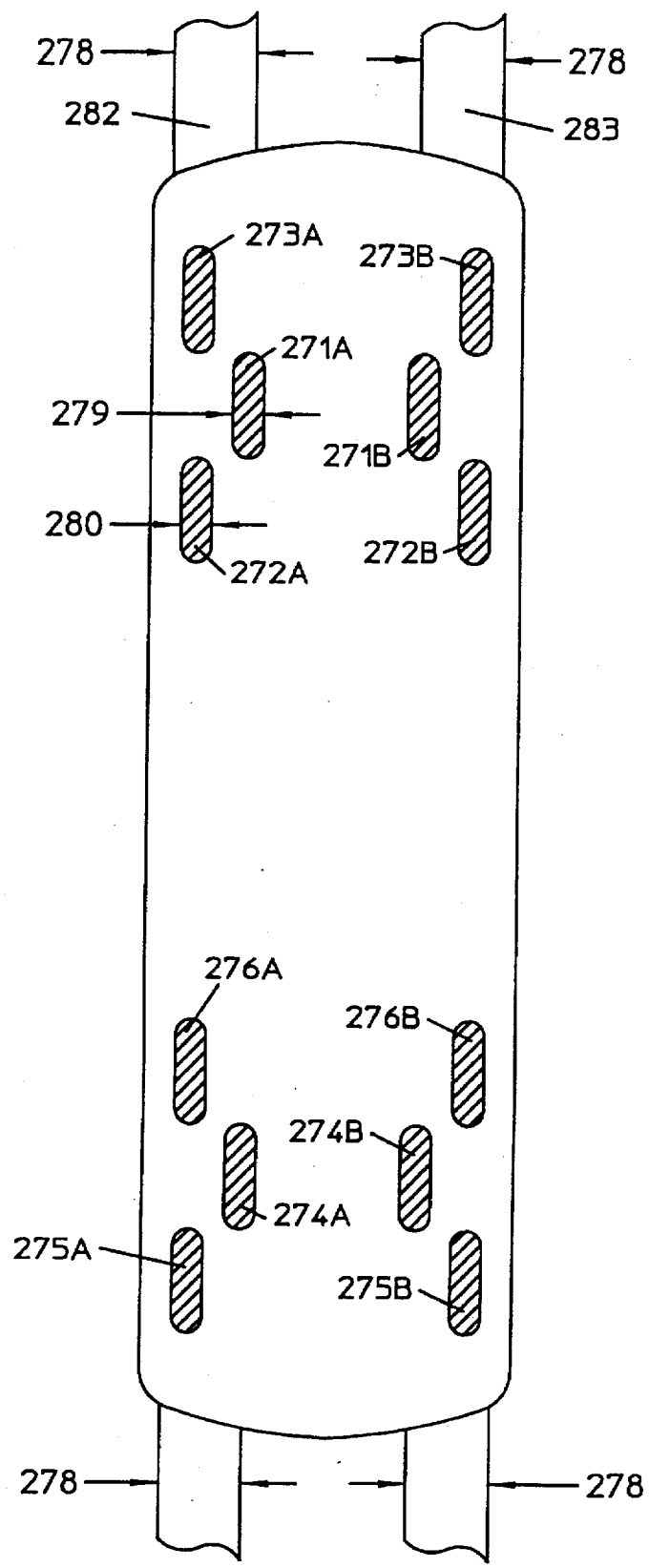
FIG. 18 is a top view of a complete vehicle showing a total of twelve levitation magnets arranged whereby each corner of the vehicle has adjacent magnets laterally offset.

It is within the scope of the invention to provide that there may be overlap of a longitudinal component of each magnet as shown in FIG. 18 although not a mechanical interference. Here it is advantageous to have each magnet 271A, 272A and 273A excited 120° apart in phase if there are 3 or greater magnets in tandem per location of vehicle and spaced apart at a dimension 277 which is the longitudinal pitch between magnets that are excited between a phase difference of 120°. This will establish a traveling-wave effect and produce a minimum of electromagnetic drag. The levitation strips 282 and 283 forming the secondary in the guideway must have a width identified by reference numeral 278 in relation to its longitudinally extended length which is greater than the summation of the width dimensions 279 and 280 of individual magnets and an allowance for lateral overhang of conductors.

In FIG. 18 the foregoing description as to the position and relationship of magnets 271A, 272A and 273A being at one corner area of a vehicle undercarriage as shown applies with equal effect to magnets 271B, 272B and 273B at the laterally opposite corner area of the vehicle undercarriage and magnets 274A, 275A and 276A at one rear corner area and magnets 274B, 275B and 276B at the opposite rear corner area. The magnet arrangement of FIG. 18 can be advantageously connected to provide three sets of excitation coils that are supplied by three inverter power supplies which have 120° phase difference in the alternating current output. Then this arrangement will provide propulsion or braking capability in addition to the main levitation and lateral guidance functions. The arrangement as shown in FIG. 18 has a lateral offset between successive longitudinally disposed magnets, the amount of offset being designated by a dimension identified by reference numeral 281. Dimension 281 is the longitudinal pitch of the magnets which in certain configurations is less than the overall length of the magnet including the cryostat. All magnets in a particular group share a common non-segmented secondary reaction plate 282 and 283 for the production of eddy currents sufficient to initiate propulsion or braking forces.

Figure 19A:
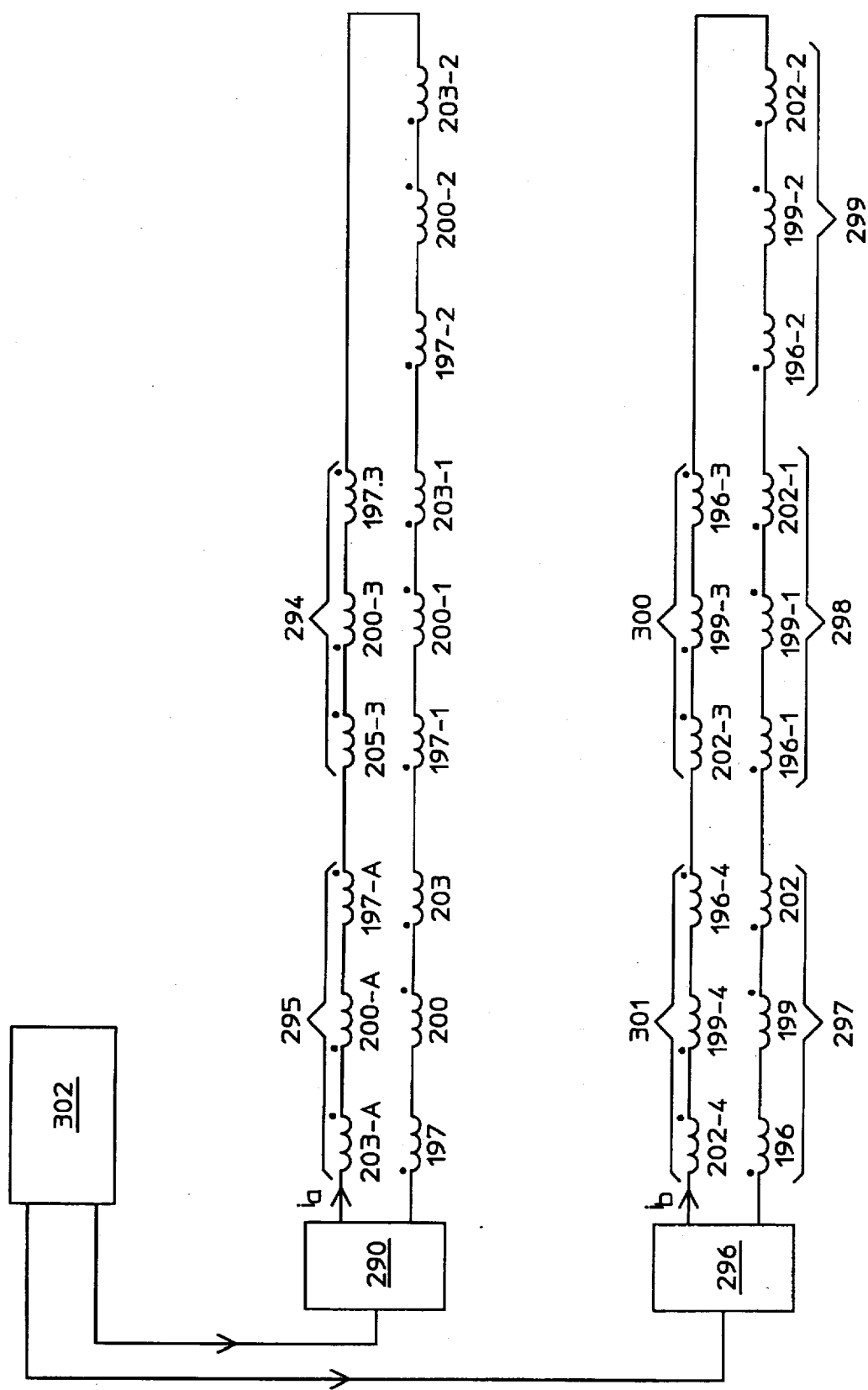
FIG. 19A is a schematic electrical diagram of the excitation circuits for an E-core transverse flux magnet with five longitudinal sectors whereby two separate alternating current supplies are feeding one magnet.

FIG. 19A shows an electrical connection diagram for one E-core transverse flux magnet indicating the preferred embodiment for alternating current excitation and using the basic configuration shown in FIGS. 11 and 15 and having five longitudinal sectors. Power supply 290 is a single-phase, variable-frequency alternating current supply feeding the excitation coils of five sectors of one-magnet identified as 291, 292, 293, 294 and 295. Power supply 296 is a single-phase, variable-frequency alternating current supply feeding the excitation coils of five sectors of one-magnet identified as 297, 298, 299, 300 and 301. Supplies 290 and 296 have a common master controller 302 which establishes the phase angle between the two supplies of currents $i_a$ and $i_b$ as a function of time. The following components are thus identified with limb notation referring to FIG. 11.

TABLE 14

| Individual excitation | Sector | Limb | FIG. 19A Reference No. |
|---|---|---|---|
| Coils of Group A | | | |
| 197 | A | 193 | 291 |
| 200* | A | 194 | 291 |
| 203 | A | 195 | 291 |
| 197-1 | B | 193 | 292 |
| 200-1* | B | 194 | 292 |
| 203-1 | B | 195 | 292 |
| 197-2 | C | 193 | 293 |
| 200-2* | C | 194 | 293 |
| 203-2 | C | 195 | 293 |
| 197-3 | D | 193 | 294 |
| 200-3* | D | 194 | 294 |
| 203-3 | D | 195 | 294 |
| 197-4 | E | 193 | 295 |
| 200-4* | E | 194 | 295 |
| 203-4 | E | 195 | 295 |
| Coils of Group B | | | |
| 196 | A | 193 | 297 |
| 199* | A | 194 | 297 |
| 202 | A | 195 | 297 |
| 196-1 | B | 193 | 298 |
| 199-1* | B | 194 | 298 |
| 202-1 | B | 193 | 298 |
| 196-2 | C | 193 | 299 |
| 199-2* | C | 194 | 299 |
| 202-2 | C | 195 | 299 |
| 196-3 | D | 193 | 300 |
| 199-3* | D | 194 | 300 |
| 202-3 | D | 195 | 300 |
| 196-4 | E | 193 | 301 |
| 199-4* | E | 194 | 301 |
| 202-4 | E | 195 | 301 |

*Indicates excitation strength or MMF suitable for middle-limb whereas all other coils have reduced MMF or turns for side-limbs.

This arrangement minimizes the number of power supplies and yields a magnet with minimum manufacturing cost. To attain a difference in MMF between, for example coils 197 and 200 while operating at the same line current, coil 197 has one-half the number of turns as does coil 200, this being the preferred embodiment to yield a fixed MMF differential between inner and outer poles. Further among sectors, e.g., sectors 291 and 295 may have only 31% of the reference MMF, and sectors 292 and 294 may have only 31% of the reference MMF, and sectors 292 and 294 only 81% of reference MMF (Sector 293). This reduction in MMF is obtained in the preferred embodiment by reduction in number of series turns/sector while maintaining equal phase currents and a singular series connection per group.

Figure 19B:
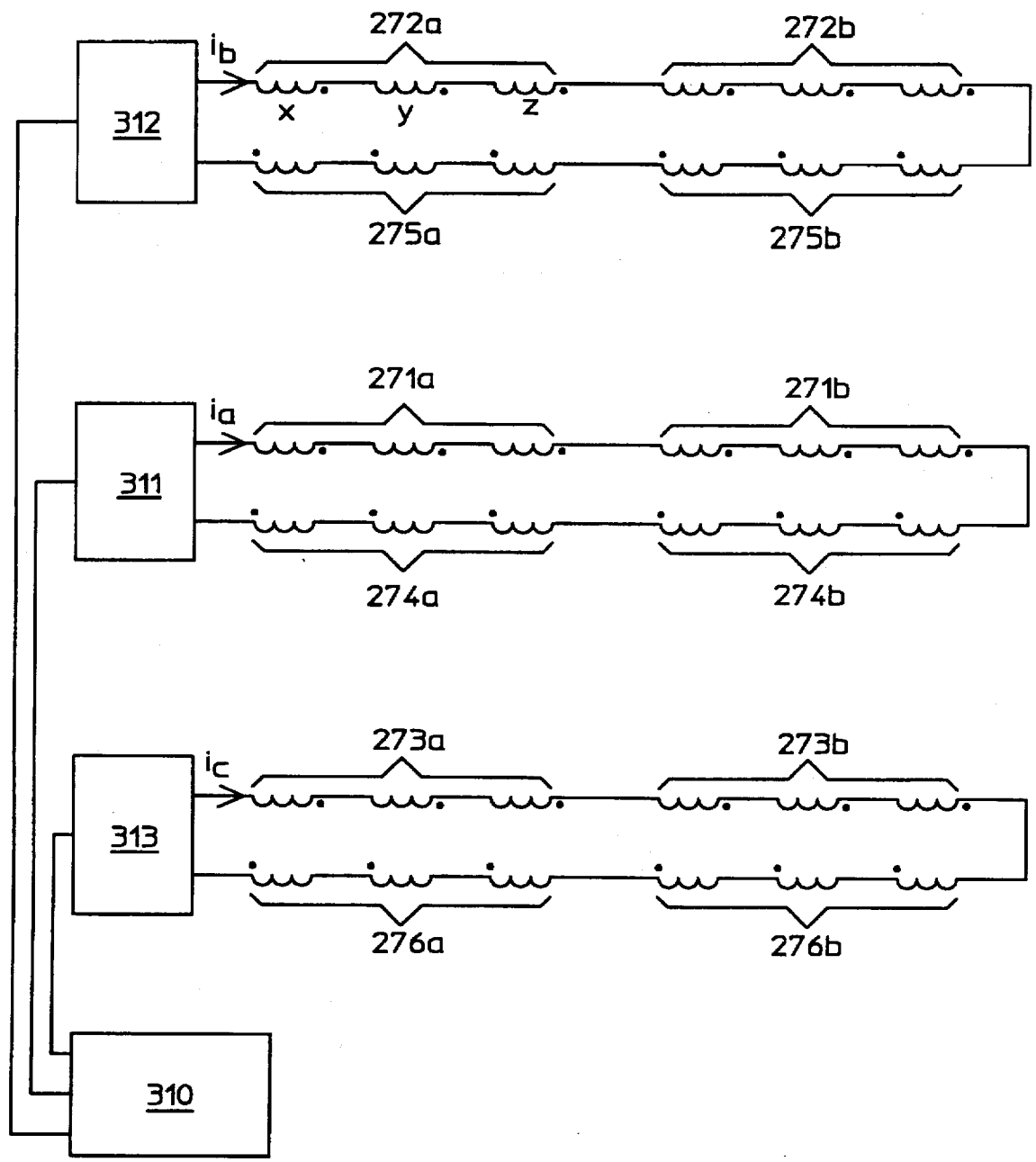
FIG. 19B is a schematic electrical diagram for a four sector E-core transverse flux magnet using a three-phase supply for the main excitation of the superconducting coils.

FIG. 19B schematically illustrates the electrical connections for a three-phase excited variable frequency alternating current supply 310 to invertors 311, 312 and 313 for the magnet layout as shown in FIG. 18. Phase A is supplied by inverter 311 for operating magnets 271A, 271B, 274A and 274B. Phase B is supplied by inverter 312 for powering magnets 272A, 272B, 275A and 275B. Phase C is supplied by inverter 313 powering magnets 273A, 273B, 276A and 276B in series. All three individual inverters are supplied from a central source or AC/DC current supply 310 and associated inverter controls. For each magnet there is shown a three-sector coil arrangement designed x, y and z whereby three coils of one magnet have a quasi-sinusoidal MMF distribution among coils.

Figure 20A:
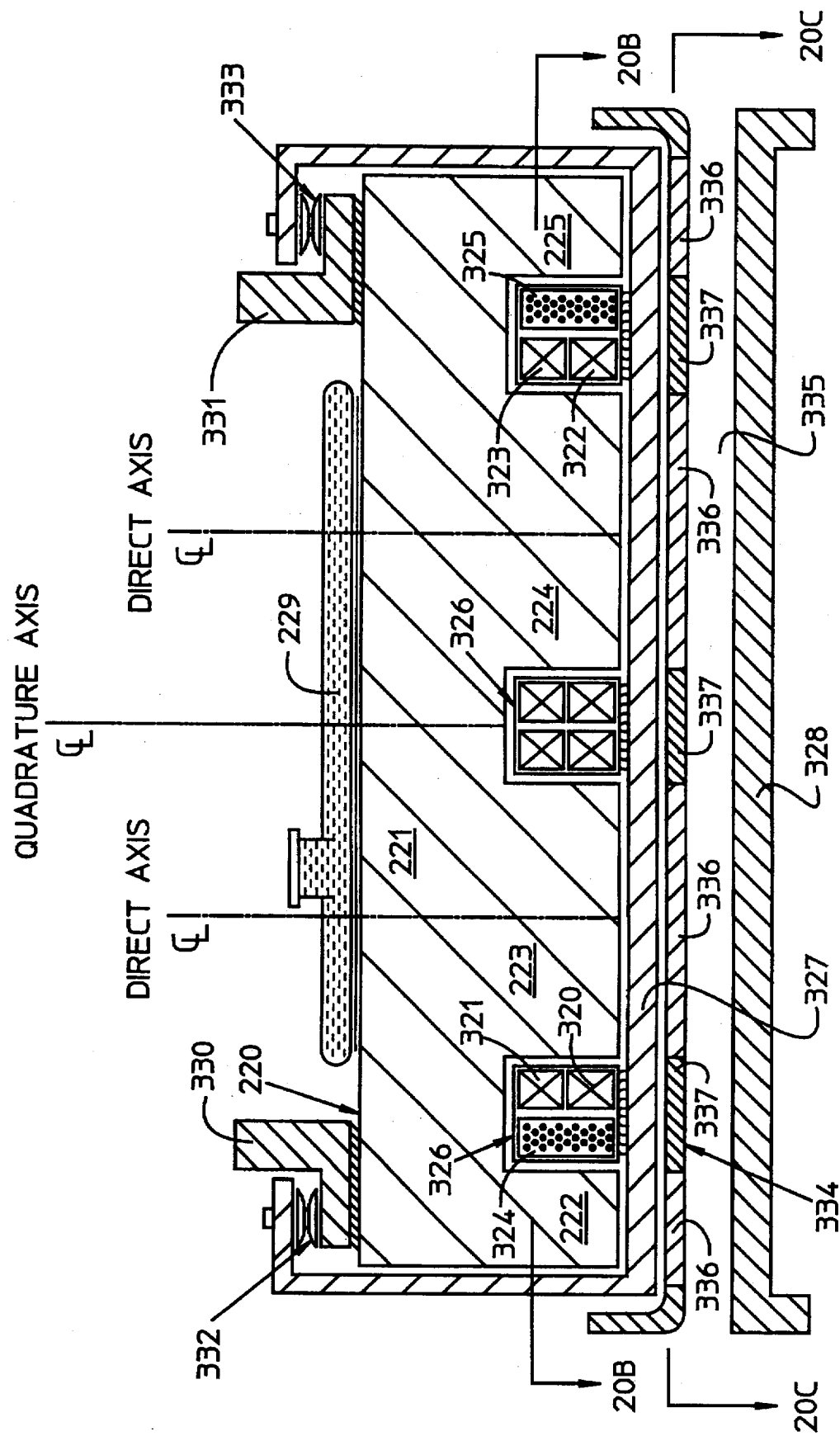
FIG. 20A is an elevational view in section of a four limb transverse flux levitation magnet showing the secondary electrical member and placement of the segmented electromagnetic shield.
Figure 20C:
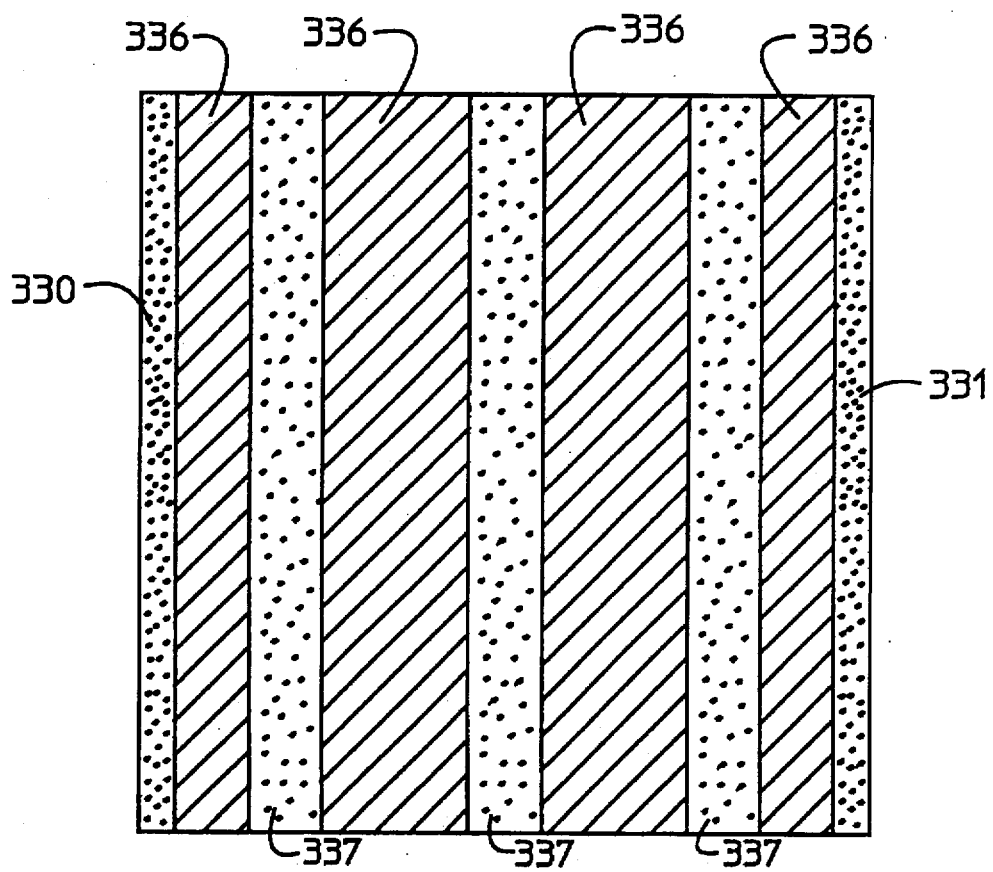
FIG. 20C is a sectional view taken along lines 20C–20C of FIG. 20A.
Figure 20B:
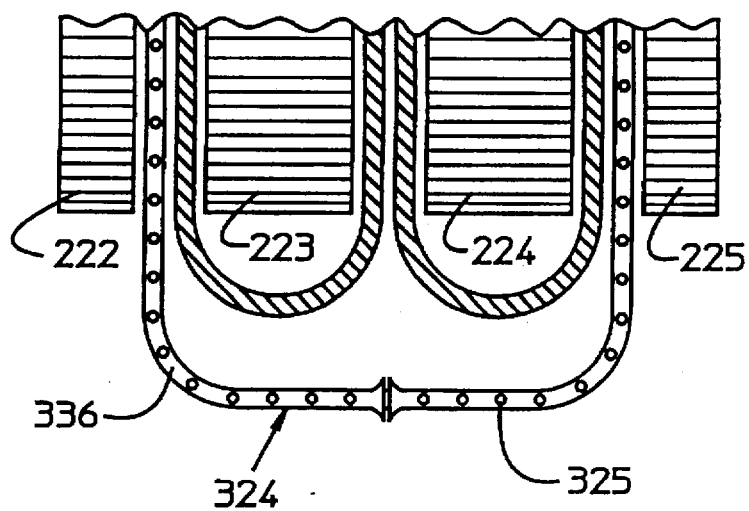
FIG. 20B is a sectional view taken along lines 20B–20B of FIG. 20A.

FIGS. 20A, 20B and 20C show in greater detail the four limb embodiment of the present invention shown and described hereinbefore in regard to FIG. 12. The description and illustration of the four limb core is the same and accordingly, the same reference numerals have been used in FIGS. 20A and 20B as in 12. A stacked arrangement of two sets of alternating-current excitation coils 320, 321, 322 and 323 surround magnetic limbs 223 and 224. This constitutes a compound excitation system whereby coils forming Group A comprise the coils 320 and 322 closest to the air gap and coils forming Group B comprise coils 321 and 323 closest to the core portion 221 of the magnetic core 220.

Cooling to each set of primary coils is afforded by conduction from cryogen heat-exchanger or reservoir 324 and 325. In this embodiment, the ferromagnetic core is maintained at liquid-nitrogen temperature to retain high magnetic permeability and the excitation coils at either liquid-nitrogen or super-critical helium temperatures of 77° K or 20° K, respectively. A radiation shield 326 is located between excitation coils 320, 321, 322 and 323 as well as heat exchanger 324 and 325 and the magnetic limbs 222 and 225 to provide thermal isolation and also mechanical support for the excitation coils which are suspended freely in the magnetic core slots from a composite mechanical structure 327 located on the surface of the magnet facing the guideway secondary 328. The ferromagnetic core 220 is maintained at cryogenic temperature by addition of chill-block 329 in direct surface contact with core 220. The magnet is mounted by two systems of support. The magnet is mounted by two support systems, one comprised of the structure 327 contacting the excitation coils and the other by a non-ferromagnetic support arms 330 and 331 for the magnetic core 220. Intermediate numbers 332 and 333 comprise non-ferromagnetic Belleville washers or similar type of spring with a selectable damping and pressure characteristics which serve as thermal insulators between composite mechanical structure 327 and support arms 330 and 331. A segmented flat electromagnetic shield 334 is provided between the composite mechanical structure 327 and air gap 335. As shown in FIG. 20A and 20C, shield 334 is made up of both insulator sections 336 and electrically conductive sections 337 which are lined-up with the direct and quadrature axes of the magnet, respectively.

FIG. 12 includes a flux-plot depicting the occurrence of the four limb core with Coil Groups A and B energized simultaneously, and at the same ampere-turns. The flux lines denoted by reference numerals 358–365 and 376–378 are linking the secondary 328 (FIG. 20A) and termed working flux, with respect to the central area between limbs 223 and 224. Fluxes 350–357 are central leakage fluxes and fluxes 366–375 are side leakage fluxes. Both sets of working fluxes are specific to the particular choice of air gap 335 and the magnetic window dimension.

The particular dimensions chosen for the magnet forming the illustration in FIG. 12 are general and non-optimum due to a deeper magnetic core/excitation slot than is what is required for superconducting excitation. The flux plot shows high magnetic leakage flux prevalent. About two-thirds of the generated magnetic flux becomes leakage flux in a high-resistance electrically-conductive strip and thus the effect of armature reaction or change in secondary field is not visible and the secondary eddy-currents are assumed infinitely small.

Figure 21:
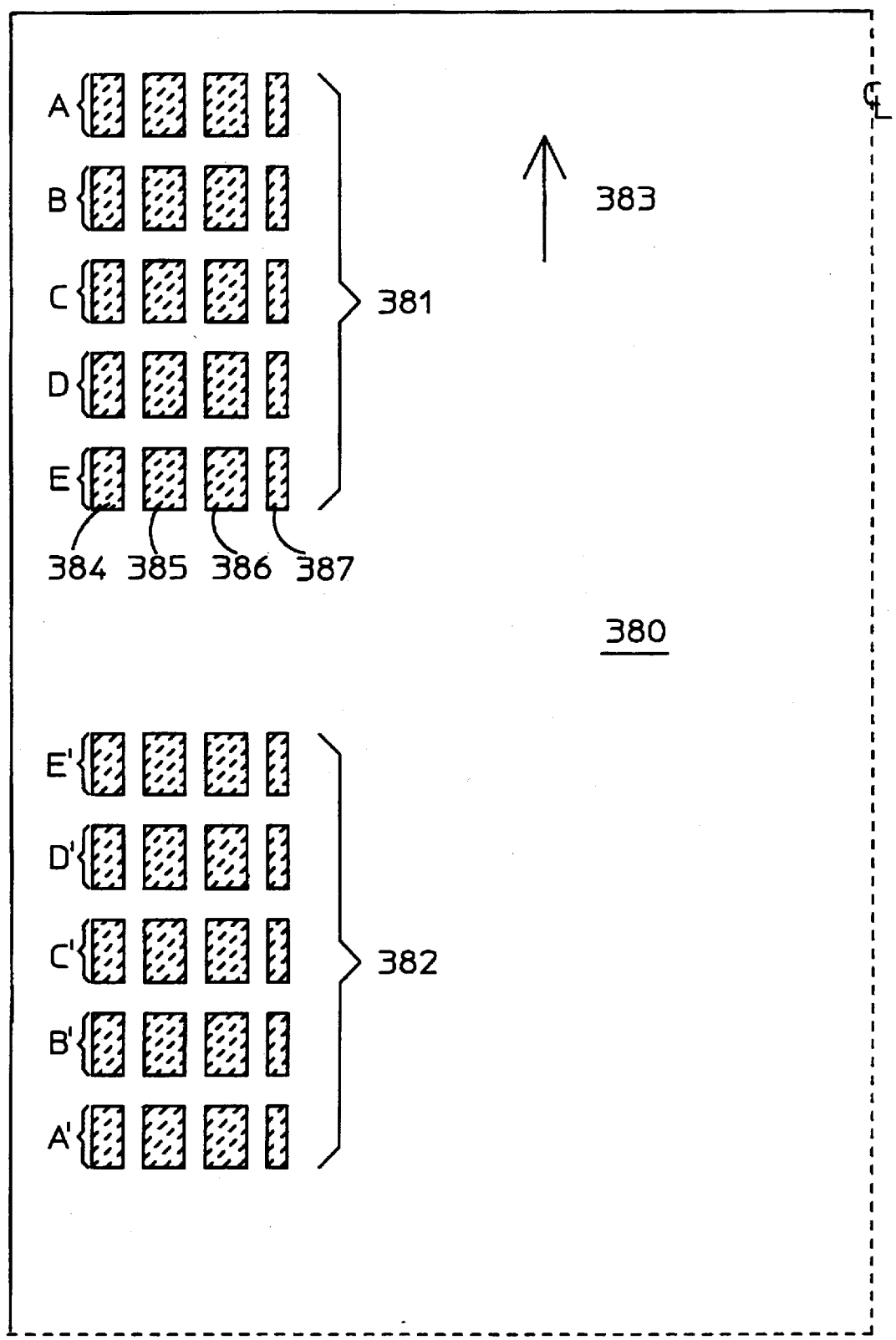
FIG. 21 is a top view of one corner of a vehicle with two sets of four limb, five sector transverse flux levitation magnets showing 180° electrical phase difference between the two magnets according to the MMF diagram shown in FIG. 14.

FIG. 21 shows an arrangement of magnets at one corner representative of what is symmetrical both side-to-side and front-to-back of a vehicle 380. The layout shown depicts eight, four-limb, five sector magnets and ferromagnetic poles on a magnetically-suspended vehicle. At each vehicle corner there are two complete, compound wound, segmented transverse flux magnets 381 and 382. The five sector arrangement with three different levels of MMF, advantageously provides for a quasi-sinusoidal distribution of magneto motive force in the longitudinal direction 383 designed and under each magnet thereby inducing substantially sinusoidal eddy currents in the secondary reaction plate which results in a high levitation efficiency. The two end sectors A & E have the lowest level of MMF, sectors B and D have the medium value of MMF and sector C has the highest value of MMF. Table 7 gives the numerical values of MMF for a representative full scale levitation system. In the arrangement shown in FIG. 21 at each vehicle corner the two groups of magnets are phased 180° different from the adjacent magnet group of that corner, such excitation scheme thereby establishing a north-south array at each corner of the vehicle. This creation of magnet pairs at each corner is advantageous for reduction of stray eddy currents or harmonic losses in the secondary reaction plate thereby enhancing the levitation efficiency and longitudinal force stability. The ferromagnetic limbs are designated 384, 385, 386 and 387 and use the coil winding structure shown in FIG. 20A.

Figure 22:
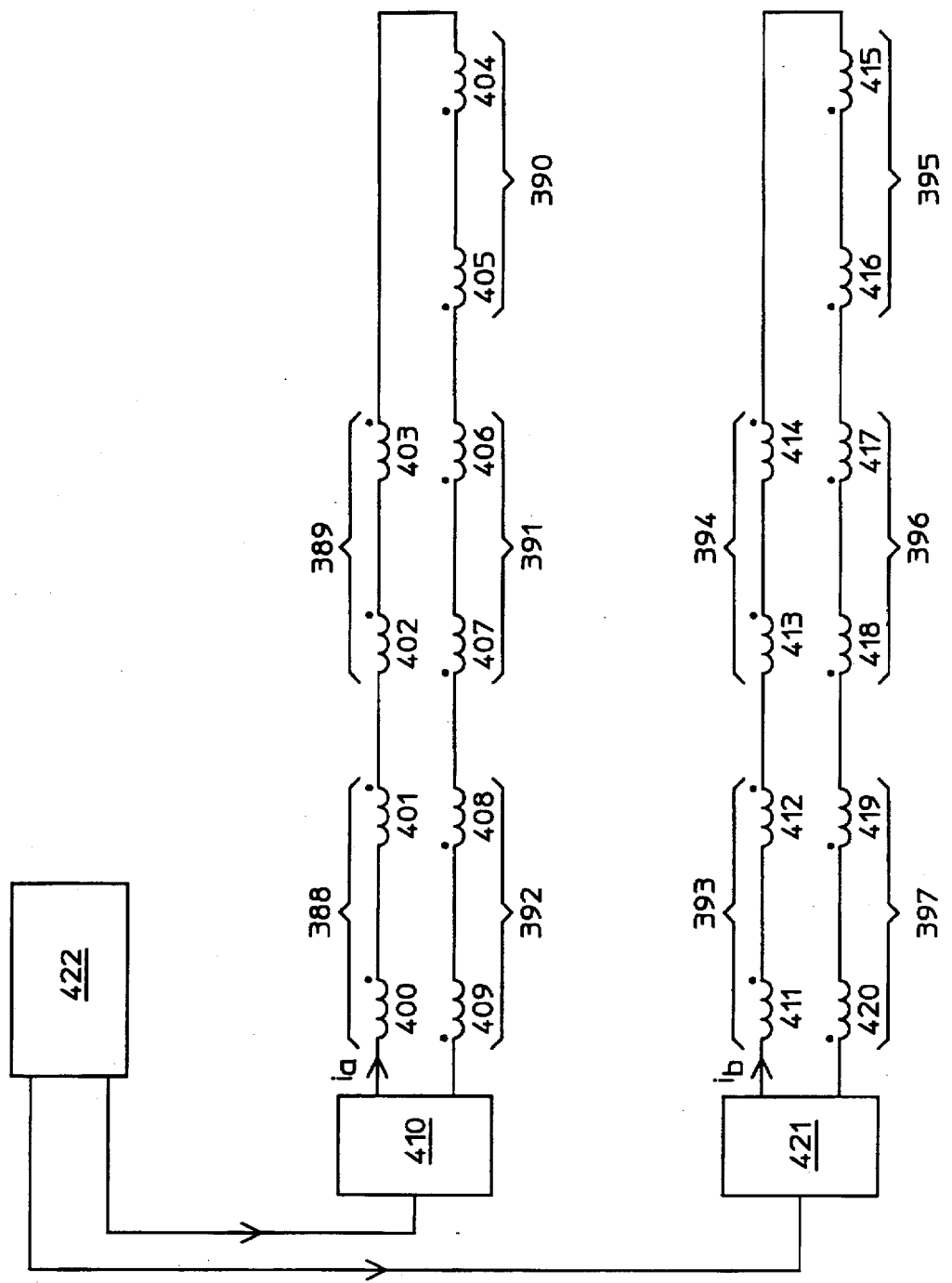
FIG. 22 is an electrical schematic diagram of a compound excitation scheme for a two layer, five sector transverse flux levitation magnet showing two independent alternating current supplies.

FIG. 22 shows schematically illustrates the electrical connection for a five-sector, four-limb transverse magnet for the case of two stacked layers of excitation coils arranged in a compound excitation scheme. The magnets are identified by reference numerals 33–395. The coils in Group A form a circuit consisting of primary coils 400–409 which are serially connected to an inverter 410. The coils in Group B form a circuit consisting of primary coils 411–420 which are serially connected to an inverter 421. Inverters 410 and 421 are coordinated in phase to produce levitation and lateral guidance without production of forward propulsion force. Frequency and amplitude are regulated by master controller 422.

Group A excitation coil preferably are constructed of superconducting materials and operate at a very high field level, e.g., 2–5 Tesla; Group A being the set of coils closest to the secondary member, and operating at cryogenic temperatures. Group B excitation coils preferably are constructed of normal-conducting materials, which can be for example water cooled copper or aluminum and operate at medium magnetic field levels, e.g., 1–2 Tesla. Group B is located furthest from the secondary member and embedded in the bottom of the same slots of the primary as Group A.

Compound excitation permits two modes of operation. Group A provides for maximum levitation height capability and rated lifting force at zero vehicle speed. Group B provides for less than maximum levitation height capability and ability to sustain lift at high speeds, at a lower excitation frequency on the magnet. The lower excitation frequency on the magnet produces lower losses in the magnetic steel comprising the primary core without sacrifice to the rated levitation height. The use of compound excitation with two different mediums of cooling reduces the overall magnet construction cost of materials by reducing the investment in cryogenic cooling apparatus required for the overall system as compared with an excitation system using only cryogenic cooling.

The present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. An electrodynamic suspension system including a moveable member for levitation relative to a foundation, said moveable member including at least one onboard superconducting electromagnetic coil forming a primary member overlying a secondary member on a foundation in a transverse flux orientation with respect to a of levitation of said moveable member above said secondary member on said foundation, said at least one superconducting coil being energized by a variable alternating current to produce an alternating field of magnetic flux, said foundation including passive electrically conductive means forming said secondary member responsive to said alternating field of magnetic flux which induces an alternating current in said secondary member to guide and levitate the moveable member by repulsive induction action to maintain a controllable spaced relation between the foundation and moveable member.

2. The electrodynamic suspension system according to claim 1 wherein said onboard superconducting electromagnetic coil includes a ferromagnetic core with at least two pole faces, wherein said secondary member is elongated in a direction corresponding to the spacing between said at least two pole faces, and wherein said alternating field of magnetic flux is principally orientated in a lateral direction with respect to the direction of the elongated length of said secondary member.

3. The electrodynamic suspension system according to claim 2 wherein said at least two pole faces each define an electromagnetic air gap with said secondary, said pole faces being laterally spaced apart by a distance which is greater than the height of said air gap for minimizing the sensitivity of levitation force by said coil to variations to the levitation height in response to outside forces, dynamic motion of said moveable member or perturbations in the secondary member surface.

4. The electrodynamic suspension system according to claim 2 wherein said on-board superconducting electromagnetic coil includes a plurality of discrete coils connected to form parallel excitation circuits each operable independent of the other as to the phase of excitation frequency and magnetomotive force, each circuit being simultaneously energized by the same frequency of AC current, and wherein said parallel excitation circuits comprise stacked coils in a common slot or slots of a ferromagnetic core.

5. The electrodynamic suspension system according to claim 1 wherein said superconducting electromagnetic coil includes a superconductor capable of operating at liquid-helium, super-critical helium or liquid nitrogen temperatures at an overall current density of at least 4000 amps per square centimeter.

6. The electrodynamic suspension system according to claim 1 further including cryogenic means for cooling said coil and removal of heat in response to eddy current losses and radiation and conduction heat gains.

7. The electrodynamic suspension system according to claim 1 wherein said superconducting electromagnetic coil comprises one of a plurality of such coils arranged in an array for electrodynamic levitation at a zero speed relative to said secondary.

8. The electrodynamic suspension system according to claim 1 wherein said coil includes a first winding comprised of superconducting wire or cryo-cooled high-purity aluminum wire and a second winding comprised of normal conducting wire with both such windings carrying alternating current having the same frequency.

9. The electrodynamic suspension system according to claim 1 wherein said coil includes a winding comprised of superconducting wire carrying alternating current having a first frequency and a winding comprised of normal conducting wire carrying alternating current having a second frequency different from said first frequency, the two windings being energized simultaneously to create a difference or summation frequency.

10. The electrodynamic suspensión system according to claim 9 wherein said winding comprised of superconducting wire and said winding comprised of normal conducting wire each generate magnetic flux sharing a common magnetic path in the primary and secondary members.

11. The electrodynamic suspension system according to claim 10 wherein said winding comprised of superconducting wire and said winding comprised of normal conducting wire are individually controllable and energized by alternating current.

12. The electrodynamic suspension system according to claim 1 wherein said on-board superconducting electromagnetic coil includes a ferromagnetic core with at least four pole faces, wherein said secondary member is elongated in a direction corresponding to the spacing between said pole faces of said core, and wherein said alternating field of magnetic flux is principally orientated in a lateral direction with respect to the direction of the elongated length of said secondary member.

13. The electrodynamic suspension system according to claim 1 wherein said passive electrical conductive means includes a first layer of non-ferromagnetic electric conductive strip and a second layer comprising a ferromagnetic flux return plate, said first layer being arranged more closely adjacent said superconducting coils than said second layer.

14. The electrodynamic suspension system according to claim 1 further including means for controlling the voltage and the frequency of the alternating current applied to said at least one of said superconducting coils.

15. An electromagnetic transportation system including a vehicle including means having an array of onboard superconducting electro-magnetic coils forming a primary member arranged in a transverse flux orientation with respect to longitudinal orientation of vehicle motion, at least one of said superconducting coils being energized by a variable alternating current to produce an alternating field of magnetic flux, and a guideway including passive electrically conductive means forming a secondary member responsive to said alternating field of magnetic flux which induces an alternating current in said secondary member to either or both guide and levitate the vehicle by repulsive induction action at a spaced relation from the guideway independently of propulsive vehicle movement.

16. The electromagnetic transportation system according to claim 15 wherein said array of on-board superconducting electromagnetic coils include: ferromagnetic cores with limbs forming at least two pole faces; and winding encircling the limbs, wherein said secondary member is elongated in a direction corresponding to the spacing between said pole faces, and wherein said alternating field of magnetic flux is principally orientated in a lateral direction with respect to the direction of the elongated length of said secondary member.

17. The electromagnetic transportation system according to claim 16 wherein said at least two pole faces each define an electromagnetic air gap with said secondary, said pole faces being laterally spaced apart by a distance which is greater than the height of said air gap for minimizing the sensitivity of levitation force by said coil to variations to the levitation height in response to outside forces, dynamic motion of said moveable member or perturbations in the secondary member surface.

18. The electromagnetic transportation system according to claim 16 wherein said on-board superconducting electromagnetic coil includes a plurality of discrete coils connected to form a parallel excitation circuits each operable independent of the other as to the phase of excitation frequency and magnetomotive force, each circuit being simultaneously energized by the same frequency of AC current, and wherein said parallel excitation circuits comprise stacked coils in a common slot or slots of a ferromagnetic core.

19. The electromagnetic transportation system according to claim 16 wherein said ferromagnetic core includes four limbs forming slots for receiving stacked arrangement of two sets of excitation coils and wherein said system further includes a shield traversing the pole faces of said four limbs, said shield having electrically conductive sections facing said excitation coils and insulator sections facing said pole faces.

20. The elelectromagnetic transportation system according to claim 16 further including electromagnetic dampening means or a highly electrically conductive material fitted in the magnetic quadrature axis for electromagnetically shielding, reducing magnetic leakage flux and providing mechanical support to said electromagnetic coils.

21. The electromagnetic transportation system according to claim 15 wherein said electromagnetic coils are segmented into a plurality of longitudinal sectors with each sector having an excitation coil winding energized to produce a predetermined magneto-motive force.

22. The electromagnetic transportation system according to claim 15 wherein said electromagnetic coils are segmented into a plurality of longitudinal sectors with each sector having an excitation coil winding energized to produce a sinusoidal-like spatial variation of the MMF as a function of longitudinal position.

23. The electromagnetic transportation system according to claim 15 wherein said electro-magnetic coils include superconducting wire responsive to alternating current and wherein said vehicle contains a cryogenic support system for said coils to establish a superconducting operating parameter for said coil and for the removal of heat in response to eddy current losses and radiation and conductive heat gains.

24. The electromagnetic transportation system according to claim 15 wherein said superconducting electro-magnetic coil includes a superconductor capable of operating at liquid-helium, super-critical helium or liquid nitrogen temperatures at an overall current density of at least 4000 amps per square centimeter.

25. The electrodynamic suspension system according to claim 15 wherein said onboard superconducting electromagnetic coils and secondary member electro-dynamically interact to produce both a repulsion-levitation force and a lateral guidance force, said lateral guidance force being inherently stable and self-restoring and said repulsion-levitation force establishing a steady-state air gap height which is inversely proportional to the suspended mass.

26. The electromagnetic transportation system according to claim 15 wherein the coils of said array of on-board superconducting electro-magnetic coils are spatially distributed about an undercarriage of said vehicle for concentrating magnetic flux in primary ferromagnetic cores of said coils with levitation and lateral forces developed on magnetized core material.

27. The electromagnetic transportation system according to claim 15 further including means for supplying alternating current to said on-board superconducting electromagnetic coils, said means for supplying alternating current including means for establishing the frequency of the alternating current within a selectable range of frequencies greater than zero hertz.

28. The electrodynamic suspension system according to claim 27 further including means including an air gap sensor for producing an airgap electrical signal corresponding to the levitation height of said vehicle, means including an in-line current sensor for producing an electrical feedback signal corresponding to the electrical current applied to said electromagnetic coil and wherein said means for establishing the frequency of alternating current includes means responsive to said airgap electrical signal and said in-line current electrical signal for establishing a magnitude of alternating current.

29. The electromagnetic transportation system according to claim 27 wherein said frequency of said alternating current is within the range of 60 Hz to direct current, and wherein the inverter frequency is controlled according to the equation:

$$\delta = \frac{Vs - Vm}{Vs} \quad (12)$$

where:
δ=electromagnetic slip value;
Vs=synchronous field speed (m/s); and
Vm=mechanical speed of vehicle (m/s)
such that the mechanical speed of the vehicle exceeds the synchronous field speed therefore creating a negative slip condition which results in regenerative braking of the vehicle motion.

30. The electromagnetic transportation system according to claim 27 wherein said means for supplying alternating current include a phase-delay rectifier and inverter system for bi-directional power flow of electrical energy with respect to said electro-magnetic coils, said means for supplying alternating current including means for dynamic braking of vehicle motion and return of vehicle kinetic energy to an alternating current sink by means of adjusting excitation frequency to create a slip value greater than 1.00 or reversing of phase sequence applied to said on-board superconducting electromagnetic coils.

31. The electromagnetic transportation system according to claim 15 wherein said coil includes a winding comprised of superconducting wire carrying alternating current having a first frequency and a winding comprised of normal conducting wire carrying alternating current having a second frequency different from said first frequency, the two windings being energized simultaneously to create a difference or summation frequency.

32. The electromagnetic transportation system according to claim 31 wherein said winding comprised of superconducting wire and said winding comprised of normal conducting wire each generate magnetic flux sharing a common magnetic path in the primary and secondary members.

33. The electromagnetic transportation system according to claim 32 wherein said winding comprised of superconducting wire and said winding comprised of normal conducting wire are individually controllable and energized by alternating current.

34. The electromagnetic transportation system according to claim 15 wherein said on-board superconducting electromagnetic coils include coils of superconducting conductors responsive to alternating current in the presence of magnetic fields exceeding 0.50 Tesla.

35. The electromagnetic transportation system according to claim 15 wherein said passive electrical conductive means includes a first layer of non-ferromagnetic electric conductive strip and a second layer comprising a ferromagnetic flux return plate, said first layer being arranged more closely adjacent said superconducting coils than said second layer.

36. The electromagnetic transportation system according to claim 35 wherein said first and second layers have an L-shaped configuration in which a first leg of the L-shape extends horizontally along the guideway and a second leg of the L-shape extends vertically in an upward direction at a spaced location from the side of said primary member.

37. The electromagnetic transportation system according to claim 35 wherein said first layer includes L-shaped end extensions extending in a direction away from said primary member for enhancing a lateral restoring force to said vehicle.

38. The electromagnetic transportation system according to claim 15 wherein said primary member and secondary member define a magnetic Reynolds number according to the equation:

$$G = \frac{2 T_p^2 u_0 f t}{\pi \, ge \, Pr \, K} \quad (11)$$

where:
$T_p$=primary pole -pitch. (m);
$u_0$=free=space permeability (H/m);
f=excitation frequency (Hz);
t=thickness of secondary electrical conductor (m);
ge=effective primary-secondary electromagnetic air gap (m);
Pr=surface resistivity of secondary electrical conductor (ohm-m); and
K=multiplier for surface resistivity to account for side-bar currents in longitudinally oriented conductor in guideway, separate from main path currents.

39. The electromagnetic transportation system according to claim 38 wherein said magnetic Reynolds number is at least 10.

40. The electromagnetic transportation system according to claim 15 further including levitation magnet frequency controllers responsive to the weight of the vehicle and the levitation height, said controllers having circuitry for providing optimum magnet current AC frequency versus vehicle speed for maintaining levitation efficiency at each magnet location.

41. The electromagnetic transportation system according to claim 15 further including means for controlling the voltage and the frequency of the alternating current applied to said at least one of said superconducting coils.

42. The electrodynamic suspension system according to claim 2 wherein said ferromagnetic core is C-shaped forming two pole faces lying in a plane orientated transversely in the elongated length of said secondary member.

43. The electrodynamic suspension system according to claim 2 wherein said ferromagnetic core is E-shaped having limbs forming three pole faces, said limbs lying in a plane orientated transversely to the elongated length of said secondary member.

44. The electromagnetic transportation system according to claim 16 wherein said cores each have a C-shape and form two pole faces having a core lying in a plane orientated transversely to the elongated length of said secondary member.

45. The electromagnetic transportation system according to claim 44 wherein the vertical spacing between said secondary and each of said pole fces is proportional to and smaller than the transverse opening between said pole faces of the C shaped core for high dynamic stability of the levitation force under variations to said spaced relation due to said repulsive induction action.

46. The electromagnetic transportation system according to claim 16 wherein at least one said ferromagnetic core is E-shaped having limbs forming three pole faces, said limbs lying in a plane orientated transverse to the intended path of travel by the vehicle along said secondary, said E-shaped core providing a substantially fixed and closed path for the main magnetic flux in said electro-magnetic coils.

47. The electromagnetic transportation system according to claim 27 further including propulsion motor primary means extending vertically along at least one lateral side of the vehicle, a side wall mounted reaction plate forming a secondary and producing restoring forces acting in a fashion to damp vertical oscillations of said vehicle while suspended in response to the transverse flux orientation of said primary member, forming a horizontally-oriented electrodynamic suspension system and improving suspension ride quality by increasing overall vehicle suspension stiffness, means for controlling said propulsion means for establishing a desired rate of travel along the guideway, said means for controlling being independently controllable from a means for supplying alternating current.

48. The electromagnetic transportation system according to claim 15 wherein said at least one on-board superconducting electro-magnetic coils include two groups of discrete coil windings which comprise a main excitation group and an auxiliary excitation group, said main excitation group being located spatially-closest to a levitation air gap and said auxiliary excitation group being located at a distance further from the air gap than said main excitation group, said main excitation group and said auxiliary excitation group having different relative magnetic leakage flux and different volt-ampere-reactive magnetization levels.

49. The electromagnetic transportation system according to claim 48 wherein said main excitation group has the longest electrical time constant as compared to the auxiliary excitation group and wherein said electrodynamic suspension system further includes means for independently supplying alternating electric power to each of said main excitation group and said auxiliary excitation group.

50. The electromagnetic transportation system according to claim 35 wherein said second layer comprises two parallel extending discrete plates spaced apart along their elongated edges by a gap.

51. The electromagnetic transportation system according to claim 50 wherein said array of onboard superconducting electromagnetic coils include ferromagnetic cores with limbs forming at least two pole faces, said limbs being obliquely angled by extending in an outwardly diverging fashion from a core yoke portion for maximizing the transverse airgap between said limbs and reducing the magnetic leakage flux.

52. The electromagnetic transportation system according to claim 50 wherein said array of onboard superconducting eleetromagnetic coils include ferromagnetic cores with limbs foxing at least two pole faces, said limbs being obtusely angled by extending in an inwardly diverging fashion from a core yoke portion for minimizing eddy current losses in the superconductor and heating of the winding of said coil.

53. The electromagnetic transporting system according to claim 15 wherein said at least one onboard superconducting electric coil forms a plurality of magnets at each of forward and aft portions of said vehicle, the magnets of each pair being energized by alternating current supplies that are 180° phase different.

* * * * *

UNITED STATES PATENT AND TRADEMARK OFFICE
CERTIFICATE OF CORRECTION

PATENT NO. : 5,666,883
DATED : SEPTEMBER 16, 1997
INVENTOR(S) : KUZNETSOV, STEPHEN B.

It is certified that error appears in the above-identified patent and that said Letters Patent is hereby corrected as shown below:

COLUMN 32, LINE 27, AFTER "A" (SECOND OCCURRENCE) INSERT --PLANE--.

Signed and Sealed this

Tenth Day of April, 2001

Attest:

NICHOLAS P. GODICI

*Attesting Officer*    Acting Director of the United States Patent and Trademark Office